US012234686B2

(12) United States Patent
Fisher et al.

(10) Patent No.: US 12,234,686 B2
(45) Date of Patent: Feb. 25, 2025

(54) MOUNTING ASSEMBLY FOR AN ARCHITECTURAL COVERING

(71) Applicant: Hunter Douglas Inc., Pearl River, NY (US)

(72) Inventors: Robert E. Fisher, Westminster, CO (US); Michael Scott Goldberg, Stanley, NC (US); James M. Anthony, Denver, CO (US); Kevin M. Dann, Englewood, CO (US); Joseph E. Kovach, Brighton, CO (US)

(73) Assignee: HUNTER DOUGLAS INC., Pearl River, NY (US)

( * ) Notice: Subject to any disclaimer, the term of this patent is extended or adjusted under 35 U.S.C. 154(b) by 51 days.

(21) Appl. No.: 17/983,935

(22) Filed: Nov. 9, 2022

(65) Prior Publication Data

US 2023/0074389 A1 Mar. 9, 2023

Related U.S. Application Data

(60) Continuation of application No. 16/887,050, filed on May 29, 2020, now Pat. No. 11,512,529, which is a (Continued)

(51) Int. Cl.

*E06B 9/56* (2006.01)
*E06B 9/32* (2006.01)

(Continued)

(52) U.S. Cl.

CPC .................. *E06B 9/56* (2013.01); *E06B 9/32* (2013.01); *E06B 9/323* (2013.01); *E06B 9/50* (2013.01);

(Continued)

(58) Field of Classification Search

CPC ..... E06B 9/42; E06B 9/50; E06B 9/56; E06B 9/323; E06B 9/32; E06B 2009/1743; E06B 9/174; A47H 1/13; A47H 1/14

See application file for complete search history.

(56) References Cited

U.S. PATENT DOCUMENTS 3,007,676 A 11/1961 Laszlo
3,304,034 A 2/1967 Jones (Continued)

FOREIGN PATENT DOCUMENTS

CN 104110202 10/2014
CN 205359142 7/2016

(Continued)

OTHER PUBLICATIONS

Extended European Search Report—Application No. 17181514.5, Dated May 1, 2018 (12 pages).

(Continued)

*Primary Examiner* — Abe Massad
*Assistant Examiner* — Jeremy C Ramsey
(74) *Attorney, Agent, or Firm* — Dority & Manning, P.A.

(57) ABSTRACT

In one aspect, a mounting assembly for mounting an architectural covering to a support structure may include a bracket configured to be coupled to the support structure and a bracket adapter configured to be coupled to the bracket. In addition, the mounting assembly may include an end mount configured to be coupled to both an adjacent end of the covering and the bracket adapter. In accordance with aspects of the present subject matter, the various components of the mounting assembly may be configured or adapted to provide one or more advantages over known mounting assemblies.

20 Claims, 41 Drawing Sheets

Related U.S. Application Data division of application No. 15/650,046, filed on Jul. 14, 2017, now Pat. No. 10,704,324.

(60) Provisional application No. 62/455,554, filed on Feb. 6, 2017, provisional application No. 62/364,852, filed on Jul. 20, 2016.

(51) Int. Cl.

| | |
|---|---|
| ***E06B 9/323*** | (2006.01) |
| ***E06B 9/50*** | (2006.01) |
| *E06B 9/174* | (2006.01) |
| *E06B 9/72* | (2006.01) |

(52) U.S. Cl.

CPC ......... *E06B 2009/1743* (2013.01); *E06B 9/72* (2013.01)

(56) References Cited

U.S. PATENT DOCUMENTS

| | | | | |
|---|---|---|---|---|
| 3,406,785 | A | 10/1968 | Pilcher | |
| 4,538,785 | A | 9/1985 | Damsgaard | |
| 5,029,629 | A | 7/1991 | Cheng-Pei | |
| 5,083,601 | A | 1/1992 | Tedeschi | |
| 6,283,427 | B1 | 9/2001 | Moller et al. | |
| 6,550,733 | B1 | 4/2003 | Lassen et al. | |
| 6,561,475 | B1 | 5/2003 | Chuang | |
| 7,267,311 | B2 | 9/2007 | Jung | |
| 7,287,734 | B2 | 10/2007 | Bell | |
| 7,677,294 | B2 | 3/2010 | Bohlen | |
| 7,740,047 | B2 | 6/2010 | Koop et al. | |
| 7,802,808 | B2 | 9/2010 | Neiley | |
| 8,382,050 | B2 | 2/2013 | Koop | |
| 8,695,681 | B2 | 4/2014 | Daniels | |
| 8,893,766 | B2 | 11/2014 | Bohlen | |
| 9,237,821 | B2 | 1/2016 | Geiger | |
| 9,303,707 | B2 | 4/2016 | Fraczek | |
| 9,347,261 | B2 | 5/2016 | Blair et al. | |
| 9,470,040 | B2 | 10/2016 | Hall et al. | |
| 10,309,153 | B2 | 6/2019 | McPherson | |
| 10,428,580 | B2 * | 10/2019 | Vries | E06B 9/50 |
| 10,676,989 | B2 | 6/2020 | Buccola, Jr. | |
| 2003/0051830 | A1 | 3/2003 | Garcia | |
| 2008/0121353 | A1 | 5/2008 | Detmer et al. | |
| 2008/0135191 | A1 | 6/2008 | Zakowski | |
| 2008/0245940 | A1 | 10/2008 | Brown | |
| 2009/0056885 | A1 | 3/2009 | Garmyn et al. | |
| 2009/0127369 | A1 | 5/2009 | Mullet et al. | |
| 2011/0139380 | A1 | 6/2011 | Anthony et al. | |
| 2011/0139381 | A1 | 6/2011 | Daniels | |
| 2011/0139382 | A1 | 6/2011 | Daniels | |
| 2015/0007949 | A1 | 1/2015 | Daniels | |
| 2015/0191973 | A1 | 7/2015 | Bohlen | |
| 2015/0233180 | A1 | 8/2015 | Lanzafame | |
| 2015/0300085 | A1 | 10/2015 | Klein Tuente et al. | |
| 2016/0153230 | A1 | 6/2016 | Greening | |
| 2017/0175440 | A1 | 6/2017 | Bohlen | |
| 2017/0226797 | A1 | 8/2017 | Birkkjaer | |
| 2018/0112462 | A1 | 4/2018 | Chen | |
| 2018/0202228 | A1 | 7/2018 | Faller | |
| 2019/0257149 | A1 | 8/2019 | Lei | |
| 2020/0157882 | A1 * | 5/2020 | Chen | E06B 9/42 |
| 2020/0165866 | A1 | 5/2020 | Holt | |
| 2020/0355028 | A1 * | 11/2020 | Lai | E06B 9/50 |
| 2021/0071475 | A1 | 3/2021 | Seiple | |

FOREIGN PATENT DOCUMENTS

| | | | | |
|---|---|---|---|---|
| CN | 205513981 | | 8/2016 | |
| EP | 32884 | | 7/1981 | |
| EP | 1106775 | | 6/2001 | |
| EP | 2716857 | | 4/2014 | |
| EP | 2933428 | | 10/2015 | |
| EP | 3372773 | A1 * | 9/2018 | E06B 9/174 |
| EP | 3483377 | A1 * | 5/2019 | E06B 9/174 |
| FR | 2641028 | | 12/1988 | |
| FR | 2651272 | | 3/1991 | |
| GB | 2356886 | | 6/2001 | |
| WO | WO 2011/150071 | | 12/2001 | |
| WO | WO 2003/080978 | | 10/2003 | |
| WO | WO 2004/070157 | | 8/2004 | |
| WO | WO 2007/091752 | | 8/2007 | |
| WO | WO 2008/025494 | | 3/2008 | |
| WO | WO 2009/030474 | | 3/2009 | |
| WO | WO 2009/086898 | | 7/2009 | |
| WO | WO 2009/100504 | | 8/2009 | |

OTHER PUBLICATIONS

Extended European Search Report—Application No. 22152453.1, Dated Jul. 13, 2022 (8 pages).

* cited by examiner

FIG. 2
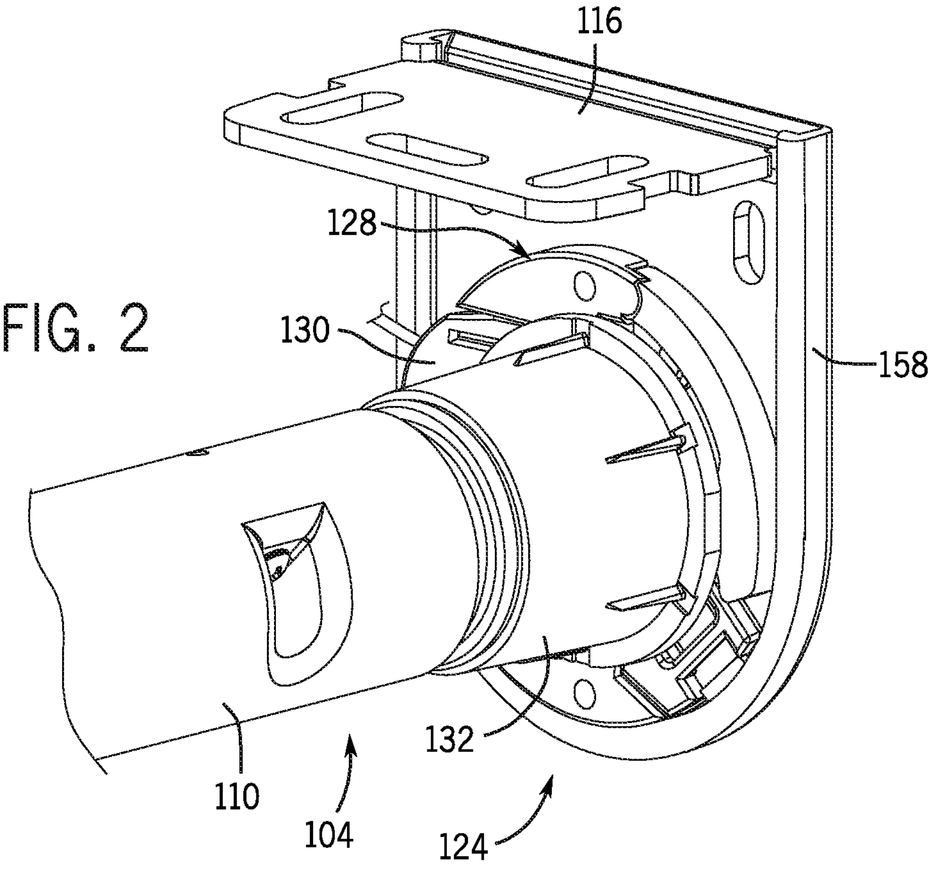
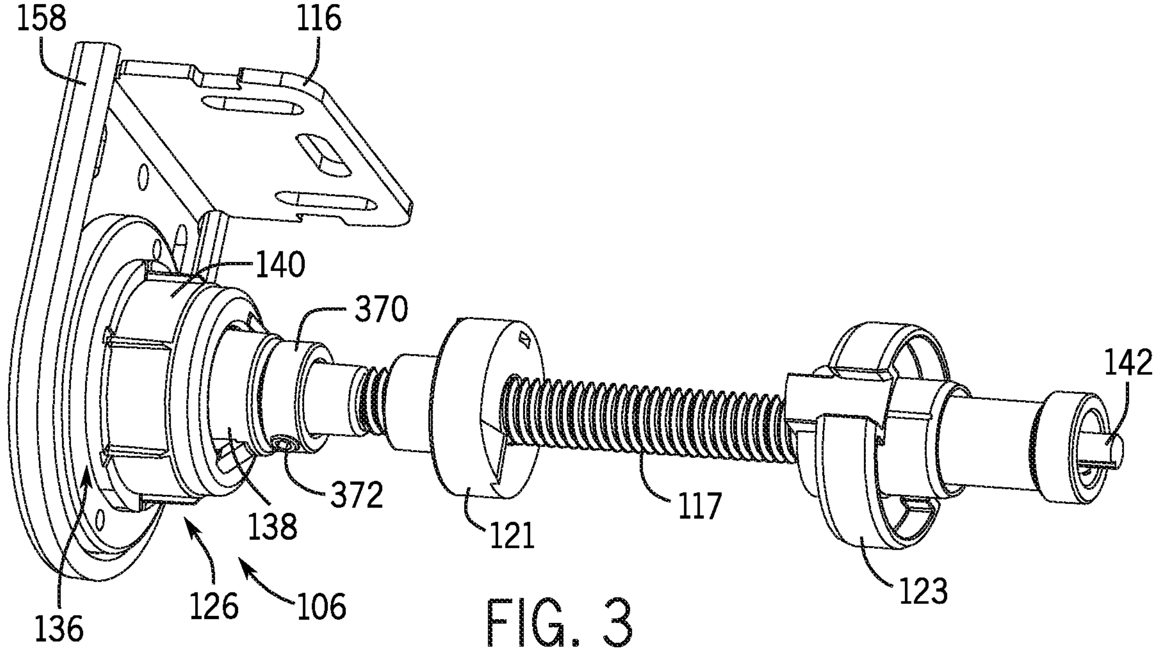
FIG. 3

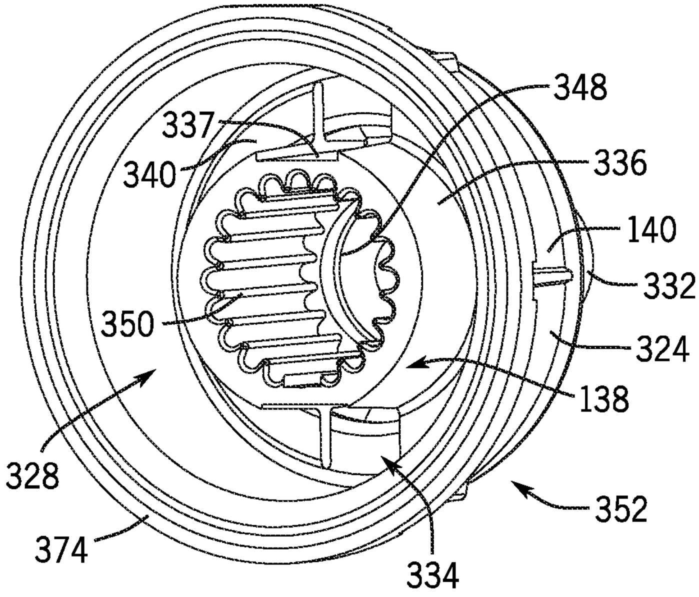
FIG. 33
FIG. 34
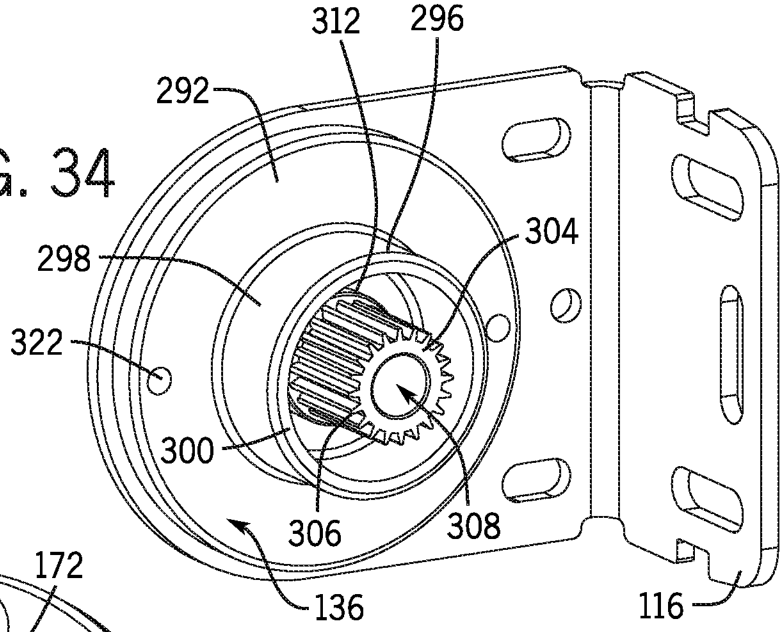
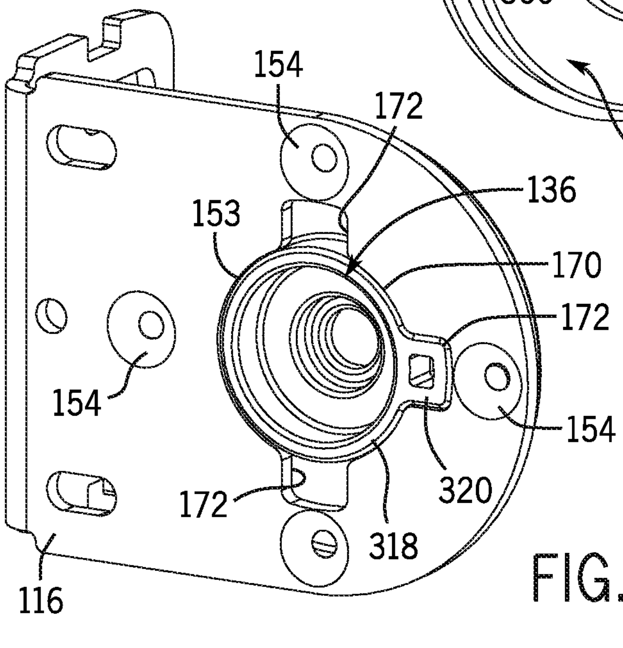
FIG. 35

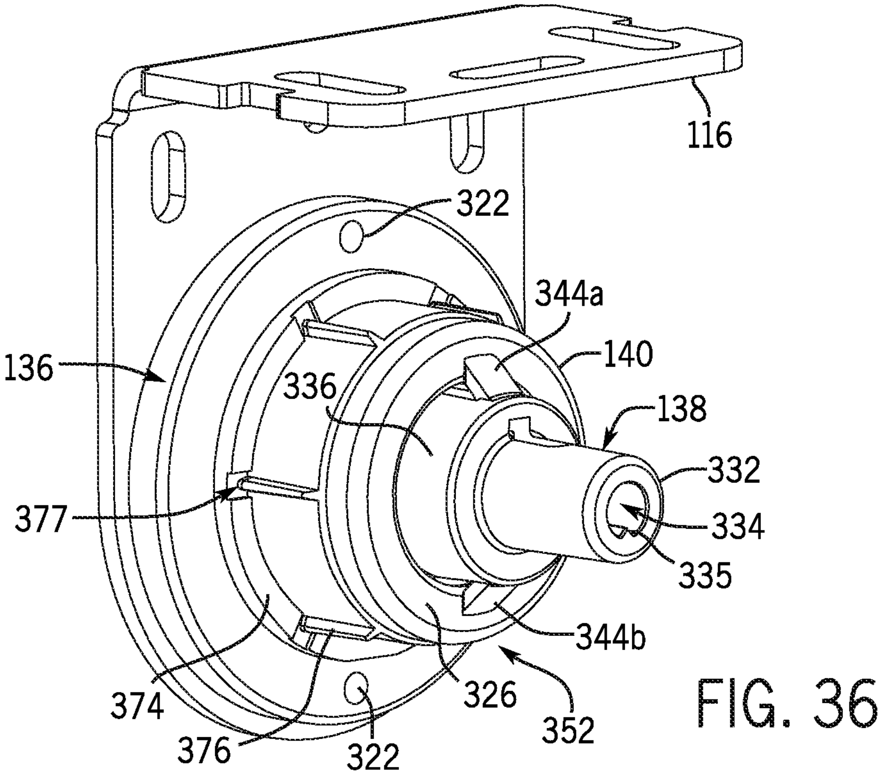
FIG. 36
FIG. 37
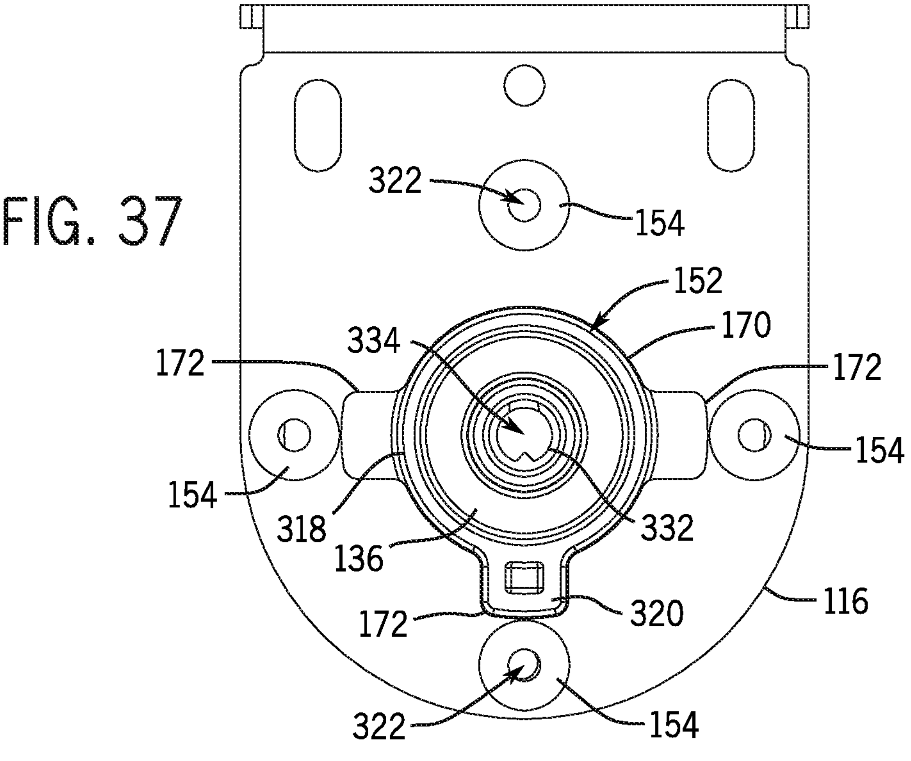

MOUNTING ASSEMBLY FOR AN ARCHITECTURAL COVERING

CROSS-REFERENCE TO RELATED APPLICATIONS

The present application is a continuation of U.S. patent application Ser. No. 16/887,050, filed May 29, 2020, which, in turn, is a divisional of U.S. patent application Ser. No. 15/650,046 now U.S. Pat. No. 10,704,324), filed on Jul. 14, 2017, which, in turn, is based upon and claims the right of priority to U.S. Provisional Patent Application No. 62/364,852, filed on Jul. 20, 2016, and U.S. Provisional Patent Application No. 62/455,554, filed on Feb. 6, 2017, the disclosures of all of which are hereby incorporated by reference herein in their entirety for all purposes.

FIELD

The present disclosure relates generally to architectural coverings for architectural features and, more particularly, to an assembly for mounting an architectural covering to a support structure surrounding an architectural feature.

BACKGROUND

Architectural coverings for architectural features, including openings (e.g., windows, doors, archways, and the like) have taken numerous forms for many years. Many architectural coverings include a retractable shade movable between an extended position and a retracted position. A retractable shade may include one or more components configured for selective extension and retraction relative to an architectural feature. In some instances, the retractable shade may include one or more sheets of flexible material configured to be selectively extended and retracted relative to an architectural feature by being wound around a rotating member or being gathered to one side of an architectural feature, such as against a head rail. The horizontal member from which the shade is deployed is mounted to the support structure defining the architectural feature by being attached at each end to a respective stationary structure (such as a mounting bracket). The covering may be positioned within a housing, which extends between the stationary structures.

Since the structure surrounding an architectural feature to which the covering is attached may take many forms, the mounting of the covering may be challenging. This is especially the case where the mounting brackets may need to be coupled to a ceiling to extend downward, or coupled to a wall to extend forwardly. Regardless of the orientation of the mounting brackets, the shade must then be coupled to the mounting brackets so as to extend and retract relative to the architectural feature. Such coupling of the shade to the mounting brackets often necessitates exact alignment of the shade with each bracket and/or complex retention methods for retaining the shade relative to the bracket. What is needed in the art is a mounting assembly that simplifies the installation process and/or allows for quick and easy adjustments to be made to accommodate misalignments and/or to decouple the shade from the brackets.

Additionally, to accommodate for the variety of mounting orientations for shades, many different mounting brackets and associated hardware may be required. In some situations, further variety of brackets may be required due to different shade types requiring the use of different mounting brackets because of varying vertical drop, width, and shade styles. What is needed in the art is a modular mounting assembly that, individually or in any combination, allows coverings of different shapes and styles to be mounted to various structures, and that utilizes components and mounting brackets having shared components to allow replacement, and/or to facilitate a reduction of a total number of components.

Moreover, the light gap formed between the outer vertical edge of the mounting bracket and the outer vertical edge of the extended sheet of the shade should be kept relatively small to inhibit unacceptable amounts of light passing around the edges of the shade when extended over the architectural feature. The mounting assemblies attaching each of the ends of the horizontal member to which the shade is attached to mounting brackets is a primary source of the light gap. Additionally, the inclusion of a drive unit for assisting in the extension and retraction of the shade also affects the size of the light gap because components of the drive unit, such as the electrical or transmission components, are at least partially positioned on or near an inner surface of the mounting bracket, thereby limiting the width dimension of the retractable shade and resulting in an unacceptable light gap along the vertical edges of the covering. What is needed in the art is a standardized mounting assembly that allows for a reduced light gap.

The present disclosure is at least partially directed to an improved mounting assembly that alleviates at least to a certain extent one or more of the aforementioned problems.

SUMMARY

The present disclosure generally provides examples of mounting assemblies useful for mounting an architectural covering also referred to throughout as a "covering") to a support structure. Such an architectural covering may include, in one example, a cover assembly, which in one example may include a roller type shade. While reference to a cover assembly is used throughout by way of example, an architectural covering may include structures other than a cover assembly with which the mounting assemblies disclosed herein may be utilized.

In at least one embodiment of the present subject matter, the disclosed mounting assembly includes a bracket configured to be coupled to support structure positioned adjacent to the associated architectural feature and a bracket adapter configured to be coupled to the bracket. In addition, in at least one embodiment, the mounting assembly includes an end mount configured to be coupled to both an adjacent end of the covering and the bracket adapter. In accordance with aspects of the present subject matter, the various components of the mounting assembly may be configured or adapted to provide one or more advantages over known mounting assemblies.

It will be appreciated that the various aspects or features of the disclosed mounting assembly may be provided separately and independently of one another, or in various combinations with one another. Accordingly, while the disclosure is presented in terms of examples, it should be appreciated that any individual aspects of any example may be claimed separately or in combination with aspects and features of that example or any other example.

The present disclosure is set forth in various levels of detail in this application and no limitation as to the scope of the claimed subject matter is intended by either the inclusion or non-inclusion of elements, components, or the like in this summary. In certain instances, details that are not necessary fix an understanding of the disclosure or that render other details difficult to perceive may have been omitted. It should be understood that the claimed subject matter is not necessarily limited to the particular examples or arrangements illustrated herein.

BRIEF DESCRIPTION OF THE DRAWINGS

The accompanying drawings, which are incorporated into and constitute a part of the specification, illustrate examples of the disclosure and, together with the general description given above and the detailed description given below, serve to explain the principles of these examples.

FIG. 2 is an isometric view of a control-end mounting assembly of the cover assembly of FIG. 1.

FIG. 3 is an isometric view of an idle-end mounting assembly of the cover assembly of FIG. 1.

FIG. 33 is a rear isometric view of the rotating member size-adapter of FIG. 31 received around the idle-end-mount of FIG. 29.

FIG. 34 is a front isometric view of the idle-end bracket-adapter of FIG. 27 received in a bracket.

FIG. 35 is a rear isometric view of the idle-end bracket-adapter of FIG. 34.

FIG. 36 is a top isometric view of the idle-end bracket-adapter, idle-end-mount, and rotating member size-adapter coupled together and mounted on a bracket.

FIG. 37 is a left elevation view of the components of FIG. 36 mounted on the bracket.

DETAILED DESCRIPTION

Figure 1:
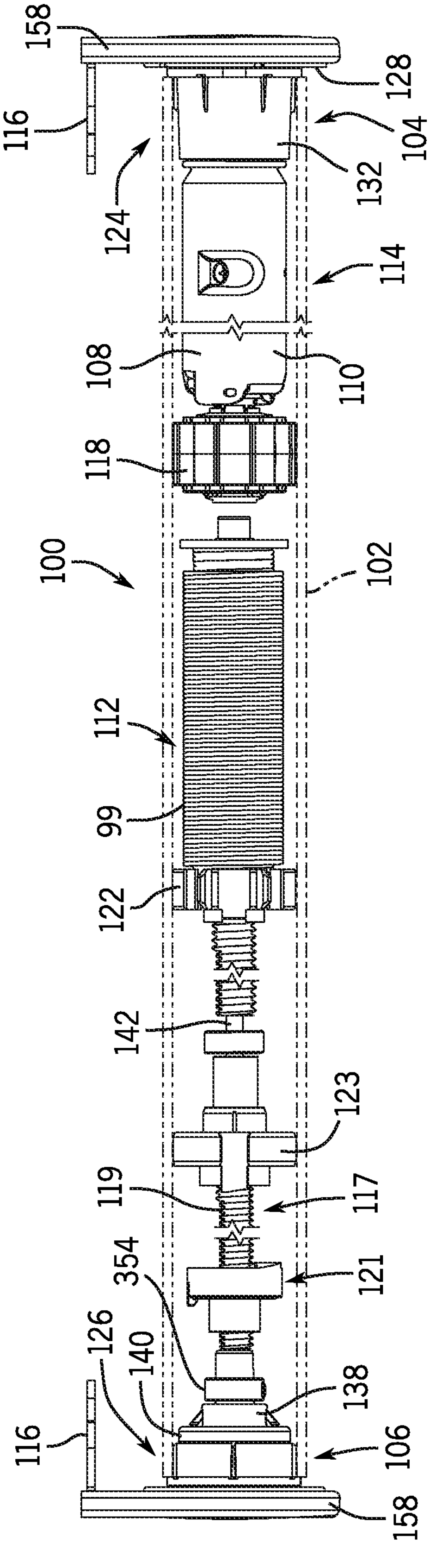
FIG. 1 is a front elevation view of one illustrative example of a covering for an architectural feature in the form of a cover assembly having an idle-end mounting assembly and a control-end mounting assembly coupled at opposite ends, with the shade material removed for clarity and the rotating member shown schematically.
Figure 4:
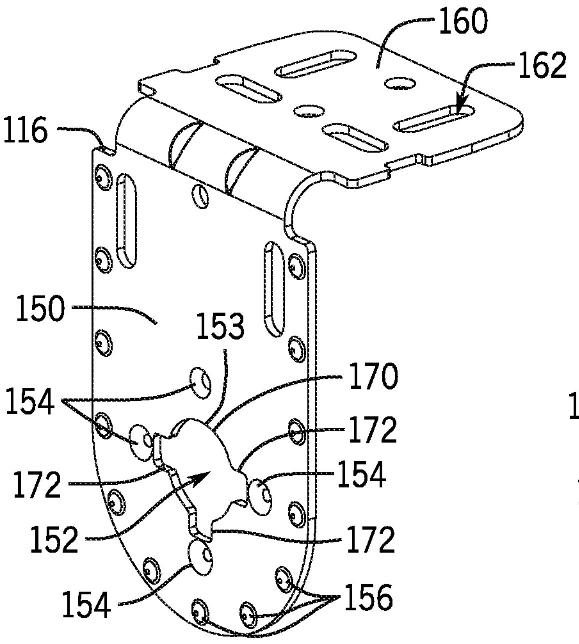
FIGS. 4-11 are isometric views of various illustrative examples of mounting brackets for use in mounting shade assemblies to support structures using the mounting assemblies described herein.
Figure 5:
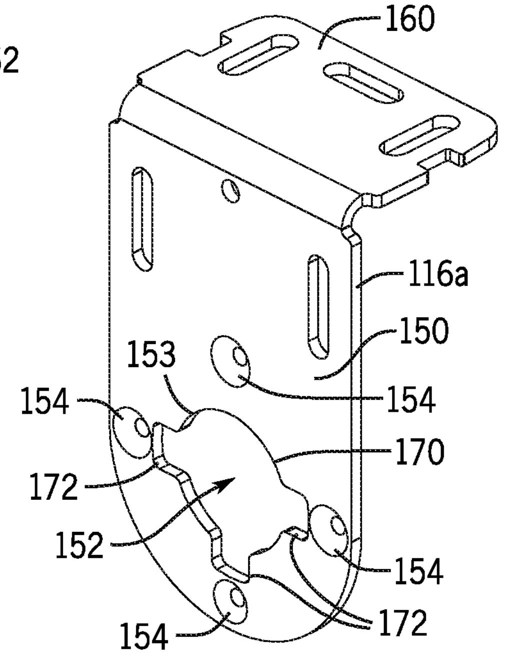
Figure 6:
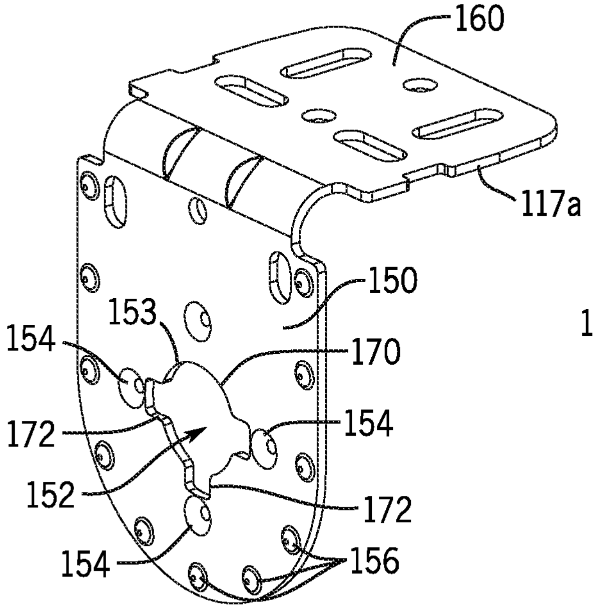
Figure 7:
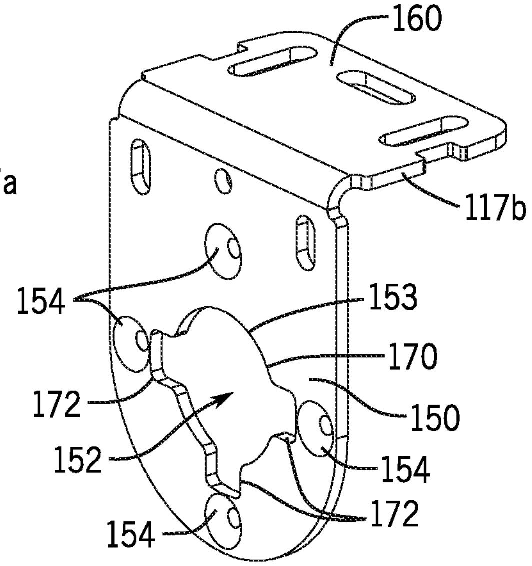
Figure 8:
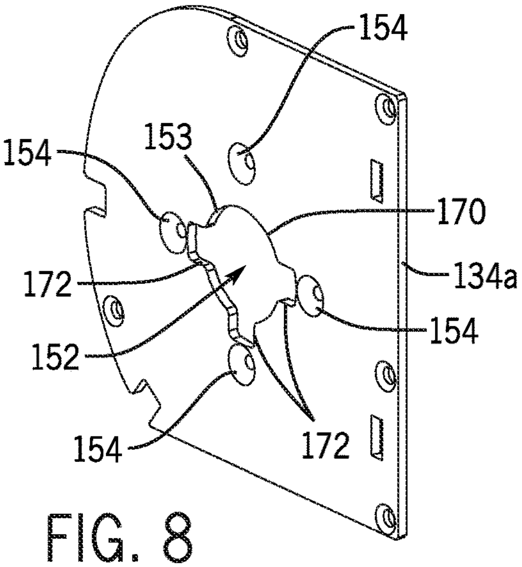
Figure 9:
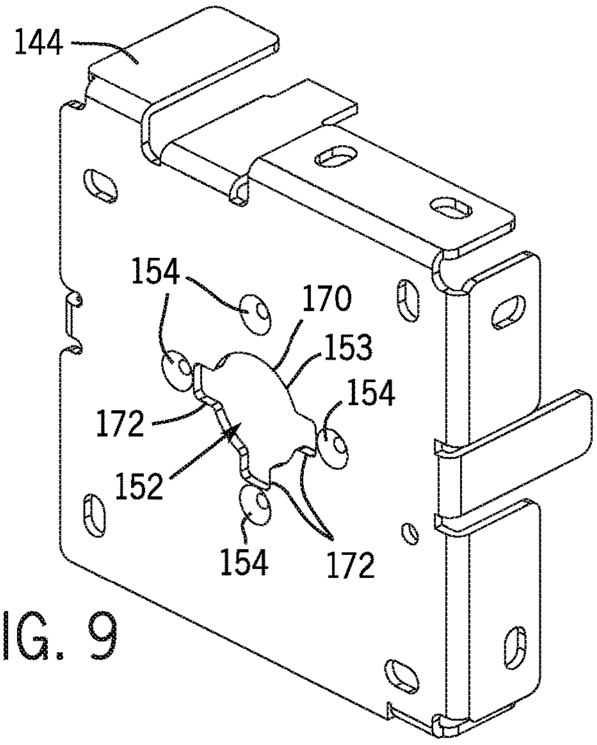
Figure 10:
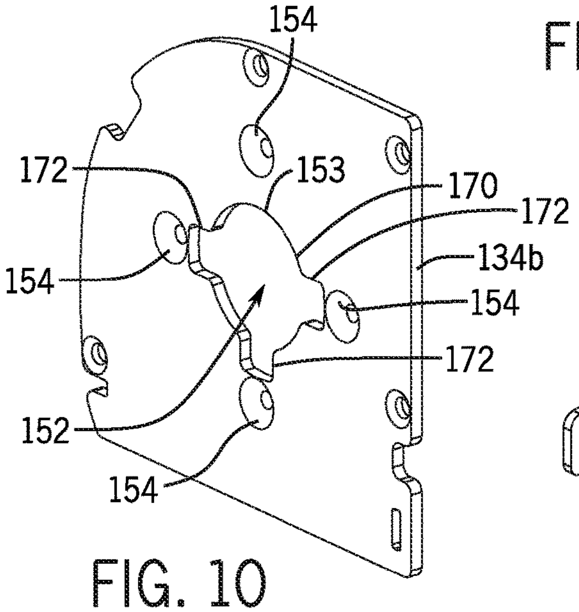
Figure 11:
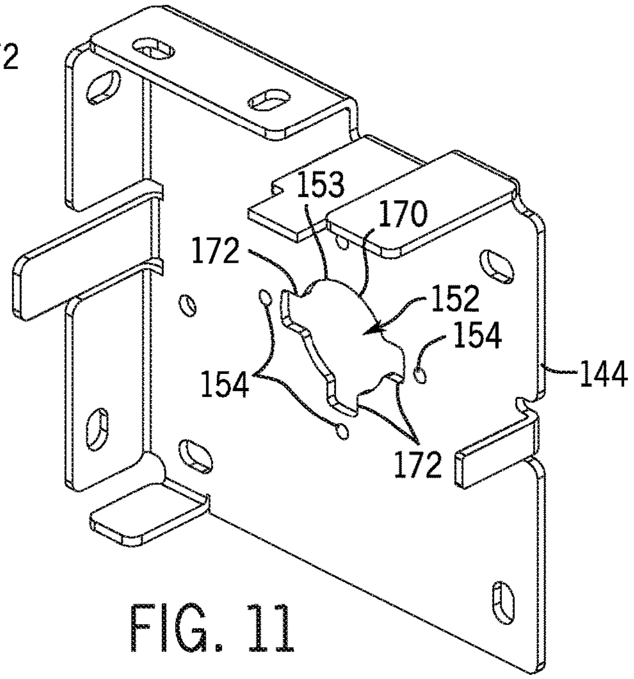

The present disclosure illustrates examples of a mounting assembly for a covering for an architectural feature. The mounting assembly may have any one of or a combination of the following advantages. The illustrative mounting assembly may be used with a variety of styles and sizes of coverings including shades, blinds, curtains, awnings, etc. The mounting assembly may also provide for more accurate and efficient installation of a covering relative to an architectural feature, including providing the ability to fine-tune the orientation of the covering relative to the adjacent architectural feature and/or the ability to couple the assembly components to each other with minimal effort or interaction from the user. In addition, the mounting assembly may also allow for quick and easy decoupling of the assembly components, such as when a covering is being removed from an adjacent architectural structure. The mounting assembly may also be modular and adaptable to varied mounting configurations, for example, on any of a wall, a frame of an architectural feature, or a ceiling using the same mounting hardware. This adaptability, as well as the unique, modular configurations of the components of the mounting assembly provide for significant improvements in simplification of the installation process. The mounting assembly may further be configured to reduce the size of the light gap, i.e., the separation distance between the shade material of the covering and the frame of an architectural feature (or an adjacent covering) through which light can pass around the covering and into the room. As referenced herein, an architectural feature may include an architectural opening, such as in non-limiting examples a window, doorway, or arch; and may also include a structural shape, such as an alcove, wall feature, or other such structural aspect that a user may wish to cover. An architectural feature may be on the interior of a structure, the exterior of a structure, or both the interior and exterior of a structure (e.g., a doorway between the exterior to the interior of a structure).

An architectural covering for an architectural feature may in one illustrative example include a cover assembly, or also referred to as a shade system, having an element facilitating extension and retraction of a shade material across the architectural feature, such as a rotating member (e.g., a roller tube or other suitable structure; hereinafter referenced as "rotating member" for the sake of convenience and without intent to limit); a flexible shade material coupled with the rotating member and extendable and retractable from the rotating member for being selectively positioned across the architectural feature; and, optionally, a manual or motor drive unit or assembly to aid in controlling the operation of the covering. In this description, the various illustrated examples show the cover assembly with the shade material, and in some instances the rotating member, removed for clarity. The covering may also include a mounting assembly coupled with at least one, or optionally each end, of the cover assembly for operably supporting an opposing end of the covering. In some implementations, a head rail housing may optionally extend between and to the opposing mounting assemblies and house the rotating member, drive assembly, and possibly other components. The description below may also refer to a cover assembly, which in at least one non-limiting example includes a rotating member. In the description below, a mounting assembly, having various embodiments, examples and configurations, may be coupled with a cover assembly to mount the cover assembly on a support structure. The description may also describe a mounting assembly coupling with, in some examples, a rotating member to mount the rotating member on a support structure; and where the rotating member is incorporated into a cover assembly, the cover assembly would also then be mounted on a support structure. Other types of coverings, for example, blinds, curtains, awnings, etc., that are similarly attached to rotating members or rails, and which may be manually or motor driven, may similarly be coupled to the mounting assemblies disclosed herein. Thus, the types of coverings able to be used with the mounting assemblies may not be limited to the illustrative embodiments of coverings described herein. Other non-limiting examples of an architectural feature may include a wall, a ceiling, or a permanent or temporary divider structure between spaces in a building.

In several embodiments of the present subject matter, a mounting assembly includes a combination of two or more individual components coupled together to mount an end of a cover assembly to a support structure. In general, the components of the mounting assembly include a bracket, a bracket-adapter in some embodiments), and a rotating member end mount, with the components configured to be assembled together to support the cover assembly on the support structure. In one example, the bracket is coupled to the adjacent support structure, and the bracket-adapter is coupled to the bracket. The rotating member end mount is positioned on an end of a cover assembly. To mount the cover assembly on the support structure, the rotating member end mount is then coupled to the bracket-adapter.

In one example, the bracket-adapter defines a seat for receiving the end mount and further includes retention structure for retaining the end mount within the seat. In one embodiment, the retention structure is configured to selectively or releasably secure the end mount within the seat. For instance, in one example implementation, the retention structure is movable relative to the end mount between an extended position and a retracted position for selectively engaging and disengaging the end mount, respectively. When at the extended position, a portion of the retention structure engages the end mount to retain the end mount within the seat. Similarly, when at the retracted position, such portion of the retention structure disengages the end mount, thereby allowing the end mount to be removed from the seat.

In one embodiment, the retention structure is pivotably coupled to the bracket-adapter to allow the retention structure to pivot relative to the end mount between the extended and retracted positions. Additionally, in one embodiment, a biasing member is provided in operative association with the retention structure to bias the bracket-adapter into its extended position. In such an embodiment, the biasing force applied against the retention structure may allow the retention structure to automatically engage with the end mount when the end mount is received within the seat. For instance, in one embodiment, a portion of the end mount may engage or otherwise contact the retention structure as the end mount is inserted within the seat such that the retention structure is initially pivoted towards its retracted position against the biasing force of the biasing member. Once the end mount is inserted within the seat a sufficient distance such that corresponding structure of the end mount is aligned with the retention structure of the bracket-adapter, the biasing force causes the retention structure to pivot outwardly towards and into engagement with the end mount, thereby allowing the retention structure to retain the end mount within the seat.

In one embodiment, the seat defined by the bracket-adapter may include an opening through which the end mount is inserted into the seat. In such an embodiment, once engaged with the end mount, the retention structure may be configured to prevent or limit movement of the end mount in the direction of the opening of the seat, thereby preventing decoupling of the end mount from the bracket-adapter. Additionally, in one embodiment, the retention structure of the bracket-adapter and the corresponding structure of the end mount may be configured such that, when the retention structure is engaged with the end mount, the end mount must be moved relative to the retention structure at least slightly in a direction opposite the direction of the seat opening to allow the retention structure to be disengaged from the end mount. Such interlocking or engagement of the retention structure with the end mount may assist in preventing unintentional or accidental decoupling of the end mount from the bracket-adapter while still allowing the end mount to be quickly and easily decoupled from the bracket-adapter by the user when desired.

In one embodiment, the retention structure includes, for example, a pivot arm or pawl provided in operative association with the bracket-adapter and a corresponding catch recess defined by the end mount. In such an embodiment, a portion of the pawl is configured to be received within the catch recess when the pawl is moved to the extended position to retain the end mount within the seat. For example, the pawl may include an engagement end configured to both extend outwardly into a portion of the seat when at the extended position and retract at least partially relative to the seat when at the retracted position. As such, when moved to the extended position, the engagement end of the pawl may extend outwardly into the seat and be received within the corresponding recess of the end mount. Additionally, the pawl may include an actuation end opposite its engagement end. In one embodiment, the actuation end of the pawl is accessible along an exterior of the bracket-adapter. As such, a user may push or actuate the actuation end of the pawl from a location exterior of the bracket-adapter to cause the pawl to pivot about its pivot axis, thereby allowing the engagement end to be pivoted away from the end mount towards its retracted position. For example, when it is desired to disengage the end mount from the bracket-adapter, a user may simply press or pull the actuation end of the pawl relative to the bracket adapter (e.g., after, in some embodiments, moving the end mount slightly in the direction away from the seat opening) to disengage the pawl and to allow the end mount to be removed from the seat.

In one embodiment, the retention structure of the bracket-adapter may include more than one pivot arm or pawl, such as a first pawl and a second pawl. In such an embodiment, each pawl may be configured to engage an opposing side of the end mount. For instance, in one embodiment, the end mount is configured to define one or more first catch recesses (e.g., a plurality of first recesses) along a first side of the end mount and one or more second catch recesses (e.g., a plurality of second recesses) along a second side of the end mount. In such an embodiment, the first pawl may be configured to be received within one of the first catch recesses to engage the first side of the end mount while the second pawl may be configured to be received within one of the second catch recesses to engage the second side of the end mount. By providing multiple catch recesses for engagement with each pawl, the positioning of the end mount relative to the bracket-adapter may be adjusted, thereby providing for fine-tuning of the installed assembly.

In one embodiment, a biasing mechanism or member is provided in operative association with the bracket-adapter and is configured to apply a biasing force against the end mount that maintains the end mount engaged with the retention structure when the retention structure is at its extended position. For instance, in one embodiment, the biasing mechanism corresponds to a spring-biased loading mechanism configured to contact a portion of the end-mount (e.g., a shoulder of the end mount) when the end mount is engaged with the retention mechanism. In such an embodiment, the spring-biased loading mechanism may apply a biasing force against the shoulder of the end mount that biases the end mount in a direction to facilitate improved engagement between the retention structure and the end mount. In another embodiment, the biasing mechanism corresponds to a resilient bumper configured to contact a portion of the end-mount (e.g., an outer surface of the end mount) when the end mount is engaged with the retention mechanism. In such an embodiment, the resilient bumper may apply a biasing force against the outer surface of the end mount that biases the end mount in a direction to facilitate improved engagement between the retention structure and the end mount.

In another embodiment of the present subject matter, a mounting assembly includes a bracket, a bracket-adapter, and a rotating member end mount, with the components configured to be assembled together to support the cover assembly on a support structure relative to an architectural feature. In one example, the bracket is coupled to the adjacent support structure, and the bracket-adapter is coupled to the bracket. The end mount is positioned on an end of a cover assembly. To mount the cover assembly on the support structure, the rotating member end mount is then coupled to the bracket-adapter. Additionally, in one embodiment, the bracket-adapter and the end mount include corresponding engagement portions configured to allow the bracket-adapter and the end-mount to be coupled together in a nesting or female/male relationship in which the engagement portion of either the bracket-adapter or the end mount is received axially within the corresponding engagement portion of the other of the bracket-adapter or the end mount.

In one embodiment, the axially oriented, nesting or female/male coupling relationship provided between the engagement portions of the bracket-adapter and the end-mount allows for the end mount to be installed relative to the bracket-adapter using a spear-type installation method. For instance, to install the end mount on the bracket-adapter, the engagement portion of the end mount may be initially aligned axially with the corresponding engagement portion of the bracket-adapter. One of the components may then be moved axially relative to the other in a spearing or axially-directed movement to allow the "female" engagement portion to be received within the "male" engagement portion.

In one embodiment, the engagement portions of the bracket-adapter and the end-mount may include corresponding engagement structures configured to circumferentially engage each other when the components are provided in their axial nesting or female/male relationship to prevent or limit relative rotation between the bracket-adapter and the end-mount. In addition to providing a non-rotational coupling between the bracket-adapter and the end-mount, the circumferential engagement structures of the bracket-adapter and the end-mount may also allow for selective adjustment of the orientation of the covering being coupled to the bracket-adapter (e.g., via the end-mount). For instance, in one embodiment, the engagement structures are configured to allow for the circumferential orientation of the end mount relative to the bracket-adapter to be incrementally varied or adjusted based on the particular circumferential alignment of the engagement structures prior to relative axial installation between the male/female engagement portions of the bracket-adapter and the ends mount. Such adjustability of the circumferential orientation of the end mount relative to the bracket-adapter may, in turn, allow for a user to make fine-tune adjustments of the orientation of the associated covering relative to the adjacent support structure or architectural feature.

In one embodiment, the engagement structures of the bracket-adapter and the end-mount correspond to mating splines configured to circumferentially engage when the male/female engagement portions of the bracket-adapter and the end-mount are installed axially relative each other. For instance, a plurality of inwardly directly splines may extend within the female engagement portion while a plurality of outwardly directly splines may extend outwardly from the male engagement portion. As such, when the female engagement portion is received axially within the male engagement portion, the inwardly directed splines circumferentially engage the outwardly directed splines to prevent or limit relative rotation between the bracket-adapter and the end-mount. In such an embodiment, the number, dimensions, and/or circumferential spacing of the mating splines may be selected to provide the desired incremental adjustability of the circumferential orientation of the end mount relative to the bracket-adapter. For instance, in one embodiment, the splines may be configured to allow for adjustments of the circumferential orientation of the end mount relative to the bracket-adapter in circumferential increments corresponding to less than 90 degrees, such as less than 45 degrees or less than 30 degrees, or less than 20 degrees or less than 15 degrees or less than 10 degrees, and/or any other subranges therebetween.

Moreover, one separate aspect of the mounting assembly disclosed herein is the ability to use assembly components, including modular adapters, that couple with a bracket-adapter configuration to allow various types and sizes of shade assemblies to be mounted to a variety of types and sizes of brackets. This may be beneficial, for example, where a larger bracket is desired for appearance purposes even though a smaller bracket may be sufficient to support a cover assembly. The bracket-adapter and the various brackets have a conformity of configurations to simplify the coupling of mounting assembly components thereto because the cover assembly to be mounted may have different proportions (such as in one non-limiting example, the rotating element may be larger) or may be mirror image structures (such as in one non-limiting example, the left and right ends of a cover assembly). The conformity of the brackets and bracket-adapters creates a modularity of the bracket-adapters to allow a single type of bracket-adapter to be used for mounting more than one type of covering to a support structure, which allows ready interchangeability of coverings as well as reduced inventory for brackets and mounting assembly components. Because differently sized shades may require differently sized or structured mounting components, by including a mounting structure on each bracket that may receive various mounting components, the bracket becomes a generic element of the mounting assembly and allows interchangeability of the shade-specific mounting components. Rotating member size-adapters, each sized for a particular shade, may be included in the mounting assembly, which in combination with the other shared assembly components, allows a variety of different sized shades to be coupled to the single type of bracket. This reduces the number of components needed to mount various types of shades, and allows more consistent and reliable mounting and adjustment to reduce and avoid potential product performance, maintenance, and failure issues.

In one example, a mounting assembly may be utilized to couple with two differently-sized shade assemblies by modifying a minimal number of components, and in some examples only one component, of the mounting assembly. In this example, a mounting assembly includes at least one bracket having an engagement structure mountable on a support structure to couple with and support a first cover assembly or a second cover assembly. The first cover assembly includes an end mount configured to couple with the bracket. The end mount may include a first plurality of components configured to couple with the engagement structure of the bracket. A second cover assembly different than the first cover assembly also includes an end mount configured to couple with the bracket. The second end mount includes a second plurality of components configured to couple with the engagement structure. The first and second pluralities of components are, in this example, of substantially identical size and/or structure but for at least one component type common to the mounting assemblies. The at least one component is changeable to allow the cover assembly to be changed (such as to have a larger diameter) but still use the same bracket and other mounting assembly components. For instance the individual component is, in this example, sized to match the diameter of the rotating member of the cover assembly. Additional components may also be sized or otherwise configured for specific shade assemblies and interchangeable, as desired, based on the cover assembly to be mounted.

In one non-limiting example, a mounting structure formed on each bracket may be configured to receive either a control-end bracket-adapter or an idle-end bracket-adapter. More than one mounting structure may be formed on each bracket to accommodate variation of the corresponding structure on the respective control-end or idle-end bracket-adapter. In one non-limiting example, a mounting structure may be formed by a pattern of apertures. Where the pattern of apertures is different for a control end bracket-adapter compared to an idle end bracket-adapter, or for a larger bracket-adapter and a smaller bracket-adapter, both aperture patterns may be formed on the same bracket to allow coupling with a corresponding bracket-adapter.

Additionally, a modular mounting assembly is provided that includes at least one bracket, having a mounting structure, configured to couple with a support structure and for supporting at least one end of the cover assembly; and at least one mount component may be rotatably coupled with an optional cover assembly size-adapter. The mount component and the optional cover assembly size-adapter may be coupleable with either end of the cover assembly. The mount component, whether alone or together with the optional cover assembly size-adapter, may often be referred to herein simply as an "end mount." The mount component defines an engagement portion configured to couple with, such as by engaging, the components of the mounting assembly already mounted on the bracket. In some instances, the mounting structure includes a first adapter, and the engagement portion of the mount component is coupled with the first adapter (also often referred to herein as an engagement structure) to couple to the bracket. In other instances, the first adapter defines a seat, and the engagement portion of the mount component is coupled to, such as being received in, the seat to couple to the bracket. In some instances, a cover assembly size-adapter is coupled with, such as being received in, the first end of the cover assembly, and the at least one mount component is coupled to, such as in one example by being received within, the first cover assembly size-adapter. To engage a differently sized cover assembly on the same bracket, the cover assembly size-adapter may be selected that matches the size of the desired cover assembly, and used with the same mount component to engage with the bracket. Alternatively, in some instances, a cover assembly having a larger size, collar adapter may be coupled to the existing cover assembly size-adapter in order to non-rotatably engage a larger diameter cover assembly. This allows a single-sized cover assembly size-adapter to be used with different shade assemblies each having different diameters.

In another example, at least one bracket may be pre-mounted adjacent an architectural feature, and mounting assembly components pre-positioned on the cover assembly. The mounting assembly components may include one or more components coupled to the cover assembly and configured to engage the bracket to couple with an end of the cover assembly. Different brackets may be used depending on such features as the size of the cover assembly. At least one component or feature of the mounting assembly may be varied, such as depending on the size of the cover assembly and/or whether a driving member or other additional structure is provided at the end of the cover assembly in which the mount component is coupled. For instance, the mount components may include a control end rotating member end mount configured for mounting at an end of a cover assembly in which a motor is housed; or an idle-end rotating member end mount configured to couple the end of the cover assembly opposite the mechanism which controls operation of the cover assembly. In this example, at least one component is constant and is capable of being coupled at one portion or end to various types of brackets and at another portion or end to various types of components mounted on the cover assembly. In one embodiment, the constant component, which in one example may be a bracket-adapter, is coupled to the bracket, and the other components are coupled with the cover assembly for engagement with the already-mounted constant component coupled to the already-mounted bracket. In another embodiment, the constant component, which in this example may be a rotating member size-adapter, is coupled to the cover assembly for engagement with the already-mounted bracket.

In another independent aspect, the mounting assembly utilizes a component structure that may facilitate the reduction of a light gap formed between the edge of the extended shade material and the periphery of the architectural feature, such as an opening, adjacent to which the cover assembly is mounted. A light gap may also be formed between adjacent edges of the shade materials for coverings positioned next to each other. By reducing the dimension of the light gap between the edge of the extended shade material and the outside edge of the mounting bracket, the amount of light passing therebetween is reduced. The components of the mounting assembly may be nested within one another to reduce the size (e.g., width) of the mounting assembly and move the cover assembly closer to the bracket. Another separate and optional aspect that may reduce the light gap is the use of material in making the bracket that may have reduced thickness. Either or both of the above aspects may aid in reducing the width of the component structure of the mounting assembly, and the edge of the shade material may be brought significantly closer to the mounting bracket supporting the end of the cover assembly.

Another independent aspect of the mounting assembly may be the ease by which the cover assembly is mounted with the support structure adjacent an architectural feature. The mounting assembly may facilitate more efficient mounting of the cover assembly, fewer corrections of mounting mistakes, and easier installation of the cover assembly at the installation site. In one non-limiting example, the mounting assembly includes a first bracket including a first seat, and a second bracket including a second seat. A first end mount is rotatably coupled with a first end of the cover assembly, and a second end mount is rotatably coupled with a second end of the cover assembly. In mounting the cover assembly to the support structure using the mounting assembly, the first end mount axially engages the first seat in a spear motion, and the second end mount engages the second seat. In another non-limiting example, the second end mount is received laterally, such as in one example by sliding, into the second seat. In some instances, the first bracket defines an aperture for receiving a first bracket adapter, and the first seat is defined in the first bracket adapter. In some instances the first bracket adapter may be received in the aperture in more than one orientation.

In another aspect, the mounting assembly described herein may provide an integrated assembly structure beneficial for mounting a cover assembly to varied types of support structures. The components may be configured to accommodate rotatably mounting a cover assembly to brackets in any of a variety of orientations as dictated by the unique structural configuration of the architectural feature to which the cover assembly is to be mounted. More specifically, a mounting assembly is provided that includes at least one bracket, including a mounting structure, configured to couple to a support structure and an end mount coupled to an end of the cover assembly and including an engagement portion configured to couple with the bracket. The end mount may include a mount component and a cover assembly size-adapter. The cover assembly size-adapter may rotatably couple with the mount component and non-rotatably engage the cover assembly. The cover assembly may be coupled with the bracket by the engagement portion of the end mount coupling to the engagement structure of the bracket. The engagement structure may, in some examples, be oriented within the bracket in a variety of ways, which allows adjustment of the mounting assembly to accommodate the particular structure surrounding the architectural feature. In one non-limiting example, the engagement structure is formed on a bracket-insert. The bracket-insert may be coupled with the bracket by a mounting structure formed in the bracket. The mounting structure may be configured to allow the bracket-adapter to couple with the bracket in more than one orientation. Since the engagement structure is formed in the bracket-adapter, the change in orientation of the bracket-adapter changes the orientation of the engagement structure. The change in orientation of the engagement structure may alter the direction from which an end mount component may enter and couple with the engagement structure. In one non-limiting example, the cover assembly size-adapter may be optional, such as where the mount component is sized and configured to rotatably receive the cover assembly and the cover assembly size-adapter is not needed.

Moreover, one aspect of illustrative examples of mounting assemblies as described herein is that at least one may be oriented to suspend the covering from a ceiling, from a wall, or in many other orientations. The particular support structure surrounding an architectural feature can complicate the installation of a covering. The brackets for supporting the covering need to be mounted adjacent the architectural feature, and the support structure may sometimes be oriented to create difficulties in mounting the covering to the brackets. In various embodiments, the brackets of the disclosed mounting assembly are configured to facilitate installation of the covering even when such difficulties are encountered. Additionally, an installer may decide to change the orientation of a bracket during the installation of a covering, which in some instances would cause a delay due to the ordering of any new or different components. In this circumstance, the modularity of embodiments of the disclosed mounting assembly may allow the installer to reconfigure the mounting assembly in real time without having to order different parts and possibly delay the installation. The mounting assembly, in at least one example, thus facilitates the mounting of a covering on a support structure where the brackets may be mounted on many different areas of a support structure adjacent to an architectural feature, including a back wall, a side wall or a vertical, horizontal, or angled frame member, or a ceiling. The mounting brackets may be one of many types, e.g., L-shaped for ceiling or back wall mounts, "cassette"-type for side wall mounts, or box-type brackets for all three options. Where the mounting bracket of choice includes the mounting structure configuration shared between modular components of the mounting assembly, such as for instance an aperture(s), then many types of coverings with appropriate components and adapters having the corresponding modular mating geometry may be coupled to the brackets.

As indicated above, a mounting assembly may generally include a combination of two or more individual components coupled together to mount an end of a cover assembly to a support structure. Additionally, in several embodiments, the components in a mounting assembly for an idle-end of the cover assembly may, at least in part, have different configurations than the components in a mounting assembly for a control end of the cover assembly. In general, the components of a mounting assembly include a bracket, a bracket-adapter (in some embodiments), and a rotating member end mount. All of these components are assembled together to support the cover assembly on the support structure. In one example, the bracket is coupled to the support structure, and the bracket-adapter is coupled to the bracket. The rotating member end mount is positioned on an end of a cover assembly. To mount the cover assembly on the support structure, the rotating member end mount is coupled to the bracket-adapter. In one embodiment, the portions of each component that couple together have functional configurations of the engagement structure that are sufficiently consistent or substantially common, which allows coupling despite variations in aspects of the configuration that are not critical to the coupling engagement of such components. Some of these variations may include, for example, size, proportion, or other insubstantial non-functional variations. This means that, in at least one embodiment, each component that engages together has a common configuration, and, even with some structural differences, the basic functional structure of the configuration is sufficiently consistent and allows the desired engagement. The term "consistent" as used herein is intended to convey sufficient uniformity of the functional configurations of the engagement structure, such that the intended coupling between components is achievable. For example, a first component and a second component may couple together to define an engagement structure between them. A third component may vary structurally or functionally from the first component, yet may still include enough of the structural features (e.g., all or fewer than all) of the first component to couple with the second component and define the same or similar engagement structure.

In one example, as noted above, while two brackets may each have a different overall shape (e.g., "L-shaped" and "flat-shaped"), both brackets may also include a sufficiently consistent or substantially common configuration of the mounting structure configured to couple with a bracket-adapter. Similarly, while each of the two bracket-adapters may have a different structure configured to couple with a particular end (e.g., control-end or idle-end) of the cover assembly, both bracket-adapters may have a sufficiently consistent or substantially common configuration to mate with the mounting structures formed on either of the brackets. Additionally or alternatively, each of the two brackets may have more than one structure, one configured to couple with the control-end and one configured to couple with the idle-end of the cover assembly. In this way, the mounting structure on each bracket has a sufficiently consistent or substantially common functional configuration (e.g., such as each bracket including a mounting structure having a shared, or sufficiently similar, structural shape) to engage with one of (or both of) the bracket-adapters, despite the brackets having different structural variations (e.g., "L-shaped" or "flat-shaped"). Also, each bracket-adapter may have a sufficiently consistent or substantially common functional configuration to engage with the mounting structure on one of (or both of) the brackets, despite the bracket-adapters having different structural variations (e.g., an engagement structure for an idle-end or a control-end of the cover assembly).

In another example, while the engagement portion of a control-end rotating member end mount is different than the engagement portion of an idle-end rotating member end mount, both end mounts each have, for example, another portion that defines a sufficiently consistent or substantially common structural configuration for engaging with either end of a cover assembly, and specifically with either end of the rotating member of a cover assembly. In this way, the portion of an end mount coupling with the control end of the cover assembly and the portion of an end mount coupling with the idle-end of the cover assembly each has a sufficiently consistent or common functional configuration to achieve the desired engagement with the cover assembly.

In another example, a mounting assembly for a cover assembly is provided where the cover assembly includes a rotating member. The mounting assembly includes at least one control-end bracket adapter defining an engagement structure, and at least one idle-end bracket-adapter defining an engagement structure. A plurality of brackets is provided, where each may have sufficiently consistent configurations of a mounting structure for engaging the at least one idle-end bracket-adapter or the at least one control-end bracket-adapter. At least one rotating-member end-mount is included, that is coupled adjacent to an end of the rotating member. The engagement structure in each of the at least one control-end bracket-adapter and idle-end bracket-adapter is configured to receive the at least one rotating-member end-mount. Further, the mounting structure may include a primary aperture and at least one fastening aperture. Additionally, the at least one fastening aperture may include at least two fastening apertures formed in a pattern. In some instances, the at least one control-end bracket adapter and the at least one idle-end bracket-adapter are each configured to be coupled to any of the plurality of brackets using one or both of the primary aperture and the at least one fastening aperture. In further examples, the at least one control-end bracket-adapter is configured to be coupled to any of the plurality of brackets using the at least one fastening aperture. In another example, at least one control-end bracket-adapter may be configured to be coupled to any of the plurality of brackets using the pattern formed by the at least one fastening aperture. Additionally, the at least one idle-end bracket-adapter may be configured to be coupled to any of the plurality of brackets using both the primary aperture and the at least one fastening aperture. In another example, the at least one idle-end bracket-adapter is configured to be coupled to any of the plurality of brackets using the primary aperture and the pattern formed by the at least one fastening aperture.

In still other examples of the mounting assembly, at least one of the at least one rotating member end mount includes an end forming an engagement portion configured for coupling to the engagement structure of the control-end bracket-adapter. In one embodiment, the engagement structure may include a seat formed between opposing rails, and the engagement portion in turn may include a plate having opposing edges. The plate may be received in the seat, with the opposing edges engaging the opposing rails.

In a further example of the mounting assembly, at least one of the at least one rotating member end mount may include an end forming an engagement portion configured for coupling to the engagement structure of the idle-end bracket adapter. Additionally, the engagement structure may include a seat including a wall forming a female engagement feature (e.g., a cavity), and the engagement portion may include a male engagement feature (e.g, a boss structure). In one embodiment, to couple the engagement portion with the seat, the boss structure may be received in the cavity. Moreover, in one example, the coupling with the seat may be in a non-rotatable manner.

In other examples, a mounting assembly is provided, where the cover assembly has a control-end and an idle-end, and the mounting assembly may include at least one control-end bracket-adapter coupleable with at least one bracket, with the control-end bracket-adapter defining an engagement structure. Additionally, at least one idle-end bracket-adapter may be coupleable with at least one bracket, with the idle-end bracket-adapter similarly defining an engagement structure. A plurality of rotating-member end-mounts each may include sufficiently consistent configurations of a coupling portion for rotatably engaging either of the control-end or the idle-end of the cover assembly, and each also has an engagement portion configured to couple with the engagement structure of the at least one control-end bracket-adapter or to couple with the engagement structure of the at least one idle-end bracket-adapter. Further, in one embodiment, each of the plurality of rotating-member end-mounts include an end-mount defining an engagement portion and the coupling portion. In embodiment, the coupling portion of each of the end-mounts is defined by a cylindrical boss, where the coupling portion of each of the end-mounts may be defined by a size-adapter rotatably coupled to the end-mount.

In a further example of a mounting assembly for a cover assembly, where the cover assembly including a control-end and an idle-end, the mounting assembly includes at least one control-end bracket-adapter coupleable with at least one bracket and defining a first engagement structure, at least one idle-end bracket-adapter coupleable with at least one bracket and defining a second engagement structure, and a plurality of rotating member end mounts rotatably coupleable with either the control-end or the idle-end of the cover assembly. Each of the plurality of rotating member end mounts may have sufficiently consistent configurations of an engagement portion that are configured to either couple with the first engagement structure of the at least one control-end bracket-adapter or to couple with the second engagement structure of the at least one idle-end bracket-adapter.

The modularity of the components of the mounting assembly may allow for bracket to be used to mount a variety of different shade assemblies to a support structure. For example, a larger diameter cover assembly may be substituted for a smaller diameter cover assembly during production of custom orders by replacing the size-adapter component of the mounting assembly, and without changing any other components in the product package. The modification of the size-adapter would also allow an existing cover assembly to be replaced with a new cover assembly having a different diameter without having to remove existing mounting brackets. Modular components, such as bracket-adapters configured to couple to brackets (e.g., via universal bracket features on the bracket) and also couple to particular shade types and sizes, may be included in such mounting assemblies. A variety of differently sized adapters may be coupled to the single type of bracket so that coverings requiring a variety of different-diameter rollers may be mounted thereon.

Because the variety of brackets are configured, at least in one embodiment, to receive bracket-adapters that are themselves configured to couple with a variety of shade assemblies, as described below, fewer differentiated parts are required to couple various sized shade assemblies with different bracket types. As such, a number of previously required parts or components for mounting may be reduced, leading to a reduction of parts in inventory. Tooling costs may also be reduced as fewer configuration features on parts are required. Greater economy of scale can thus be achieved by increasing the volume of production for fewer types of components. Further, different sizes of components for coverings may become interchangeable.

Additionally, an independent aspect of the illustrative mounting assemblies disclosed herein is that at least one has an integrated component configuration that may reduce the associated light gap, which may be defined as the distance between the lateral edges of the shade material and the wall or window frame, or adjacent covering, through which light can escape around the covering. Light gap reduction may be achieved by reducing the size of the component configuration that attaches the cover assembly to the bracket. For instance, by positioning the adapters and components, which are used to couple the cover assembly to the brackets, at least partially within one another, and/or at least partially within an internal cavity of or coupled with the shade assemblies, the edge of a shade material may be positioned in very close proximity to the bracket (including, fix example, a proximity closer than shown in the prior art), thereby significantly reducing the dimension of the light gap. Additionally, or alternatively, reducing the thickness of mounting brackets, such as in one example by using stamped sheet metal, allows more close spacing of the shade material to adjacent structure (whether a support structure or an adjacent covering). Further reduction of the light gap may be accomplished, in combination or independently, by nesting coupling features within the thickness of the mounting brackets, for instance, by using counter-sunk apertures for the fasteners used to mount the bracket-adapters to the bracket.

In another independent aspect of the disclosure, the brackets and various other components of the mounting assembly may be designed with the function and limitations of the different components in mind. For instance, the components that may suitably function with low dimensional tolerance are made accordingly, and the components that benefit from and/or require having high dimensional tolerance are also made accordingly; and both are made in a manner that allows a satisfactory assembly of the two. In one example, while a cover assembly is mounted to a support structure by a bracket, the cover assembly does not directly engage the bracket but, instead, is coupled to the bracket by other mounting assembly components. This allows the bracket to be made with a simplified structure, and additionally because the cover assembly does not directly engage the bracket, the simplified structure may be made by a less expensive method having low dimensional tolerances. In one non-limiting example, the bracket may be made of a thin layer of inexpensive flat metal, and its configuration, including the mounting structure to couple with a bracket-adapter, may be formed by stamping, which is inexpensive and has relatively low dimensional tolerances. In contrast, some or all of the mounting assembly components that couple between the cover assembly and the bracket are made or formed to have a higher dimensional tolerance for a precise fit to allow for efficient and low maintenance operation. In one example, at least one of the remaining components is made by injection molding, which results in high dimensional tolerance. For instance, in one embodiment, the bracket-adapter is made by injection molding, and is coupled to the mounting structure of the bracket. The bracket-adapter has a high-dimensional tolerance, and in turn precisely engages the other components, such as the rotating member end mount, which in turn engages the cover assembly. In this way, the mounting assembly may be made less expensive by using lower tolerance, less expensive techniques to form the brackets, and also using higher-tolerance components where helpful to create a precise and high-quality cover assembly.

In other non-limiting examples, a covering having a cover assembly with opposing ends may be mounted on a support structure by one or both opposing ends being mounted on the support structure by a mounting assembly. The mounting assembly includes components coupled with the end of the cover assembly and components mounted on the support structure. One end of the roller member may be a control-end (e.g., it may couple with an operating system to control the operation of the covering), and an opposite end may define an idle-end (e.g., which at least rotatably supports the end opposite the control end), in which case a control-end mounting assembly couples the control-end of the cover assembly to the support structure, and an idle-end mounting assembly couples the idle-end of the cover assembly to the support structure. The control end mounting assembly and the idle end mounting assembly may include many components sharing a similar structure or function, or may include few or no components sharing a similar structure or function. As with the other illustrative examples, the control-end mounting assembly may include a combination of components coupled with the control-end of the cover assembly and configured to couple with components mounted on the support structure. Likewise, the idle-end mounting assembly may include a combination of components coupled with the idle-end of the cover assembly to in turn couple with components mounted on the support structure. When these components are coupled together, they form the respective control-end or idle-end mounting assembly. Use of the mounting assembly, whether the control-end mounting assembly or the idle-end mounting assembly, facilitates a simple, repeatable, and secure installation of the cover assembly on a support structure. In some examples the installation may include a spear motion to engage the mounting assembly of one end of the cover assembly, and may include a sliding motion to engage the mounting assembly at the opposite end of the cover assembly.

In one embodiment, the control-end mounting assembly may include a control-end rotating member end mount positioned on or adjacent to the control-end of the cover assembly and coupled to an engagement structure of a mounting bracket, which is coupled to a support structure. The control-end rotating member end mount may include at least a control-end-mount defining an engagement portion. An optional control-end rotating member size-adapter may be coupled with a coupling portion of the control-end mount, if beneficial, to couple with the control-end of the cover assembly. The control-end rotating member size-adapter is also referred to herein as the cover assembly size-adapter. The mounting bracket may include a bracket-adapter coupled with a mounting structure of the mounting bracket. The bracket-adapter couples with the bracket to configure the bracket to couple with the other components of the mounting assembly to in turn couple with a control-end of the cover assembly, in one embodiment, the bracket defines an engagement structure, which in this example is formed on the bracket-adapter coupled with the bracket, and a retention structure. The control-end-mount may be coupled with the mounting bracket by the engagement portion of the control-end-mount being received in the corresponding engagement structure of the bracket-adapter, and retained therein by the retention structure. In one example, the control-end-mount may slide laterally or axially into the engagement structure. To allow the control-end of the cover assembly to de-couple from the bracket, the retention structure is actuated (e.g., by pivoting the retention structure relative to the end mount), which releases the engagement portion of the control-end-mount from the engagement structure of the bracket. In one example, the engagement structure on the bracket may include a seat having an opening or entry. In this example, the engagement portion of the control-end-mount is received in the seat of the engagement structure, and retained therein by the retention structure. For example, the engagement portion of the control-end-mount may be positioned in the seat of the bracket-adapter by sliding the engagement portion laterally through the opening or entry of the seat in order to be received in the engagement structure.

The idle-end mounting assembly may include an idle-end rotating member end mount positioned on or adjacent to the idle-end of the cover assembly and coupled to an engagement structure of a mounting bracket, which is mounted to a support structure. The idle-end of the cover assembly may optionally include a component of the drive mechanism for the covering. In one embodiment, the idle-end rotating member end mount may include at least an idle-end-mount defining an engagement portion, and optionally an idle-end rotating member size-adapter rotatably coupled with the coupling portion of the idle-end mount. Additionally, in one embodiment, the bracket may include a bracket-adapter operably coupled with the commonly configured mounting structure of the bracket. In such an embodiment, the bracket-adapter couples with the bracket to configure the bracket to couple with the other components of the mounting assembly, which in turn couple with the idle-end of the cover assembly. In one embodiment, the bracket defines an engagement structure configured to couple with the idle-end mount. As noted elsewhere herein, in this example, the bracket couples with a bracket-adapter, with the engagement structure formed on the bracket-adapter. In other examples, however, no bracket-adapter is included as part of the mounting assembly and the engagement structure is formed directly on the bracket.

In one embodiment, the idle-end-mount may be coupled with the bracket by the engagement portion of the idle-end-mount being received in the engagement structure of the idle-end bracket-adapter. In this example of the idle-end mounting assembly, the engagement portion of the idle-end-mount may be positioned in the seat of the bracket-adapter by spearing the engagement portion axially into the engagement structure. In one example, the engagement structure on the bracket may define a seat having an opening or entry. In this example, the engagement portion of the idle-end-mount is received through the entry and into the seat of the engagement structure. For instance, the engagement portion of the control-end-mount may be positioned in the seat of the bracket-adapter by spearing the engagement portion axially through the opening or entry of the seat in order to be received in the corresponding engagement structure.

In another introductory non-limiting illustrative example of a mounting assembly for mounting a covering on a support structure, the mounting assembly may support at least one end of the cover assembly on a wall or the like. The opposite end of the cover assembly may be supported on the wall in any of a variety of manners. The mounting assembly may include a number of modular components assembled together, such as a bracket for attachment to the wall, with a mounting structure formed in the bracket. Additionally, a bracket-adapter may be coupled to the bracket by engagement with the mounting structure. Additionally, an engagement structure may be formed on the bracket-adapter. Further, a mount may be coupled to the end of the cover assembly for selective coupling with the engagement structure on the bracket-adapter. The mounting assembly may also optionally include a rolling-member size-adapter to allow for a variety of different shade assemblies, for instance having different diameters, to couple with the mount for support by the bracket. The cover assembly may be supported at one end, or optionally may be supported at both ends, by a mounting assembly.

Where both ends of a cover assembly are mounted to a support structure by a mounting assembly, each mounting assembly may have the same, different, or a mix of component structures and/or may have the same or different number of components. In one example, the mounting assembly component structures at either end may be different except for the bracket used at each end. For example, the bracket at each end may be substantially identical, and may include the same or similar mounting structure to which an end of the cover assembly is coupled through the mounting assembly. In one illustrative example, a cover assembly may have a control-end and an opposing idle-end. The “control-end” of the cover assembly may include a portion of the manual or automated mechanism for controlling the extension and retraction of the cover assembly. The “idle-end” of the cover assembly may include structure configured to allow the cover assembly to be rotatably supported. At the control-end, a control-end bracket-adapter couples to a bracket, and a control-end rotating member end mount couples with the control-end of the cover assembly. The control-end rotating member end mount couples to the engagement structure of the control-end bracket-adapter. At the idle-end, an idle-end bracket-adapter couples to a bracket, and an idle-end rotating member end mount couples with the idle-end of the cover assembly. The idle-end rotating member end mount couples to the engagement structure of the idle-end bracket-adapter.

One beneficial aspect of the mounting assembly disclosed herein may be the simplified coupling of an end of a cover assembly and a respective bracket. The end of the cover assembly may include an end mount portion of the mounting assembly. The end mount defines an engagement portion that couples with the bracket. Additionally, the bracket may include a bracken-adapter having an engagement structure configured to couple with the engagement portion of the end mount to couple the end of the cover assembly to the bracket. In one embodiment, the engagement structure of the bracket-adapter and end mount are configured to mate together. In an example where the engagement portions at each opposing end of a cover assembly are different from each other, such as between the control-end and idle-end, the respective engagement structures formed on each bracket may be different from each other. The coupling of different engagement portions with the appropriate engagement structure on a bracket may be accommodated by coupling the bracket-adapter having the corresponding engagement structure to the bracket. Because the bracket-adapter is coupled with the bracket by a mounting structure, in one example an aperture or apertures having a defined configuration, more than one bracket-adapter may be used with the bracket; which in this example would be the bracket-adapter including the particular engagement structure for the intended coupling with the corresponding engagement portion of the end mount. For instance, and as noted above, the cover assembly may, for example, have a control-end and an idle-end each having an end mount with a unique engagement portion. In this example, the bracket configured to couple with the control-end may include a bracket-adapter having an engagement structure for mating with the engagement portion of the control-end mount. Similarly, the bracket configured to couple with the idle-end may include a bracket-adapter having an engagement structure for mating with the engagement portion of the idle-end mount.

In one illustrative embodiment, a mounting assembly includes a pair of brackets each having a mounting structure and each mountable on a support structure to engage and support a first cover assembly or a second cover assembly. The first cover assembly includes opposing first and second ends for engagement with the first and second brackets, respectively. At least the first end of the first cover assembly includes a first plurality of components configured to couple with the mounting structure in the first bracket. A second cover assembly different from the first cover assembly has opposing first and second ends for engagement with the first and second brackets, respectively. At least the first end of the second cover assembly includes a second plurality of components configured to couple with the mounting structure. The first and second pluralities of components are of identical size or structure, but for one individual component type. This individual component may be changeable to allow the cover assembly to be used with the same bracket. For instance, the individual component may be changed (such as by being replaced with a larger or smaller component) but still use the same bracket and other mounting assembly components. For instance, the individual component is sized to match the diameter of the cover assembly.

In another example, a modular mounting assembly is provided that includes at least one cover assembly having an end, at least one bracket including a mounting structure for coupling to a support structure and for supporting the cover assembly. At least one rotating member size-adapter is non-rotatably engaged with the cover assembly adjacent an end thereof, and at least one modular component is non-rotatably coupled adjacent an end of the cover assembly, and rotatably coupled with the rotating member size-adapter. The modular component defines an engagement portion. The engagement portion is coupled to the mounting structure. In some instances, the mounting structure includes a first bracket-adapter, and the modular component defining the engagement portion is coupled with the first bracket-adapter. In other instances, the bracket-adapter defines a seat, and the engagement portion is received in the seat to couple to the bracket. In some instances, a rotating member size-adapter is received in the first end of the cover assembly, and the at least one modular component is received in the rotating member size-adapter. To engage a differently sized cover assembly on the same bracket, the rotating member size-adapter may be selected that matches the size, such as for example, an inner radius of a rotating member (e.g., one having a hollow tubular structure) of the desired cover assembly, and used with the same modular component to engage with the bracket. The rotating member size-adapter may be optional in some examples, such as where the modular component may rotatably receive the cover assembly directly. In some examples, the modular component may be an end mount, which may include a mount component.

Additionally, in one example, a mounting assembly may support one or both ends of a cover assembly. Where the mounting assembly is used to mount both ends of the cover assembly, the mounting assembly on either end may include a component or components having shared configurations and functions, which may simplify the installation of the cover assembly, may reduce the number of components in the mounting assembly, and/or may accommodate the installation of a variety of shade sizes and types. Generally, the mounting assembly may include a uniform configuration that may simplify and reduce the number components in the mounting assembly, even where the covering may have different physical proportions, such as in one example a large diameter rotating member.

Illustrative examples of various mounting assemblies are described below.

An example of a mounting assembly for mounting one embodiment of a covering 100 relative to an architectural feature is shown in FIG. 1. This example of a mounting assembly includes, for example, various features in common with the other modular mounting assemblies disclosed herein. The illustrated covering 100 includes a cover assembly 114, with the shade material 115 (see FIG. 38) removed and the rotating member 102, which is just one example of a structure for use in a cover assembly, shown in dashed lines for clarity of other features. The rotating member 102 defines opposed ends, such as a control-end 104 and an idle-end 106. It should be appreciated that the terms "control-end" and "idle-end" are simply used herein to distinguish the opposed ends of the rotating member 102 and/or to distinguish or identify components configured to be coupled to a given end of the rotating member 102, thus, are used without intent to limit the scope of the present subject matter.

The mounting assembly disclosed herein in one illustrative example includes mounting brackets 116 and other components that may be coupled together to support either or both of the control-end 104 and the idle-end 106 of the cover assembly 114. In another example, the mounting assembly is configured for use as a control-end mounting assembly 124. In a further example, the mounting assembly may be configured for use as an idle-end mounting assembly 126. In the description below, reference is made to the various examples of mounting assemblies coupling with a rotating member in order to describe the function, structure, and operation of the various examples of the mounting assemblies. In many examples, a mounting assembly is coupled to a component of a cover assembly, such as in one example a rotating member, to facilitate mounting of the cover assembly with the mounting assembly. A mounting assembly, or a portion of a mounting assembly, may also be coupled with a rotating member to form a sub-component assembly of a cover assembly.

The covering 100 may include an operating system for causing the cover assembly 114 to actuate and extend or retract the shade material 115. The operating system may, for example, include a drive assembly 108 operatively coupled with the rotating member 102, and in some examples, may be positioned at least partially within the rotating member 102. The drive assembly 108 may optionally include a motor assembly 110 alone or in combination with a control assist unit 112 to aid the motor assembly 110 in the operation of the covering 100, and more specifically, may actuate the cover assembly 114 to extend and retract shade material 115. The motor assembly 110 may include an electric motor, and the control assist unit 112 may include a torsion spring mechanism, with each contemplated as embodying other structures. The motor assembly 110 may be located adjacent the control-end 104 of the rotating member 102, and may be operably coupled to the mounting bracket 116 of the covering 100 in a manner that resists torsion loads. The drive assembly 108 may also include a drive structure 118 that is engaged with the inner surface of the rotating member 102 to cause the rotating member 102 to rotate in the direction the motor assembly 110 is driven. The drive assembly 108 may include an electric motor driven mechanism, a manual mechanism, or other mechanisms. An example of a manual mechanism may include, but is not limited to, a gear transmission system actuated by a control cord operated by a user, or other types of drive assemblies.

The optional control assist unit 112 in FIG. 1 may be coupled, such as through the idle-end mounting assembly 126, with the mounting bracket 116 at the idle-end 106 of the rotating member 102. The control assist unit 112 may include a spring element 99 and an assist structure 122 that is engaged with the inner surface of the rotating member 102 and to the spring element 99. The assist structure rotates with the rotating member 102 to store energy in the spring element 99 when the shade material 115 is extended, and to apply the spring energy to aid the motor assembly 110 upon retraction of the shade material 115.

Optionally, the covering 100 may include a limit stop assembly 117 to control the extension of the shade material 115. The limit stop assembly may be coupled, such as through the idle-end mounting assembly 126, with the mounting bracket 116. The limit stop assembly may include a non-rotatable threaded rod 119 on which an end nut 121 is positioned. A limit nut 123 is also received on the threaded rod and is coupled to the rotating member 102 so that the limit nut 123 moves along the length of the threaded rod 119 responsive to the rotation of the rotating member 102. At an end of the threaded rod 119, the limit nut 123 engages the end nut 121, which inhibits the further travel of the limit nut 123. The end nut 121 is positioned at a location on the threaded rod 119 to stop the limit nut 123 when the shade is at the desired extension position.

The control-end mounting assembly 124 couples the control-end 104 of the rotating member 102 to a support structure adjacent an architectural feature in a simple installation. In one embodiment, installation of the rotating member 102 relative to a support structure using the control-end mounting assembly 124 may, for example, create a reduced light gap between the shade and the support structure. The control-end mounting assembly 124 may also accommodate differently sized shade assemblies having differently-sized rotating members. In one embodiment, the control-end mounting assembly 124 includes closely-integrated component parts that couple together in a nesting manner with the control-end 104 of the cover assembly 114, as well as with the mounting bracket 116. The nesting manner of the assembly reduces the width of the control-end mounting assembly 124 and allows for the reduced light gap. In one embodiment, the control-end mounting assembly 124 may include a control-end bracket-adapter 128 as an interface structure between the control-end 104 of the cover assembly 114 and the mounting bracket 116. In such an embodiment, one portion of the control-end bracket-adapter 128 couples with the control-end 104 of the cover assembly 114, and another portion of the control-end bracket-adapter 128 couples with the mounting bracket 116.

Components of one example of the mounting assembly that are included in the control-end mounting assembly 124 configured to couple the control-end 104 of the rotating member 102 to the mounting bracket 116 are shown in FIG. 2. The rotating member 102 is removed for clarity. The control-end mounting assembly 124 may include a mounting bracket 116 receiving a bracket-adapter, in this instance a control-end bracket-adapter 128, a control-end-mount 130 received by the control-end bracket-adapter 128, and a control-end rotating member size-adapter 132, in this instance a control crown, rotatably received over a coupling portion of the control-end-mount 130. The control-end rotating member size-adapter 132 is received in the open end of the rotating member 102 (see FIGS. 1, 23-25) and is non-rotatably attached to the rotating member 102 such that the control-end rotating member size-adapter 132 and the rotating member 102 rotate together. The rotating member size-adapter is sized to have a radius that matches closely the inner radius of the rotating member so as to fit tightly in the rotating member, whether at the control-end or the idle-end of the rotating member. The control-end rotating member size-adapter 132 may be an optional component where the coupling portion of the control-end-mount 130 is properly sized to rotatably receive the control end of the rotating member 102.

Motor assembly 110, is optional, and if present, may be coupled to the control-end-mount 130. The motor assembly 110, in this case, may be coupled to the control-end mounting assembly 124, which is non-rotatably coupled to the mounting bracket 116, such as in one example by the control-end-mount 130. The motor assembly 110 may operate to drive the cover assembly 114 while the control-end rotating member size-adapter 132 allows the cover assembly 114 to rotate freely relative to the control-end-mount 130 at the control-end 104.

The control-end mounting assembly 124 may include fewer components than provided here, or more components than provided here. In a non-limiting example, the mounting bracket 116 in some embodiments may not be considered as a component of the control-end mounting assembly 124. As indicated above, in another non-limiting example, the control-end rotating member size-adapter 132 may not be included where the rotating member 102 is sufficiently sized and shaped to appropriately engage and couple with the control-end-mount 130 and the control-end bracket-adapter 128. It will be appreciated that the rotating member 102 and/or the mount (either the control-end-mount 130 or the idle-end-mount 138) may be configured to permit mounting of the former on the latter without use of a rotating member size-adapter, such as the control-end rotating member size-adapter 132.

The idle-end mounting assembly 126 couples the idle-end 106 of the rotating member 102 to a support structure adjacent an architectural feature in a simple installation. In one embodiment, installation of the rotating member 102 relative to a support structure using the idle-end mounting assembly 126 may, for example, create a reduced light gap between the shade and the support structure. The idle-end mounting assembly 126 may also accommodate differently sized shade assemblies having differently-sized rotating members. In one embodiment, the idle-end mounting assembly 126 may optionally include closely integrated component parts that couple together in a nesting manner with the idle-end 106 of the cover assembly 114, as well as with the mounting bracket 116. The nesting manner of the assembly reduces the width of the idle-end mounting assembly 126 and allows for the reduced light gap. In one embodiment, the idle-end mounting assembly 126 may include an idle-end bracket-adapter 136 as an interface structure between the idle-end 106 of the rotating member 102 and mounting bracket 116. In such an embodiment, one portion of the idle-end bracket-adapter 136 couples with the idle-end 106 of the rotating member 102, and another portion of the idle-end bracket-adapter 136 couples with the mounting bracket 116.

Components of one example of the mounting assembly that are included in the idle-end mounting assembly 126 configured to couple the idle-end 106 to the mounting bracket 116 are shown in FIG. 3. The rotating member 102 is removed for clarity. Specifically, one embodiment of the assembled components of the mounting assembly that create the idle-end mounting assembly 126 for operably coupling the idle-end 106 to the mounting bracket 116 are shown in FIG. 3. The idle-end mounting assembly 126 may, for example, include a mounting bracket 116 receiving a bracket-adapter, in this instance an idle-end bracket-adapter 136, an idle-end-mount 138 coupled with the idle-end 106 of the rotating member 102 and received by the idle-end bracket-adapter 136, and a rotating member size-adapter 140, rotatably received over the idle-end-mount 138 and the idle-end bracket-adapter 136. The rotating member size-adapter 140 is optional where the idle-end-mount 138 is sized sufficiently to rotatably receive a coupling portion of the idle-end of the rotating member. In an example where the control assist unit 112 is included, an optional central shaft 142 of the control assist unit 112 may be received by the idle-end-mount 138 in a fixed orientation and coupled thereto. The idle-end mounting assembly 126 allows the idle-end 106 of the rotating member 102 to rotate freely as needed. In one example, the idle-end rotating member size-adapter 140 and the idle-end-mount 138 may be combined into a single component; however the idle-end rotating member size-adapter 140 may need to be rotatable relative to the idle-end-mount 138. The idle-end rotating member size-adapter is also referred to herein as a cover assembly size-adapter. The idle-end mounting assembly 126 may include fewer components than provided here, or more components than provided here. In a non-limiting example, the mounting bracket 116 in some examples may not be considered as a component of the idle-end mounting assembly 126. Additionally, as indicated above, in another non-limiting example, the idle-end rotating member size-adapter 140 may not be included where the rotating member 102 is sufficiently sized and shaped to appropriately engage and couple with the idle-end-mount 138 and the idle-end bracket-adapter 136.

It should be appreciated that the control-end mounting assembly 124 and the idle-end mounting assembly 126 may be used together on a cover assembly 114, but each may be used separately with another mounting assembly as desired.

Examples of mounting brackets 116, **116*a*, 117*a*, 117*b*, mounting plates 134*a*, 134*b*, and fascia brackets 144 for use with either of the control-end mounting assembly 124 or the idle-end mounting assembly 126 are shown in FIGS. 4, 5, 6, 7, 8, 9, 10, and 11. As will be appreciated, mounting bracket 116 may be embodied in a variety of shapes and structures, such as an L-shaped bracket, such as for open-roll brackets (examples illustrated in FIGS. 4-7); an end plate, such as for a cassette mount (examples shown in FIGS. 8 and 10); or fascia brackets (examples illustrated in FIGS. 9 and 11). In one embodiment, the bracket may be a low tolerance component, where its dimensions are not critical, and may be made of stamped metal, such as steel. The bracket may include a mounting structure sized and shaped or otherwise configured to couple with, such as by receiving, a bracket-adapter, which, in some examples, may be either the control-end bracket-adapter 128 or an idle-end bracket-adapter 136**. In one embodiment, the mounting structure on each bracket has a common configuration, and may in some examples differ somewhat in proportion or size, but still retain the same basic functional structure to couple with, such as by receiving, a bracket-adapter. As such, it will be appreciated that the same bracket, in many instances, may be used for the coupling with either end (e.g., the control-end or the idle-end) of a cover assembly. The variety of brackets configured for use with the other components of a mounting assembly each will include a commonly configured mounting structure, and may be considered as a modular component of a mounting assembly. This allows for compatibility in the mounting of different types and sizes of shade assemblies, such as via the bracket-adapter, and/or such as via appropriately sized and/or shaped mount components which are operably coupled to the bracket-adapter. As described further below, such bracket-adapter may be configured to receive any of a variety of mounting components coupled to the cover assembly. As such, the number of bracket-adapters in inventory may be significantly reduced, as one bracket-adapter may be used with a variety of brackets and/or mount components.

Figure 12:
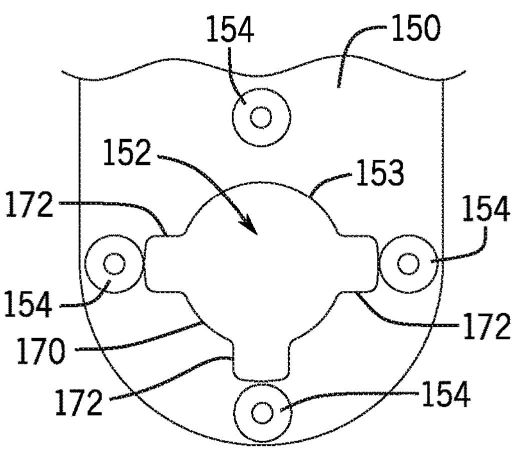
FIG. 12 is a plan view one illustrative example of a mounting structure on a bracket, such as those shown in FIGS. 4-11.

An illustrative example of a mounting structure in a mounting bracket 116 (as well as in the other forms of mounting structures in FIGS. 6, 7, 8, 9, 10, and 11) is depicted in detail in FIG. 12. A mounting structure 152, in this example formed by a primary aperture 153 defined in a first portion 150 of the mounting bracket 116, may function both as a structure for engaging components of the mounting assemblies 124, 126 and/or as an orientation structure for allowing components received in the central aperture 153 to be oriented in one or more ways relative to the mounting bracket 116. The primary aperture 153 may, in one example, be centrally located and may be defined by a generally circular peripheral edge 170. Orientation or alignment "key" features 172 are formed along the peripheral edge 170 to aid in orienting the control-end bracket-adapter 128 or the idle-end bracket-adapter 136 when received in the primary aperture 153. In this example, the alignment key features 172 may be formed by outwardly extending rectilinear notches positioned at intervals, such as every 90 degrees at 3:00, 6:00 and 9:00 (with reference to a clock face). The alignment key features 172 may, instead, be any of a variety of elements, such as without limitation triangles, slots, or scallops that would allow for keying with an opposing control-end bracket-adapter 128 in a number of alternative angular positions. Alternatively, instead of outwardly extending notches, the alignment key features 172 may be tab features that extend radially inwardly from the peripheral edge 170 into the primary aperture 153 to provide the keying functionality. Additionally or independently, the alignment key features 172 may also be positioned at other symmetrical or asymmetrical locations about the peripheral edge 170 of the primary aperture 153, such as in separation increments of 45 degrees, 60 degrees, or larger or smaller increments, by way of non-limiting example. At least one fastening aperture 154 (e.g., a threaded bore), and optionally more than one, such as for example any pattern of fastening apertures, is also formed in the first portion 150 of the mounting bracket 116, and may be used to couple the control-end bracket-adapter 128 in the primary aperture 153 with a fastener, such as a screw fastener. Where there is more than one fastening aperture 154, the apertures 154 may be positioned on the bracket to define a pattern, such as in one example a triangle shaped pattern or in another example an array or grid shaped pattern. Other optional structures to couple or fasten the control-end bracket-adapter 128 to the first portion 150 of the mounting bracket 116 once aligned in the primary aperture 153 are possible, and include for example latches, pins, clips, etc.

As indicated above, the mounting brackets 116, 116*a*, 117*a*, 117*b* shown in FIGS. 4, 5, 6, and 7 may include a first portion 150 defining the mounting structure 152, such as in one example defined by a primary aperture 153 for receiving the control-end bracket-adapter 128, and at least one fastening structure, such as in one example aperture 154 adjacent to and extending in substantial radial alignment with the alignment features 172, for use in operably coupling the control-end bracket-adapter 128 to the mounting bracket 116, e.g., with a set screw (not shown). These primary aperture 153 and alignment features 172 allow the bracket-adapter to be re-oriented within the mounting structure 152. Dimpling 156 may be formed on one or both sides of the first portion 150 of the mounting bracket 116 to create an increased width dimension to allow an adequate friction fit of an optional end cap cover 158 (see FIG. 1, also optionally referred to as an end plate) over the first portion 150 while allowing the thickness of most of the mounting bracket 116 to remain smaller than that of prior brackets, which may enhance the reduction of the light gap as discussed further below. In one example, the end cap cover 158 snaps onto the first portion 150 of the mounting bracket 116 to provide a protective cover and/or a desired aesthetic effect, such as a finished appearance. The mounting brackets 116, 116*a*, 117*a*, 117*b* may also include structure for use in coupling to a support structure. In one example, for instance where the bracket has an L-shape, a second portion 160 extends away from the first portion 150, in this example at a 90 degree angle, having at least one fastening structure, such as in one example an aperture 162 for use in securing the brackets 116, 116*a*, 117*a*, 117*b* to the support structure surrounding the architectural feature. The mounting brackets 116, 116*a*, 117*a*, 117*b* each may be used to support either the control-end 104 or the idle-end 106 of the cover assembly 114. This interchangeability allows fewer brackets to be manufactured and kept in inventory, greatly reducing costs and improving convenience in the installation of shade assemblies.

As noted above, the mounting structure 152, such as in one embodiment a primary aperture 153, formed in the mounting bracket 116 may be a commonly configured shared feature allowing alternative types and configurations of mounting brackets 116 (e.g., as shown in FIGS. 4-9) to be utilized with either the control-end mounting assembly 124 or the idle-end mounting assembly 126. The control-end mounting assembly 124 configured to couple the control-end 104 of the cover assembly 114 to the associated mounting bracket 116 is described first below, with the description of the idle-end mounting assembly 126 configured to couple the idle-end 106 of the cover assembly 114 to the associated mounting bracket 116 described thereafter.

An illustrative example of a control-end bracket-adapter 128 for use on the control-end 104 of the cover assembly 114 is shown in FIGS. 13, 14, 15, and 16. The control-end bracket-adapter 128 is coupled with mounting bracket 116 and includes an engagement structure 129 for coupling with the rotating member 102. The control-end of the rotating member may couple with the engagement structure 129 to couple the cover assembly 114 to the bracket 116. The control-end of the rotating member may include a control-end-mount 130, which is coupled with, such as by being received in, the engagement structure 129. In one embodiment, the rotating member 102 may be selectively coupled with the engagement structure 129 by a retention structure (e.g., structure 131). The retention structure may, for example, be selectively configured to retain the rotating member 102 to the control-end bracket-adapter 128, or to allow the rotating member 102 to separate from the engagement structure 129. In one embodiment, the control-end bracket-adapter 128 may be coupled with the mounting bracket 116 by receipt of a portion of the control-end bracket-adapter 128 within the mounting structure 152.

In one embodiment, the control-end bracket-adapter 128 includes a generally thin and planar main body 176 having a generally circular shape, with a front mount end face 178, also referred to as an adapter end face, and an opposing back bracket engaging face 180. Edge 182 may define a curved or partially circular shape encompassing the majority of the circumference of the main body 176. In one embodiment, the control-end bracket-adapter 128 may be a high-tolerance die-cast part that is simple and reliable to manufacture, and creates a precisely shaped structure when coupled with, such as be being positioned in, the mounting structure 152 of the mounting bracket 116. Other examples of the control-end bracket-adapter may be differently configured, such as having differently-shaped main bodies; and additionally may include one single portion, or one or more separate portions integrated together, or one or more non-integrated separate portions. As such, brackets with lower tolerances, such as the brackets illustrated in FIGS. 4-12, which may, for example, be stamped steel brackets, may be used, reducing manufacturing costs and materials, and the complexity of the structure to be mounted to the architectural feature.

Continuing with FIGS. 13, 14, 15, and 16, in this example, the engagement structure 129 of the control-end bracket-adapter 128 is formed at least in part by opposing rails 184, which are formed on and extend from the front mount end face 178 of the control-end adapter 128. The opposing rails 184 define a seat 186 for receiving the control-end-mount 130. The opposing rails 184 extend along the front mount end face 178 of the control-end bracket-adapter 128. In one embodiment, the engagement structure 129 includes the seat 186 formed by the opposing rails 184 configured to couple with the control-end 104 of the rotating member 102, and in particular with the component or components of the control-end mounting assembly 124 positioned on the rotating member 102. In other embodiments, the engagement structure 129 may take other structural forms that may allow selectively releasable engagement with the control-end bracket-adapter 128.

Figure 14:
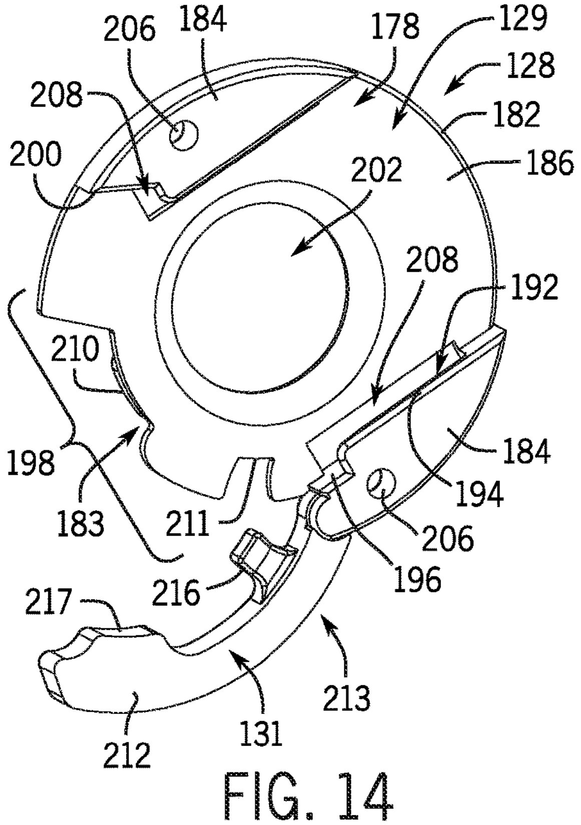
FIG. 14 is a front isometric view of the control-end bracket-adapter of FIG. 13 in an open position.
Figure 16:
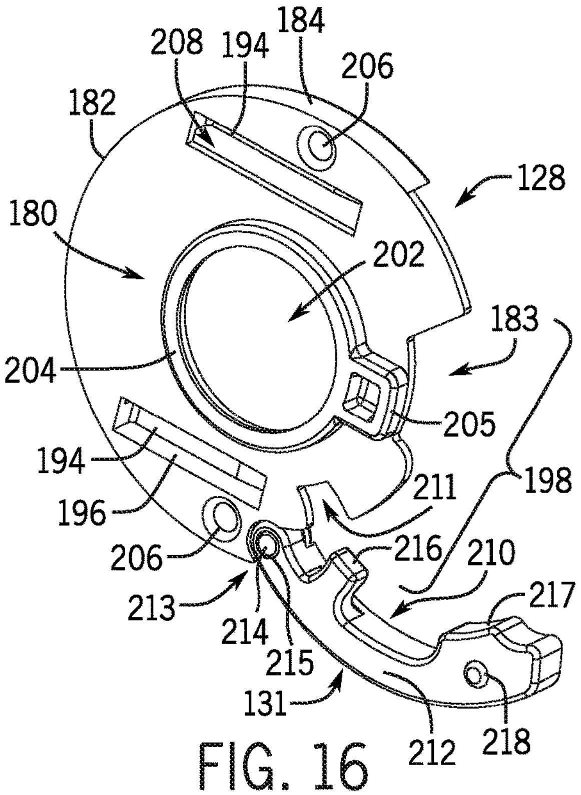
FIG. 16 is a rear isometric view of the control-end bracket-adapter of FIG. 13 in the open position.

Each rail 184 in this example may include a leading edge 188 and an engagement portion 190. Respective rectangular slots 208 formed through the main body 176 of the control-end bracket-adapter 128 extend from a point adjacent to each leading edge 188 and along the engagement portion 190, but terminate short of the edge 182. An overhanging flange 194 extends along the engagement portion 190 of each rail 184 partially over the respective rectangular slot 208. The overhanging flanges 194 may be parallel to each other. Each overhanging flange 194 may extend from a recessed wall 196 that defines an outer edge of the rectangular slots 208. In one embodiment, each overhanging flange 194 and recessed wall 196 defines a channel 192 above the rectangular slots 208 that terminates short of the edge 182. An opening or entry 198 on a side opposite that of the edge 182 allows access for the control-end-mount 130 to be positioned into the seat 186 through the entry 198 as depicted in FIGS. 14 and 16, where the entry 198 is opened.

In one embodiment, wall 209 formed by each engagement portion 190 extending between the rectangular slots 208 and the edge 182 defines a terminal end of the channels 192. The lengthwise openings of the channels 192 thus face each other on opposing sides of the main body 176. Additionally, engagement portions 190 of each rail 184 may extend at angles from the end of the recessed wall 196 and terminate at the periphery of the main body 176 to form angled guide surfaces 200. The opposing rails 184 thus form a gap therebetween on the front mount end face 178 of the main body 176. Each rail 184 may further define an aperture 206 therein for optional receipt of a setscrew for fastening the control-end bracket-adapter 128 to the mounting bracket 116. The front mount end face 178 of the control-end bracket-adapter 128 may be adjacent to or face the rotating member 102 and/or the control-end-mount 130.

Continuing with FIGS. 13, 14, 15, and 16, a circular central aperture 202 is formed through the main body 176 having a diameter smaller than the diameter of the primary aperture 153 formed in the bracket of FIG. 12. Additionally, the back bracket engaging face 180 of the control-end bracket-adapter 128 defines an annular rim 204 along at least a portion of the periphery of the central aperture 202. At least one alignment or orientation feature 205 is formed along the annular rim 204 for insertion into the corresponding alignment key features 172 of the primary aperture 153 of the mounting bracket 116 (see FIG. 12), as noted below. The apertures 206 may be beveled circumferentially on the back bracket engaging face 180 in order to recess the head of a setscrew inserted therein. The back bracket engaging face 180 of the control-end bracket-adapter 128 may be adjacent to and/or engage the mounting bracket 116. It will be appreciated that other manners of engaging the control-end bracket-adapter 128 with the mounting bracket 116 are within the scope of the present disclosure.

The control-end bracket-adapter 128 may define an edge 183 opposite edge 182, which defines a latch portion of the main body 176 that, in one example, is complimentary with the retention structure 131. The latch portion of the main body 176 may be defined by several recesses or notches including a long notch 210 and a latch notch 211 that may correspond with a portion of the retention structure. The retention structure 131 included on the control-end bracket-adapter 128, such as in this example retention arm 212, may selectively retain a mount component coupled to the rotating member 102, such as in one example control-end-mount 130, in the engagement structure 129 of the control-end bracket-adapter 128. The retention arm 212 may be pivotably attached to control-end bracket-adapter 128, and preferably in one example to one of the opposing rails 184 at a hinge 213. A blind hole 215 may be formed in a first end of the retention arm 212, which is configured to seat over a post 214 extending from the back bracket engaging face 180 of the control-end bracket-adapter 128 to form the hinge 213.

Figure 13:
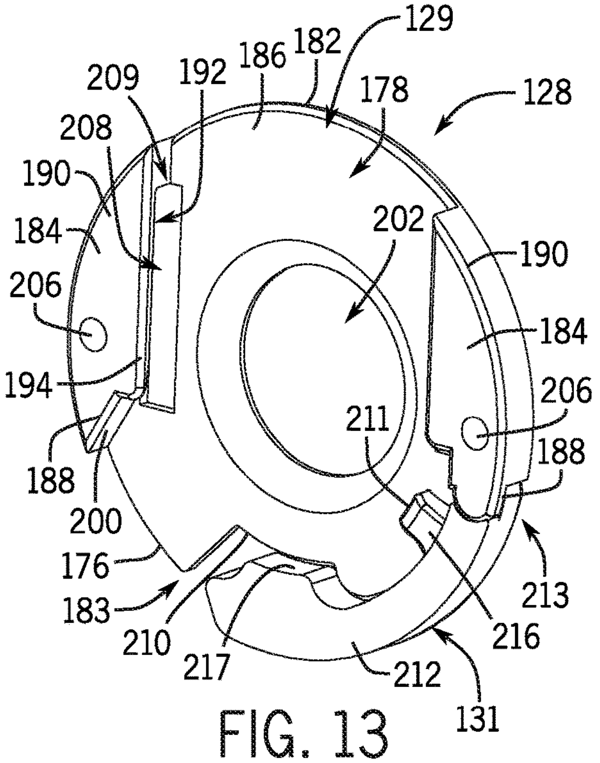
FIG. 13 is a front isometric view of a control-end bracket-adapter of the mounting assembly of the illustrative example of FIG. 1 in a closed position.
Figure 15:
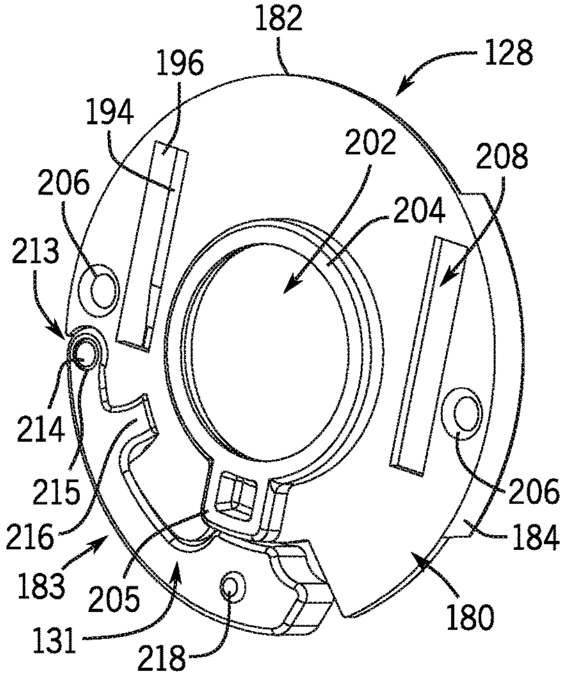
FIG. 15 is a rear isometric view of the control-end bracket-adapter of FIG. 13 in the closed position.

The retention arm 212 may be selectively movable between a first position closing the entry 198 (retaining the control-end-mount 130 in the seat 186) and a second position allowing access to the entry 198 (allowing control-end-mount 130 to disengage from the seat 186). In the first closed position, the retention arm 212 may be adjacent to, and in one example closely align with notches 210 and 211 on the latch portion of edge 183. The retention arm 212 provides access for insertion of the control-end-mount 130 into the seat 186 through the entry 198 when the retention arm 212 is in the first position as depicted in FIGS. 14 and 16, where the entry 198 is accessible. The retention arm 212 helps retain the control-end-mount 130 in the control-end bracket-adapter 128 when the retention arm 212 is in a second position as depicted in FIGS. 13 and 15, where the entry 198 is closed. In one embodiment, the retention arm 212 may be arcuate in shape with an outer edge curved to conform to the circumference of the circular form of the main body 176 of the control-end bracket-adapter 128. Additionally, the retention arm 212 may define a latch stud 216 extending radially inwardly from an inner edge and positioned to align with and seat firmly within the latch notch 211. A retention bump 217 may also be formed on the inner edge of the retention arm 212 toward the free end (opposite the hinge 213) and may be sized to seat freely within the long notch 210. In on embodiment, an inner edge of the retention bump 217 may be arcuately curved at a diameter sized to conform to the outer diameter of a feature of the control-end-mount 130 as further described below. A detent bump 218 may further be formed on a surface of the retention arm 212 adjacent to the retention bump 217 on a side of the retention arm 212 corresponding to the back bracket engaging face 180 of the control-end bracket-adapter 128. The retention arm 212 is only one example of the retention structure that may be configured for securing the control-end 104 of the rotating member 102 in engagement with the engagement structure 129 and thus to the mounting bracket 116.

In order to aid installation of the covering 100, the mounting bracket 116 may be mounted to, in at least some non-limiting examples, a wall (for example where the bracket is L-shaped whereby the second portion 160 is oriented in a vertical plane) or a ceiling (for example where the bracket is L-shaped whereby the second portion 160 is oriented in a horizontal plane). The bracket 116 may be mounted to other structures not listed here. As indicated above, in some examples, the orientation of the control-end bracket-adapter 128 relative to mounting bracket 116 may also be selectively altered in order to allow easier engagement of the rotating member 102 with the control-end bracket-adapter 128. In general, it is desirable that the opposing rails 184 of the control-end bracket-adapter 128 are oriented horizontally (i.e., perpendicular to the vertical plane of the wall in which the architectural feature is formed) in order to provide vertical load support to the cover assembly 114. The circular primary aperture 153 and key features 172 in the mounting bracket 116 allow for installation of the control-end bracket-adapter 128 in a desired orientation, such as for example horizontal, regardless of whether the mounting bracket 116 is mounted to the wall or to the ceiling and regardless of whether the control-end 104 of the cover assembly 114 is oriented on the left or right side of the covering 100. As such, it will be appreciated that, in many instances, there may be no need for a mounting bracket 116 specifically configured for a left or right side of the covering 100, and the same bracket may be used for supporting either the left side or the right, side of the covering 100.

On occasion, brackets may be left or right side specific. For example, cassette end brackets and fascia brackets may often be left or right side specific. The cassette end bracket is side-specific because its shape is asymmetrical, and the counter sunk fastener apertures would not be properly oriented if the bracket position was reversed. The fascia bracket has external structural elements that make reversing the bracket for use on either end impractical.

Figure 17:
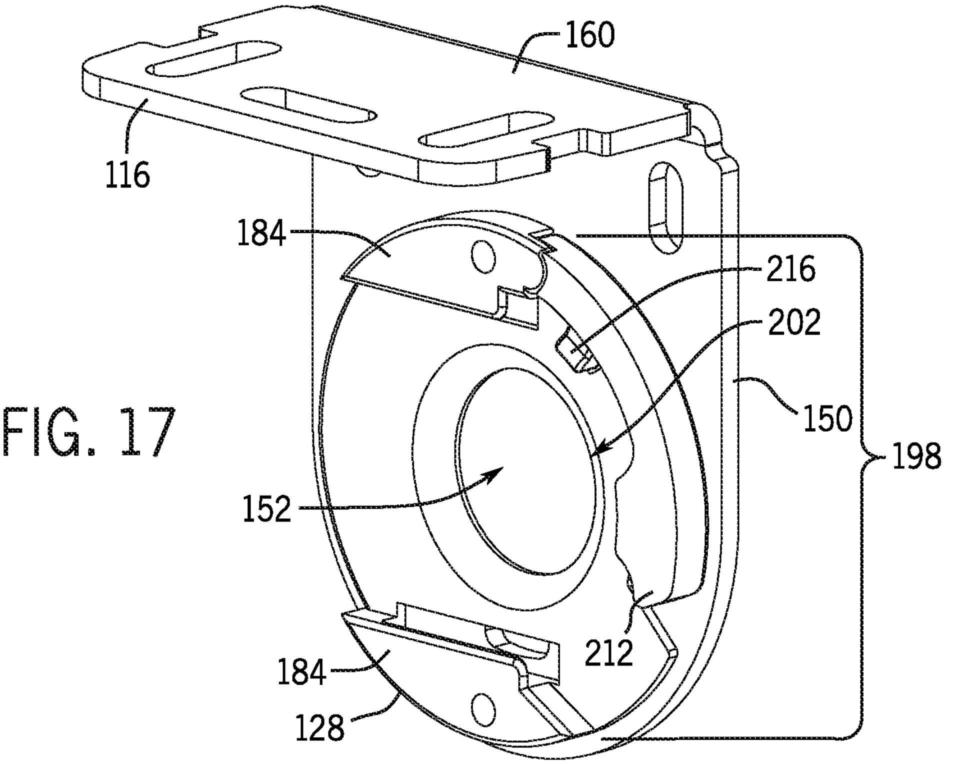
FIG. 17 is an isometric view of the control-end bracket-adapter of FIG. 13 mounted in a bracket oriented for mounting a cover assembly to a ceiling, lintel, or other horizontal surface.
Figure 18:
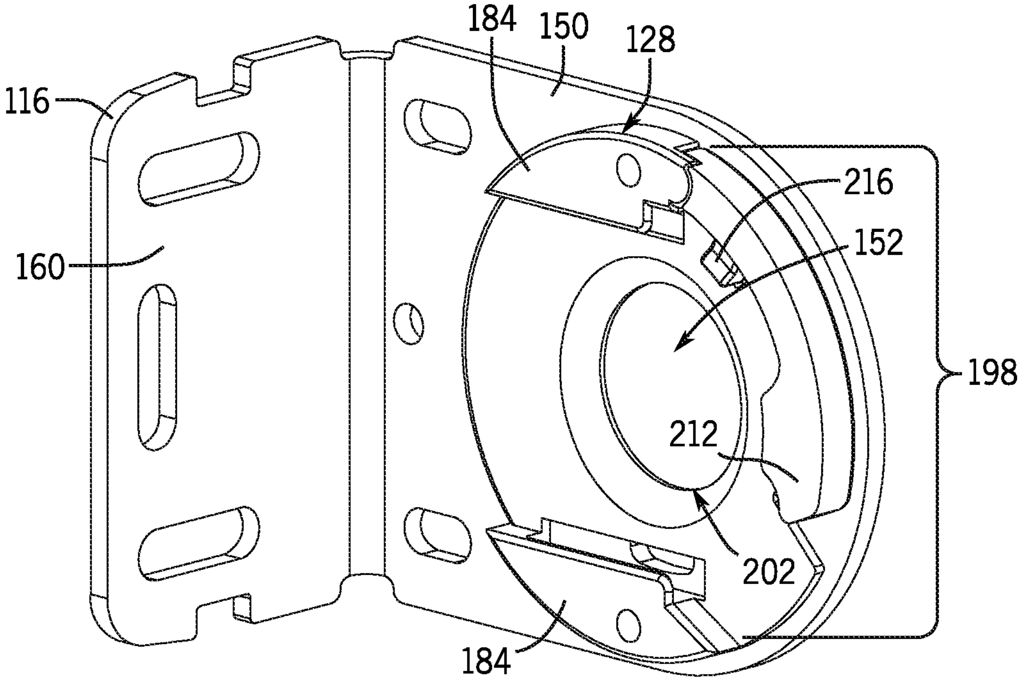
FIG. 18 is an isometric view of the control-end bracket-adapter of FIG. 13 mounted in a bracket oriented for mounting a cover assembly to a wall or other vertical surface.

The annular rim 204 of the example of a control-end bracket-adapter 128 illustrated in FIGS. 13-16 is positioned in the mounting structure 152 of a corresponding mounting bracket 116 as shown in FIGS. 17 and 18. FIG. 17 shows the mounting bracket 116 oriented to be coupled above the opening, such as to a ceiling. The opening or entry 198 into the seat 186 is 90 degrees offset from the second portion 160 of the mounting bracket 116 as shown in FIG. 17. FIG. 18 shows the mounting bracket 116 oriented to be coupled to a wall adjacent an opening. The entry 198 into the seat 186 is 180 degrees offset from the second portion 160 of the mounting bracket 116 as shown in FIG. 18. The control-end bracket-adapter 128 may be mounted to the mounting bracket 116 by inserting the annular rim 204 of the control-end bracket-adapter 128 into the mounting structure 152 in the mounting bracket 116, and in one example the annular rim 204 is received in the primary aperture 153, and aligning the orientation feature 205 with one of the alignment key features 172 for receipt therein. One or more set screws (not shown) may be inserted through one or more of the fastening apertures 154 in the mounting bracket 116 in alignment with one or both of the apertures 206 in the control-end bracket-adapter 128 to fasten the control-end bracket-adapter 128 to the mounting bracket 116 in the desired orientation, it will also be appreciated that the orientation feature is optional. While the alignment feature, such as a key, provides a substantial rotational stop inhibiting or limiting relative motion between the bracket-adapter and the bracket, the fasteners securing the bracket-adapter to the bracket may also provide resistance to the relative rotational motion.

Again, for some embodiments, the control-end bracket-adapter 128 may be re-oriented within the primary aperture 153 of the mounting bracket 116 in order to advantageously position the orientation of the entry 198, also referenced throughout herein as an opening, into the seat 186 to provide desired access during installation of the cover assembly 114. Reorienting from a ceiling mount position to a wall mount position or vice versa may be readily achieved, for example, by removing the set screws from fastening apertures 154, 206, removing the control-end bracket-adapter 128 from the primary aperture 153, rotating the control-end bracket-adapter 128 by about 90 degrees in either direction as needed to match up the orientation feature 205 with the appropriate alignment key feature 172, re-inserting the control-end bracket-adapter 128 into the primary aperture 153 of the mounting bracket 116, and screwing the set screws into aligned fastening apertures 154, 206.

Figure 19:
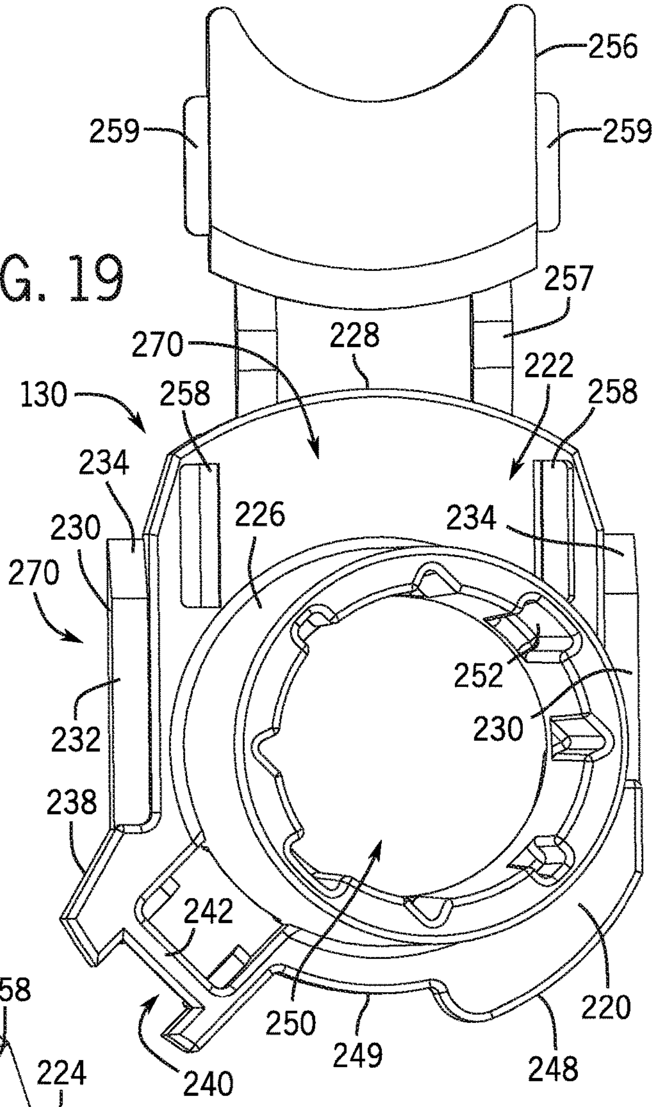
FIG. 19 is a front isometric view of a control-end-mount of the control-end mounting assembly of FIG. 1.
Figure 20:
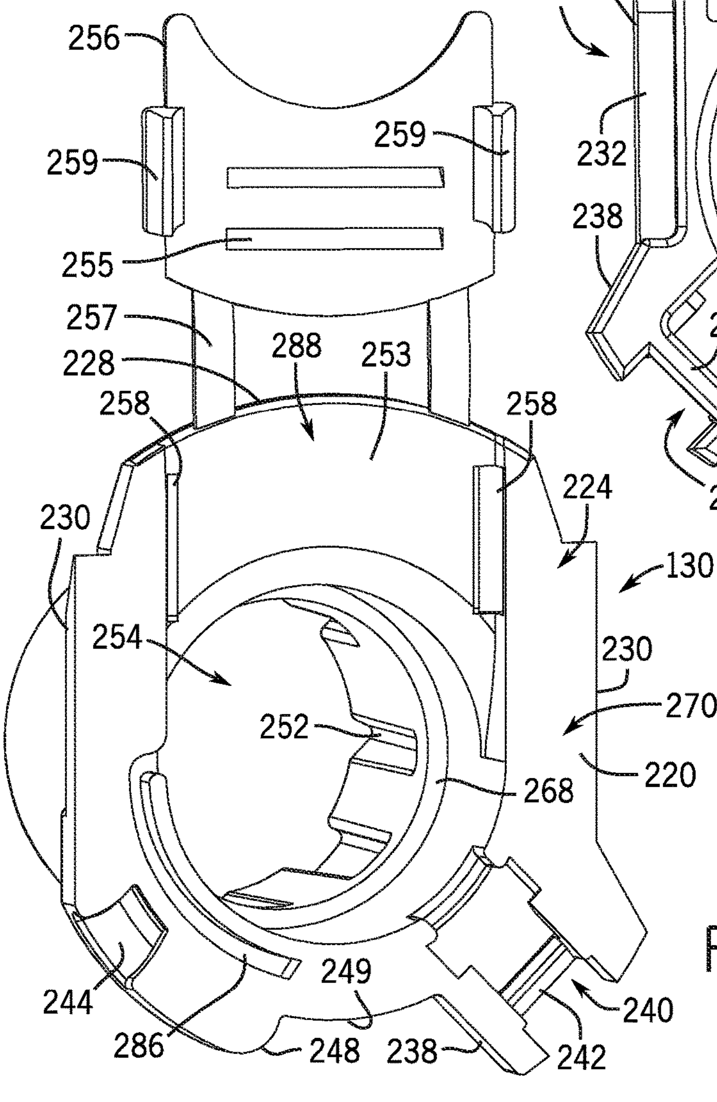
FIG. 20 is a rear isometric view of the control-end-mount of FIG. 19.

FIGS. 19 and 20 show an enlarged view of the control-end-mount 130, which may be part of the control-end mounting assembly 124 coupled with the rotating member 102. The control-end-mount 130 includes a portion configured to couple with the engagement structure of the bracket-adapter 128, and a portion for rotatably coupling with the control-end of the rotating member 102, and thus facilitates the coupling of the rotating member 102 to the mounting bracket 116. The control-end-mount 130 may be configured to receive at least a portion of the drive assembly 110, if included in the cover assembly 114, and couple it with the bracket 116. (See FIG. 24). The control-end-mount 130 may be rotatably coupled with the rotating member 102 by, in one example, the insertion of a portion of the control-end-mount 130 at least partially into the control-end of the rotating member 102 as explained in greater detail below. Upon mounting the control-end bracket-adapter 128 on the mounting bracket 116, such as, for example, by engagement with the mounting structure 152, the control-end 104 of the rotating member 102 may be coupled with the mounting bracket 116 by engaging the control-end-mount 130 with the control-end bracket-adapter 128, and more specifically in one example with an engagement structure 129 on the control-end bracket-adapter 128, such as in one example seat 186. This facilitates the lateral-mounting technique of the control end 104 of the cover assembly 114 in the brackets 116, as described in further detail below.

The control-end of the cover assembly may be conveniently mounted on a support structure using the control-end mounting assembly. The control-end mounting assembly provides a repeatable, adjustable, and simple installation technique. A portion of the control-end mounting assembly may be positioned on the control-end of the cover assembly, and a portion of the control-end mounting assembly may be positioned on the support structure. In one example, a control-end rotating member end mount is coupled with the control-end of the cover assembly, and a bracket is mounted to the support structure adjacent an architectural feature. The control-end rotating member end mount may be received in an engagement structure on the bracket to mount the control-end of the cover assembly on the support structure. In this example, the coupling between the engagement structure and rotating member end mount may be defined by a nesting engagement.

The portion of the control-end-mount 130 configured to couple with the engagement structure 129 includes, in one example, a base plate 220 having a first face 222 and a second face 224. The portion for rotatably coupling with the control-end of the rotating member 102 may define a hub 226 extending from the first face 222, as explained below in more detail. The base plate 220 is generally configured and sized to be received in the seat 186 (see FIGS. 13 and 14) of the control-end bracket-adapter 128, and includes an edge 228 (in the illustrated example, a curved edge), opposing flanges 230 extending along the lateral sides of the base plate 220, and an engagement edge 248 forming a recessed area 249. Each opposing flange 230 on the control-end-mount 130 may include a rectangular first portion 232 and a ramped second portion 234. Both the first 232 and second 234 portions of each opposing flange 230 may have a reduced thickness dimension compared to the general thickness dimension of the base plate 220. This reduced thickness dimension may be sufficient to be received within the channel 192 (see FIGS. 13 and 14) formed by the opposing rails 184 of the seat 186 on the control-end bracket-adapter 128. The rectangular first portions 232 extend parallel to each other on lateral sides of the base plate 220, and the ramped second portions 234 taper from the first face 222 to the second face 224 for ease of mating with the corresponding rail 184 of the control-end bracket-adapter 128 (see FIGS. 13 and 14). Where the engagement structure 129 may include the seat 186 on the control-end bracket-adapter 128, the opposing rails 184 of the seat 186 of the control-end bracket-adapter 128 may capture the opposing flanges 230 of the control-end-mount 130.

As noted above, the hub 226 of the control end mount 130 extends away from the first face 222 of the base plate 220 and rotatably receives and couples with the rotating member 102. The hub 226 in this example defines a generally cylindrical outer surface to form a bearing surface upon which the rotating member 102 may rotate. An anchor cavity 250 is formed within the hub 226 and extends axially inwardly from the free end of the hub 226 toward and through the base plate 220. The anchor cavity 250 is configured to receive an end of the motor assembly 110 in a non-rotating engagement, when the motor assembly 110 is included in the cover assembly 114. The second face 224 of the base plate 220, as best shown in FIG. 20, includes a primary aperture 254 communicating with the anchor cavity 250 in the hub 226. For example, as shown in the embodiment of FIGS. 19 and 20, axially extending grooves 252 may be formed in the inner surface of the sidewall of the hub 226 defining the anchor cavity 250 to mate with and receive corresponding splines formed on the engagement end portion of the motor assembly 110 when the engagement end is inserted into the anchor cavity 250. (See FIG. 25). The grooves 252 may be uniform in size and shape or they may be of different sizes and shapes as shown in FIG. 19 in order to engage the motor assembly 110 in a particular orientation. As shown in FIG. 20, an annular rib 268 may also be formed on the inner surface of the sidewall of the hub 226 in order to help couple the motor assembly 100 in the hub 226 as further described below.

Figure 23:
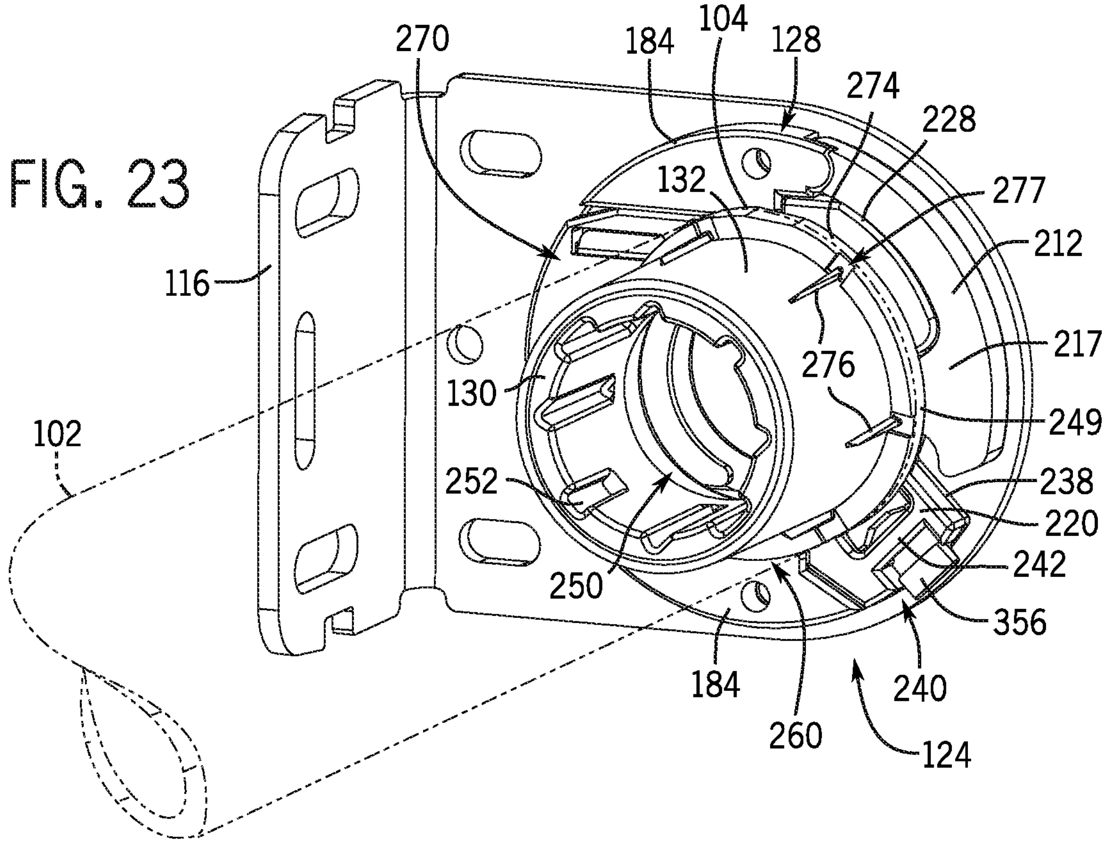
FIG. 23 is an isometric view of the control-end mounting assembly as shown in FIG. 1, with the rotating member size-adapter of FIG. 21 mounted on the control-end-mount of FIG. 19 and further mounted in a control-end bracket-adapter coupled to a bracket.
Figure 24:
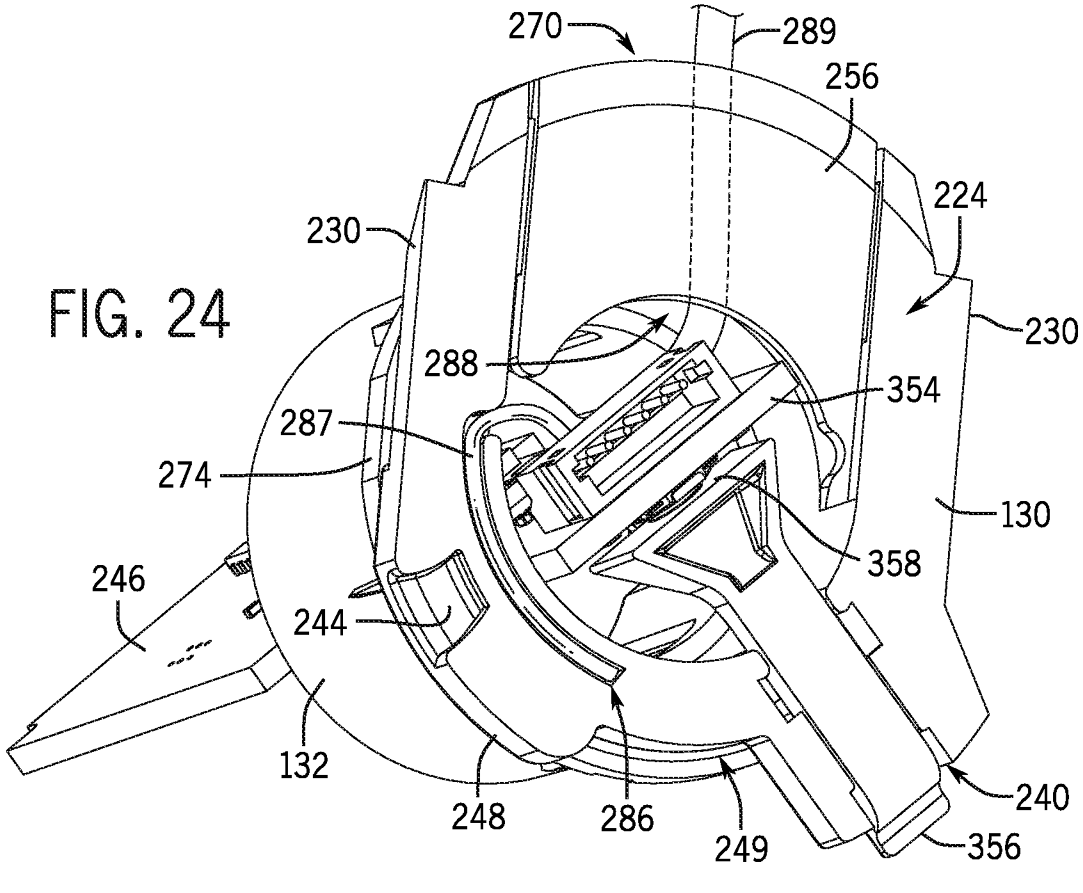
FIG. 24 is a rear isometric view of the control-end mounting assembly of FIG. 1, showing the control-end-mount and rotating member size-adapter with a control circuit board and switch coupled within the control-end-mount.

The control-end-mount 130 may, in one example, include a variety of features defined on either the first face 222 or the second face 224 of the base plate 220, for facilitating the operation of the drive assembly 110. As illustrated in one example shown in FIGS. 23 and 24 (described below), the drive assembly 110 may include a switch member, an antenna wire, and power and/or communication wires, each of which have routing and functional requirements configured to couple with the drive assembly 110. The features are generally located, in this example, on or adjacent to the base plate 220. The features may include a protrusion 238, defining a slot 240 for receiving a switch member 356 (FIG. 24). The protrusion extends radially away relative to the hub 226, and adjacent to the recessed area 249. Slot 240 extends from the outer edge of the protrusion 238 through to anchor cavity 250 in the hub 226, allowing the switch member 356 to engage a portion of the drive assembly 110 (FIG. 24), as described below. A retaining bar 242 may extend across the width of the slot 240. The switch member 356 may be positioned in the slot 240 and retained under the retaining bar 242 against the first front face 178 of the control-end bracket-adapter 128.

Continuing with the features for facilitating the operation of the drive assembly 110, the second face 224 may also define at least one slot or recess extending away from the primary aperture 254 for management and strain relief of the wires used in controlling the motor assembly 110. For instance, one slot 286 is formed to receive the antenna wire and recessed area 288 is formed to receive the power and/or communications wire(s) for the motor controller 246. The slot 286 and recessed area 288 have sufficient depth that the wires positioned therein are below flush with the surface of the second face 224 of the base plate 220 to avoid damage when the control-end-mount 130 is slid into the seat 186 of the control-end bracket-adapter 128. A wire clip retainer 256 may be positioned to cover the recessed area 288 and leave a passage underneath for any wires to pass through.

In the example shown in FIGS. 19 and 20, wire clip retainer 256 is formed along with the control-end-mount 130 and attached thereto by tethers 257. The wire dip retainer 256 may be folded over to the second face 224 of the base plate 220 to seat in the recessed area 288 and help retain in place and protect power and/or communication wires. The tethers 257 may remain or may be removed as desired. A pair of retention wings 259 extends from lateral sides of the wire clip retainer 256. A pair of slots 258 configured to receive the retention wings 259 is formed in the base plate 220 on lateral sides of the recessed area 288. The retention wings 259 seat in or couple with the slots 258 to hold the wire clip retainer 256 in place in the recessed area 288. Either or both of the wire clip retainer 256 and the area of the base plate 220 defining the recessed area 288 may be formed with one or more slots 255, and corresponding ribs 253 defined in opposing surfaces thereof. The ribs 253 and slots 255 may provide enhanced frictional engagement with a wire passing through the recessed area 288 and function to securely hold the wire(s) in place to provide strain relief. The slots 255 and ribs 253 may be in reverse location, or no surface features may be defined for securing one or more of the wires.

Relating to the example of the retention structure described above with respect to FIGS. 13-16, and referring here to FIG. 20, the base plate 220 may couple with the retention arm 212 when in a closed position. A recess or indentation 244 may be formed in the second face 224 of the base plate 220 along the engagement edge 248. The indentation 244 is adjacent the front 178 of the control-end bracket-adapter 128, and receives and frictionally engages the latch stud 216 (see FIG. 21) in order to help retain the retention arm 212 in the closed position.

Figure 21:
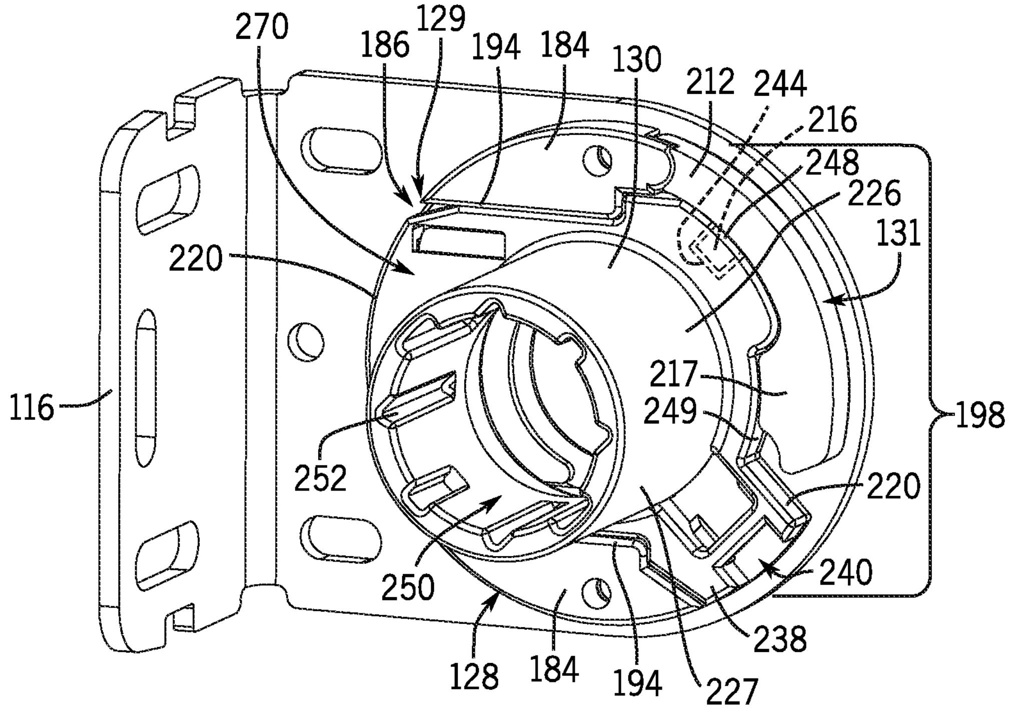
FIG. 21 is an isometric view of the control-end-mount of FIG. 19 mounted in the control-end bracket-adapter of FIG. 13, with the bracket-adapter being further mounted in a bracket.

As shown in FIG. 21, the control-end-mount 130 is received in the seat 186 of the engagement structure 129 of the control-end bracket-adapter 128 to couple the control-end 104 of the rotating member 102 to the mounting bracket 116. In the illustrated embodiment, the control-end-mount 130 is positioned through the entry 198 when the retention structure 131 is in the open position. The retention structure 131 may then be moved to the closed position (as shown in FIG. 21) to retain the control-end-mount 130 in the engagement structure 129 and coupled to the mounting bracket 116. In more detail, the base plate 220 of the control-end-mount 130 forms an engagement portion 270 (shown later in FIG. 24) for receipt in the seat 186 of the control-end bracket-adapter 128. As shown in FIG. 23, the base plate 220 of the control-end-mount 130 may be adjacent to the control-end 104 of the rotating member 102 when the hub 226 is positioned within the rotating member 102 as described below. The angled guide surfaces 200 (see FIGS. 13 and 14) of the control-end bracket-adapter 128 assist in positioning and centering the opposing flanges 230 of the base plate 220 of the control-end-mount 130 between the opposing rails

184 and into the channels 192 formed underneath the overhanging flanges 194 of the control-end bracket-adapter 128.

The control-end-mount 130 may be fully engaged in the seat 186 of the control-end bracket-adapter 128 when the ramped second portions 234 of the flanges 230 engage the engagement portions 190 of the opposing rails 184, which in this example defines the ends of the channels 192 of the control-end bracket-adapter 128. In this example, after full engagement within the seat, the retention arm 212 may be pivoted to the closed position such that the retention bump 217 seats within the long notch 210 of the control-end bracket-adapter 128. Although not visible in FIG. 21, but visible in FIG. 13, the latch stud 216 frictionally seats in the latch notch 211 to retain the retention arm 212 in the closed position. Further, the latch stud 216 may be thicker than the thickness of the main body 176 of the control-end bracket-adapter 128 and may be aligned with and extend within the indentation 244 on the second face 224 of the base plate 220 of the control-end-mount 130 and frictionally engage the surface of the indentation 244 to further hold the retention arm 212 in the closed position to retain the cover assembly 114. Additionally, the decent bump 218 on the back side of the retention arm 212 may operate to bias the retention arm 212 in a position toward the base plate 220 of the control-end-mount 130 to further latch the retention arm 212 in a closed position.

Figure 22:
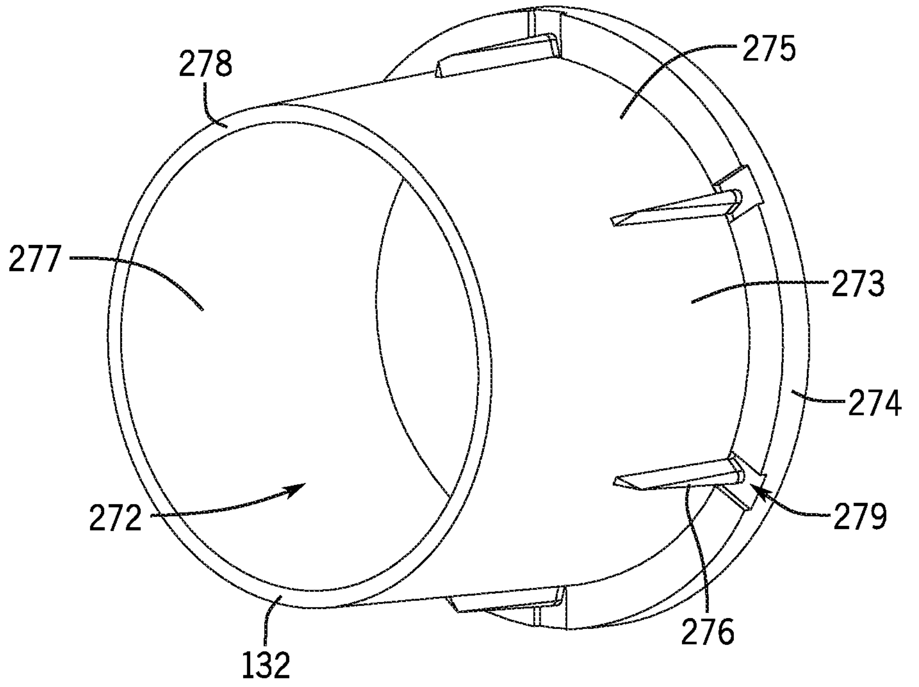
FIG. 22 is an isometric view of a rotating member size-adapter of the control-end mounting assembly of FIG. 1.

As noted elsewhere, the control-end of the cover assembly may be rotatably coupled to the mounting bracket by the control-end mounting assembly. The control-end of the cover assembly may be rotatably engaged directly with the control end mount where the size of the rotating member facilitates suitable rotatable engagement with the control-end mount. Where a rotating member is, for example, too large for a suitable rotatable engagement, a component, such as a control-end rotating member size-adapter, may be utilized to create a suitable rotatable engagement with the control-end mount. A control-end rotating member size-adapter 132, such as for example without limitation the control crown, may be provided between the rotating member 102 and the control-end-mount 130 in order to provide a bearing surface about which the rotating member 102 rotates relative to the control-end-mount 130. In this example, the control-end rotating member size-adapter 132 is rotatably received over the hub 226 of the control-end-mount 130. The control-end rotating member size-adapter 132, as shown in FIG. 22, has a sidewall 273 having an outer surface 275 and an inner surface 277, the sidewall 273 having a generally cylindrical shape and defining a central aperture 272. A first end of the control-end rotating member size-adapter 132 defines an annular flange 274 extending radially outwardly. A second end of the control-end rotating member size-adapter 132 defines an end rim 278, and an end of the motor assembly 110 is inserted through the aperture defined by the end rim 278.

The control-end rotating member size-adapter 132 is positioned within the rotating member 102 in a manner so as to be non-rotatable relative to the rotating member 102. In this example, the non-rotatable engagement with the rotating member 102 is created by a press-fit engagement with the control-end rotating member size-adapter 132. The press fit engagement of this example is created by a plurality of circumferentially-spaced tapered ridges 276 formed on the outer surface 275 of the sidewall 273 that extend from generally adjacent the flange 274 axially along a portion of the sidewall 273. The tapered ridges 276 may taper (in a height dimension, a width dimension, or both) from a wide base adjacent the annular flange 274 to a nadir, which may be at an intermediate axial position along the sidewall 273. The annular flange 274 may define a number of chutes 279 positioned at the base of each of the tapered ridges 276. The tapered ridges 276 deform under compressive threes when the control-end rotating member size-adapter 132 is press-fit and/or friction fit into the end of a rotating member 102, and couple the terminal end of the rotating member 102 in a position abutted against the annular flange 274. In some instances, portions of the tapered ridges 276 may deform or shear off of the sidewall 273 upon coupling with the rotating member 102 or otherwise during operation due to the compressive and shear forces acting on the interface between the sidewall 273 and the rotating member 102 as a motor rotates the rotating member 102 and supports the weight of the shade material 115. The chines 279 allow for pieces of the tapered ridges 276 to be expelled from within the rotating member 102.

The control-end rotating member size-adapter 132 is coupled with the control-end-mount 130 by being rotatably positioned over the hub 226, also referred to as a coupling portion, of the control-end-mount 130. The inner surface 277 of the sidewall 273 of the control-end rotating member size-adapter 132 rotatably bears on the outer surface 227 of the hub 226 of the control-end-mount 130. The diameter of the central aperture 272 defined by sidewall 273 is sized to closely match but be slightly larger than the diameter of the hub 226, with the hub 226 acting as a bearing or bushing. This relationship allows the control-end rotating member size-adapter 132, and in turn the rotating member 102, to bear on and rotate relative to the control-end-mount 130.

The control-end mounting assembly 124 configured to couple the control-end 104 of the rotating member 102 to the control-end mounting bracket 116, in this example, is shown in FIG. 23. The control-end bracket-adapter 128 is positioned in the mounting structure 152 (see FIG. 4, for example) of the control-end mounting bracket 116. The control-end-mount 130, and in this example control-end rotating member size-adapter 132, is coupled together and received within the control-end 104 of the rotating member 102. This is explained in greater detail below. The control-end-mount 130 is positioned in the seat 186 of the engagement structure 129 of the control-end bracket-adapter 128 to couple the cover assembly 114 to the mounting bracket 116. The control-end-mount 130 is retained within the control-end bracket-adapter 128 by the retention structure 131.

As shown in FIG. 23, the control-end rotating member size-adapter 132 is rotatably received on or over the control-end-mount 130, together forming a control-end rotating member end mount 260. The control-end rotating member end mount 260 may be positioned adjacent an end (e.g., the control-end 104) of the rotating member 102. In this example, it is positioned at least partially within an end of the rotating member 102. As noted above, the control-end rotating member end mount 260 is positioned in the rotating member 102 by press-fitting the control-end rotating member size-adapter 132 into the rotating member 102. In some examples, the control-end rotating member end mount 260 may comprise the control-end-mount 130 separately from the control-end rotating member size-adapter 132, such as, for example, when the control-end-mount 130 is sized to rotatably support a rotating member 102 without the use of a control-end rotating member size-adapter 132. It should be appreciated that the optional motor assembly 110, if present, may be received in the anchor cavity 250 of the control-end-mount 130 and coupled therein.

In at least one example, the control-end rotating member size-adapter 132 may not be utilized in the control-end mounting assembly 124. The control-end rotating member size-adapter 132 may be eliminated where the rotating member 102 is sized appropriately to rotatably couple with the hub 226 of the control-end-mount 130. In this example, however, to use a rotating member 102 having a larger diameter for mounting on the same mounting bracket 116 and other mounting assembly components, a control-end rotating member size-adapter 132 sized for the receipt in the larger diameter would be used in the rotating member 102. This control-end rotating member size-adapter 132 would have a larger outer diameter to fit the larger rotating member 102, and would also rotatably engage the hub 226 of the control-end-mount 130. Further in this example, to use a rotating member 102 having a smaller diameter, a different control-end-mount 130 having an appropriately smaller-sized hub 226 for rotatable engagement with the rotating member 102 would be needed. The coupling of this different control-end-mount 130 to the engagement structure 129 (e.g. seat 186) of the control-end bracket-adapter 128 would be unchanged.

In one example where a motor assembly is included in the control end of the motor assembly, the operation of the motor assembly may be controlled by a user through actuation of a switch member. The switch member may be positioned adjacent the control-end of the rotating member, and may be accessible to a user at or near the control-end mounting assembly. The user may manually move the switch, such as by depressing the switch, to control the functions of the motor assembly. As shown in FIG. 23 and also in FIG. 24, the elongated switch member 356 is received in slot 240. In one embodiment, the switch member 356 may be formed as a light pipe. The switch member 356 extends from the periphery of the base plate 220 into the central anchor cavity 250 of the hub 226 and allows a user to actuate a control member 358 (shown in FIG. 24) on a printed circuit board 354 forming part of a motor controller 246. The switch member 356 may be retained in the slot 240 by the retaining bar 242 interfacing with a recess in the switch member 356. A first end of the switch member 356 may protrude from the periphery of the base plate 220 in an orientation accessible by a user. A second end of the switch member 356 may be positioned adjacent to the control member 358 on the printed circuit board 354. The switch member 356 may translate longitudinally in the slot 240 to actuate the controller member 358 to power the motor assembly 110 and to determine a direction of rotation for the rotating member 102, i.e., rotation in a retraction direction or in an extending direction. An LED or other light source (not shown) may be positioned adjacent to the control member 358 on the printed circuit board 354. In embodiments in which the control member 358 is formed of an internally refractive, "light pipe" material, the control member 358 may "glow" for ease of location and selection by a user.

As shown in FIG. 24, an antenna wire 287 may be attached to the printed circuit board 354 at a first end and seated within the slot 286 of the control-end-mount 130 along its length. A power wire 289 attached at a first end to the printed circuit board 354 is shown sandwiched between the wire clip retainer 256 and the second face 224 of the base plate 220 of the control-end-mount 130 within the recessed area 283. The wire clip retainer 256 may provide strain relief for the power wire 289 as it extends to couple with an electrical source to provide power for the motor assembly 110.

Figure 25:
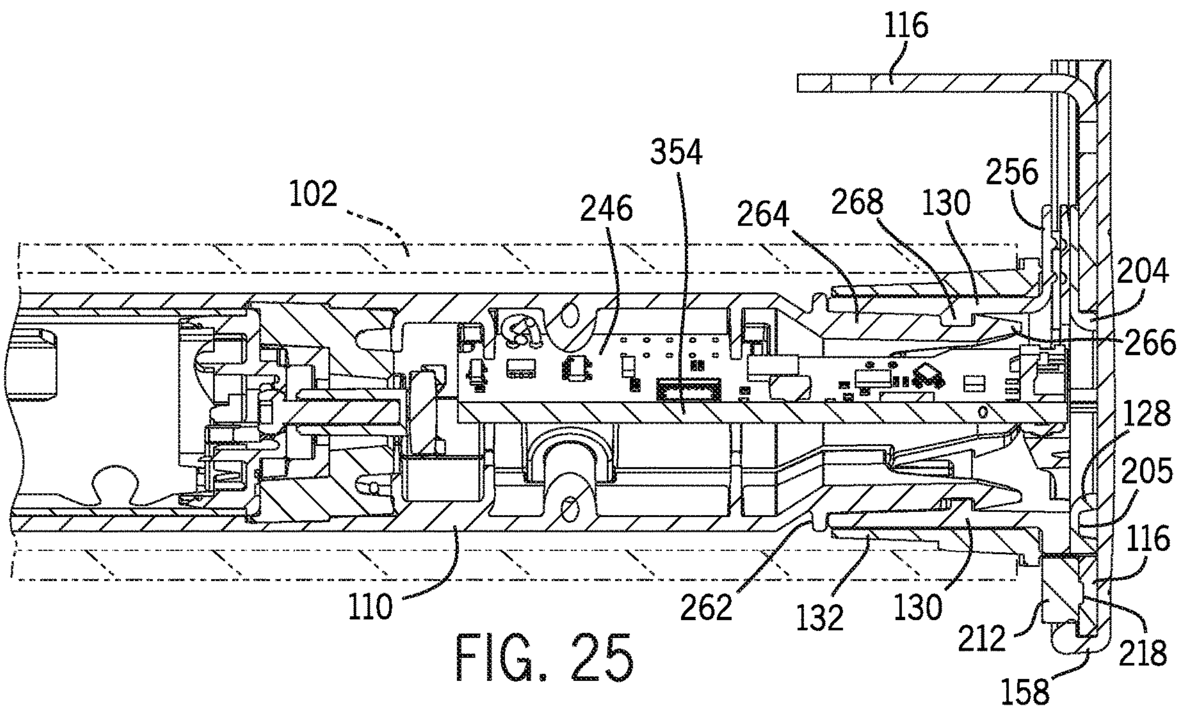
FIG. 25 is front elevation view in cross-section of the control-end mounting assembly of FIG. 1.
Figure 26:
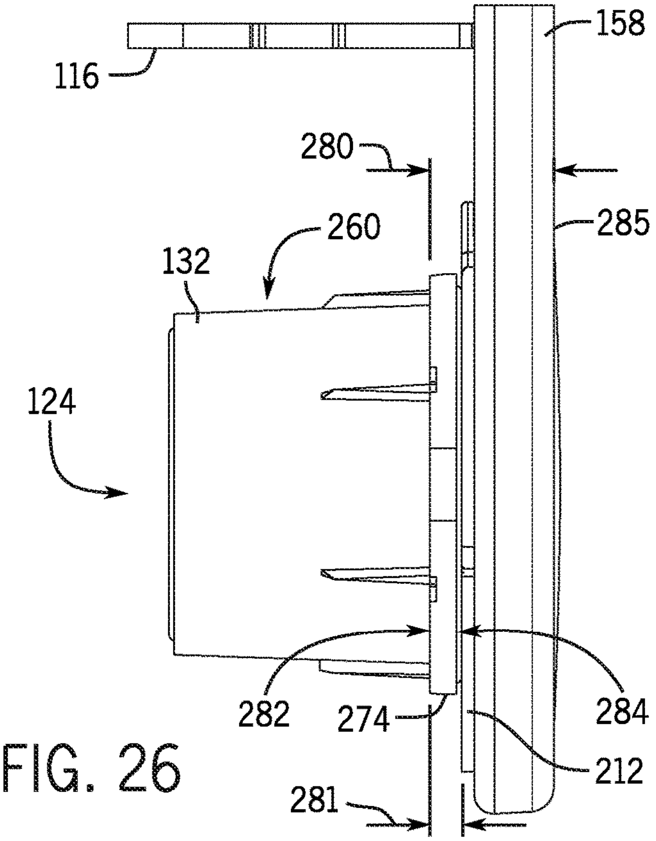
FIG. 26 is a front elevation view of the control-end mounting assembly of FIG. 1 indicating the minimal light gap resulting from the depicted configuration.

One example of a structure in this embodiment for securing the motor assembly 110 in the control-end-mount 130 is shown in FIG. 25. A retention structure 262 may be formed in the motor assembly 110 having resiliently flexible arms 264 with catches 266 that snap over the annular rib 26$ formed on the inner wall of the control-end-mount 130. The motor assembly 110 may thus be coupled in the rotating member 102, and the retention structure 262 couples the engagement of the control-end-mount 130 in the end of the rotating member 102. As shown in FIG. 26, the control-end mounting assembly 124 defines a light gap 280 on the control-end 104 of the shade of approximately 0.45 inches or less, and preferably approximately 0.417" or less, as measured between the inner edge 282 of the annular flange 274 of the control-end rotating member size-adapter 132 and an outer surface 285 of the end cap cover 158. If measured without the end cap cover 158 and to the outer surface of the mounting bracket 116, the light gap is approximately 0.339" or less. In certain circumstances, such as where more than one covering is mounted end-to-end, an end cap cover may not be utilized. This light gap dimension includes accommodation for the lateral movement of the edge of the shade upon extension or retraction ("skew"), which is approximately 0.100". The skew accommodation 281 is measured between the inner edge 282 of the annular flange 274 of the control-end rotating member size-adapter 132 and an outer surface 284 of the retention arm 212 of the control-end bracket-adapter 128. Typical light gaps on previous bracket assemblies are significantly larger.

The idle-end of the cover assembly is opposite the control-end. The idle-end of the cover assembly may be coupled to a bracket mounted on a support structure. An idle-end mounting assembly may be used to mount the idle-end to the bracket in a simple installation and may create a reduced light gap between the edge of the shade and the support structure. The idle-end mounting assembly may be used independently from or together with the control-end mounting assembly referenced herein to mount a cover assembly to a support structure. The idle-end mounting assembly may allow the idle-end of the cover assembly to rotate freely relative to the bracket. Additionally, the idle-end mounting assembly may be configured to separately facilitate spear-type axial mounting of the cover assembly with the bracket and may also allow for the circumferential orientation of the cover assembly to be adjusted relative to the bracket (and/or relative to the adjacent architectural feature). The idle-end mounting assembly, similar to the control-end mounting assembly, may, in several embodiments, include a bracket-adapter, in this example an idle-end bracket-adapter; a mount, in this example an idle-end mount; a rotating member size-adapter (in this example an idle-end rotating member size-adapter); and a bracket the same as or similar to that used on the control-end of the cover assembly, such as described above with respect to the control-end mounting assembly. The rotating member size-adapter on the idle-end may be optional where the idle-end mount is sufficiently sized to rotatably receive the idle-end of the rotating member. While in this example and compared to the control-end assembly the number of components may be identical and the function of coupling the idle-end of different sized rotating member to the bracket may be the same, the more detailed structure and function of the components may, for example, be unique to the idle-end of the rotating member. The idle-end mounting assembly may allow the cover assembly to spin freely about the coupling, or may also couple with a limit stop, and/or optionally couple with a control assist unit. The idle-end mounting assembly may also accommodate differently sized shade assemblies having differently-sized rotating members. In one embodiment, the idle-end mounting assembly includes closely integrated component parts that couple together in a nesting manner with the idle-end of the rotating member, as well as with the bracket. The nesting manner of the assembly reduces the width of the idle-end mounting assembly and allows for the reduced light gap.

The bracket used for mounting the control-end of the cover assembly may be similar or identical to the bracket used for the idle-end. If not identical, an appropriate bracket may include at least a suitable mounting structure, in some embodiments, no particular orientation of the idle-end mounting assembly is required and some or all of the mounting components of the idle-end may be pre-assembled at the time of manufacture and packaged for shipping in an assembled state for installation on-site.

Figure 38:
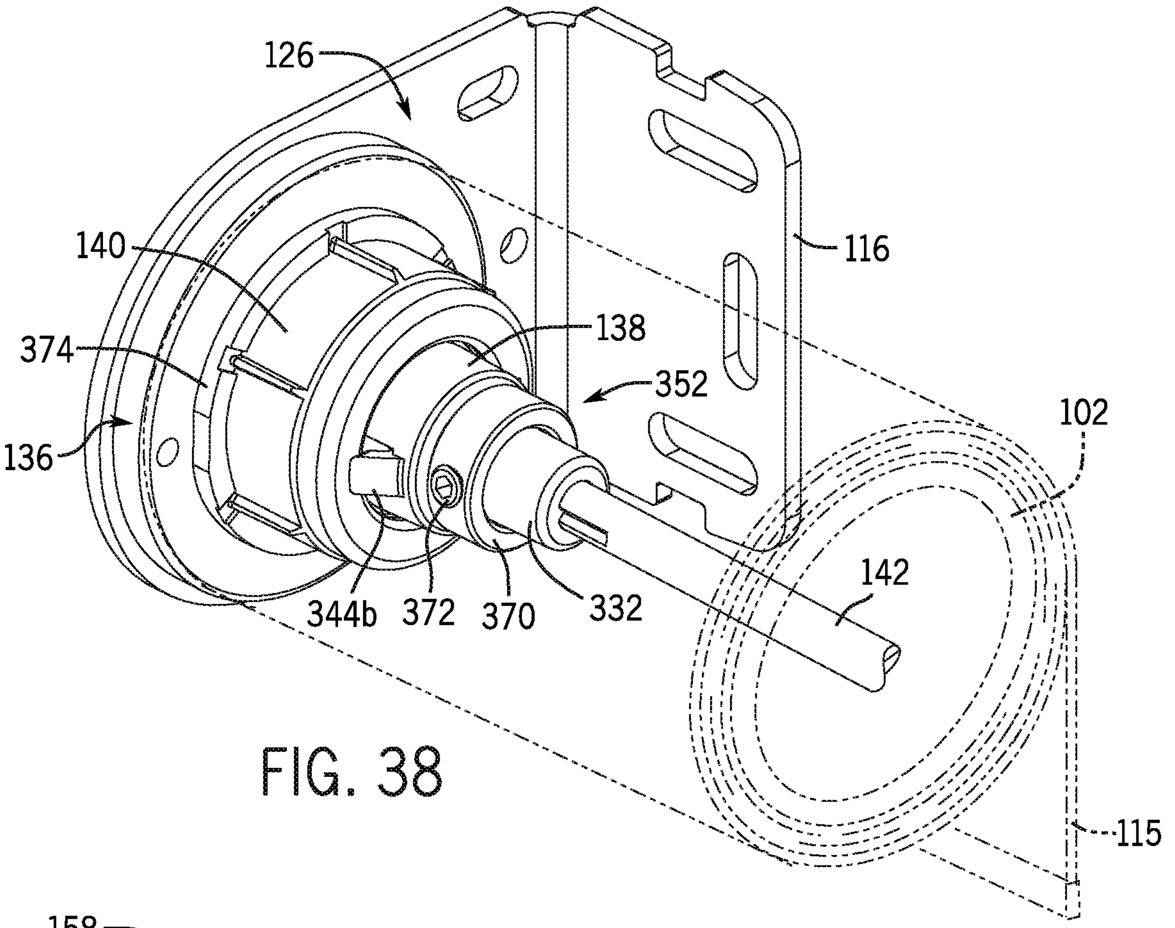
FIG. 38 is a front right isometric view of another example of the idle-end mounting assembly.
Figure 39:
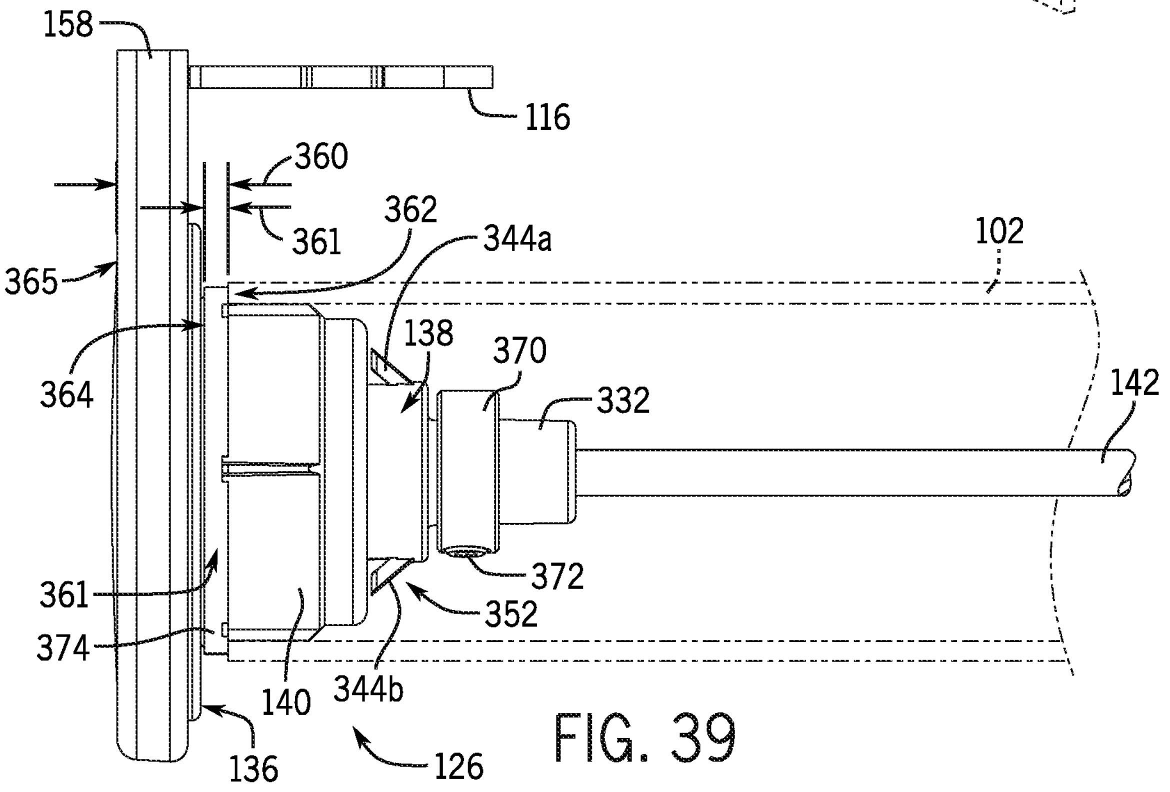
FIG. 39 is a top plan view of the idle-end of FIG. 38 indicating widths of light gaps.
Figure 40:
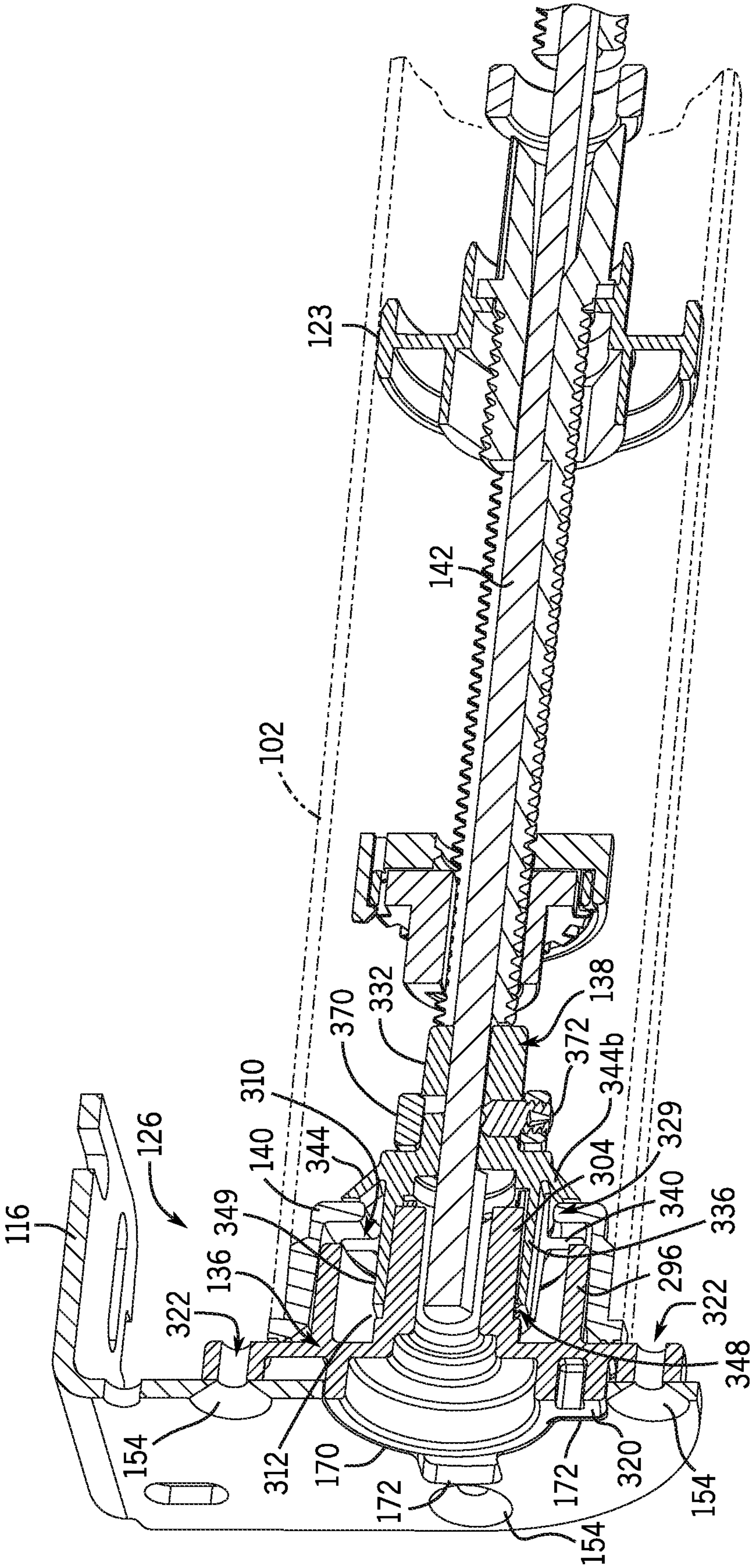
FIG. 40 is a top isometric view in cross-section of the idle-end mounting assembly shown in FIG. 38.

One illustrative example of the idle-end mounting assembly 126, and sub-components, of this embodiment is shown in FIGS. 3, and 27-40. The idle-end mounting assembly 126 may include, for example, an idle-end bracket-adapter 136 as an interface structure between the idle-end 106 of the rotating member 102 and mounting bracket 116. One portion of the idle-end bracket-adapter 136 couples with the idle-end 106 of the rotating member 102, and another portion of the idle-end bracket-adapter 136 couples with the mounting bracket 116. In FIG. 3, the rotating member 102 is removed for clarity, and in other figures it may be illustrated in dashed lines or removed, also for clarity. The idle-end mounting assembly 126 may, in several embodiments, include a mounting bracket 116, an optional idle-end bracket-adapter 136, an idle-end-mount 138, and a rotating member size-adapter, for example an idle-end rotating member size-adapter 140. Optionally, a control assist unit 112 may be positioned in the rotating member 102, and may include a central shaft 142, as shown in FIGS. 38, 39, and 40, that is non-rotatably engaged with the idle-end-mount 138 at a first end, and is coupled to an assist structure 122 at a second end that engages and rotates with the rotating member 102 during extension and retraction of the shade.

An idle-end bracket-adapter functions as an interface structure between the idle-end of the cover assembly and the bracket to which the cover assembly is rotatably coupled. The idle-end bracket-adapter mates with a mounting structure formed on the bracket and is fixed in position relative to the bracket. The idle-end of the rotating member is rotatably coupled to the idle-end bracket-adapter. The idle-end bracket-adapter may be coupled to the bracket in one orientation, or may be coupled to the bracket in more than one orientation as needed.

Figure 27:
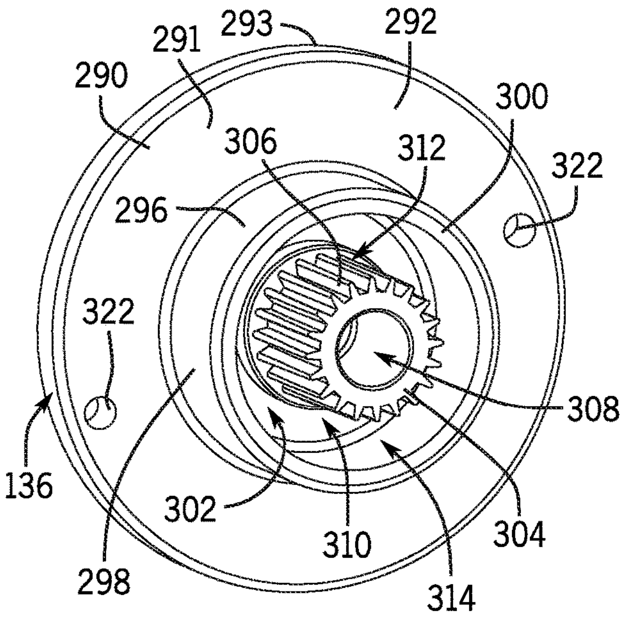
FIG. 27 is a front isometric view of an idle-end bracket-adapter of the idle-end mounting assembly of FIG. 1.

As shown in FIG. 27, the idle-end bracket-adapter 136 includes a base plate 290. In one embodiment, the base plate includes a plate 291 having in one example a circular periphery 293. The base plate 290 defines a first adapter end face 292 and a second bracket engagement face 294 (shown in FIG. 28). The first adapter end face 292 includes a boss 296 extending axially away from a central portion of the base plate 290. The boss 296 may have a cylindrical outer surface 298 terminating in a circular rim 300 and defining an interior cavity 302. The first adapter end face 292 forms an end wall at the base of the interior cavity 302 formed by the boss 296. A male engagement portion, such as a post 304, is positioned inside the boss 296, and extends axially from the end wall. The post 304 may be longer than the boss 296 and extend beyond the circular rim 300. Alternatively, the post 304 may be the same length as or shorter than the boss 296. In one embodiment, the post 304 may be concentrically positioned relative to the boss 296.

In one embodiment, the post 304 may include circumferential engagement structure or elements for engaging corresponding structure or elements of the idle-end-mount 138 configured to be coupled to the idle-end bracket-adapter 136. The circumferential engagement structure may, for example, allow for circumferential engagement or coupling between the idle-end-mount 138 and the idle-end bracket-adapter 136, thereby allowing the idle-end-mount 138 to be rotationally fixed relative to the idle-end bracket-adapter 136 when installed thereon. In addition, the circumferential engagement structure may allow for selective adjustment of the circumferential orientation of the idle-end-mount 138 relative to the idle-end bracket-adapter 136 when installing the idle-end-mount 138 on the idle-end bracket-adapter 136 using an axial, spear-type installation methodology. Such adjustability of the circumferential orientation of the idle-end-mount 138 may, for example, allow for the idle-end-mount 138 to be "clocked" relative to the idle-end bracket-adapter 136 in circumferential increments to allow the orientation of the associated covering assembly to be adjusted. As shown in the illustrated embodiment, the circumferential engagement structure may, for example, correspond to ridges and grooves forming outwardly directly splines 306 extending longitudinally along at least a portion of the exterior wall of the post 304. In one embodiment, the splines 306 may extend along all or a portion of the axial length of the post 304, such as by extending at least to the terminal end of the post 304. However, in other embodiments, the circumferential engagement structure may correspond to any other suitable structure or elements that allow such structure/elements to function as described herein.

Additionally, a central recess 308 may be formed in the post 304, which may be cylindrical and extend through the base plate 290. At least one structure 322 may be formed on the base plate 290, such as for example an aperture, for use in mounting, such as with a fastener, the idle-end bracket-adapter 136 to the mounting bracket 116. A second aperture 322 may be formed within the base plate 290 180 degrees apart from the other aperture 322.

A placing structure 310 (for instance, in one example, a location structure) in this example is the seat 312 formed by the interior cavity 302 of the boss 296, with the entry or opening 314 to the seat formed by the circular rim 300. Seat 312 is one example of an engagement structure formed on the idle-end bracket-adapter 136. The post 304 may also be considered part of the engagement portion or placing structure 310 and may optionally form a portion of the seat 312.

Figure 28:
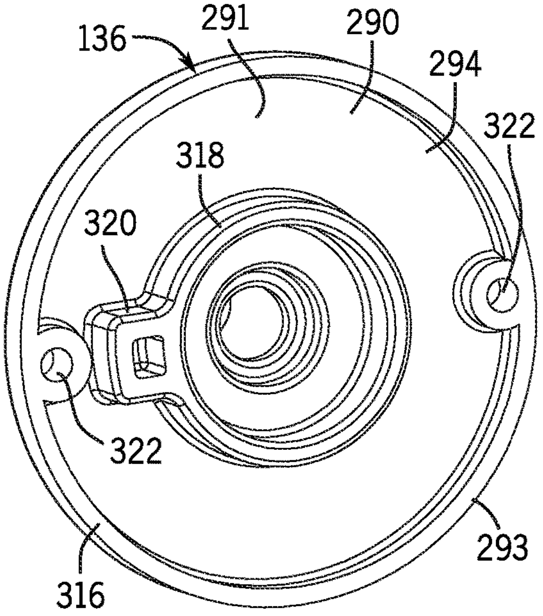
FIG. 28 is a rear isometric view of the idle-end bracket-adapter of FIG. 27.

Referring to FIG. 28, the second bracket engagement face 294 of the idle-end bracket-adapter 136 includes, for example, a peripheral rim 316, an annular rim 318 (the rim 318 continuously or discontinuously extending about a central region of the second bracket engagement face 294), and a key structure 320 positioned adjacent the rim 318. The rim 318 has a height that is greater than, equal to, or less than the height of the peripheral rim 316. In one example, the height of rim 318 is greater than that of peripheral rim 316 to facilitate an enhanced coupling with the mounting structure 152, as described below. The rim 318 forms an anchor structure configured to couple with the mounting structure 152 (see FIG. 12) of the mounting bracket 116.

As shown in FIGS. 34 and 35, the second bracket engagement face 294 of the idle-end bracket-adapter 136 may be positioned against the mounting bracket 116 (see FIG. 12), with the rim 318 received within, and in some examples extending through, the primary aperture 153. In some examples, the height of the rim 318 causes the rim 318 to extend into the mounting structure 152 and engage the peripheral edge 170 of the primary aperture 153 (see FIG. 35). A key structure 320 may be received within a selected alignment key feature 172 formed on the outer periphery of the primary aperture 153 in order to fix the orientation of the idle-end bracket-adapter 136 to the mounting bracket 116. The apertures 322 may be aligned with the fastening aperture 154 formed in the mounting bracket 116 for use with a fastening mechanism to mount the idle-end bracket-adapter 136 to the mounting bracket 116. As shown, the two small bosses surrounding the apertures 322 are each aligned with the fastening aperture 154 in the mounting bracket 116 to receive a fastening mechanism (such as a threaded screw) to mount the mounting bracket 116 and the idle-end bracket-adapter 136 together. Note, in this illustrative embodiment, there is no need for any particular orientation of the idle-end bracket-adapter 136 in the mounting bracket 116 regardless of the orientation of the mounting bracket 116 when mounted to a support structure. The primary aperture 153 may perform both as a feature for engaging components of the idle-end mounting assembly 126 and/or optionally as an orientation structure for allowing components received in the primary aperture 153 to be received in one orientation or more than one orientation.

The idle-end-mount 138 of this illustrative example is coupled to the idle-end 106 of the rotating member 102. The idle-end-mount 138 in turn couples the idle-end 106 of the rotating member 102 to the mounting bracket 116 and allows the rotating member 102 to rotate relative to the mounting bracket 116. More specifically, the idle-end-mount 138 may couple the idle-end 106 of the rotating member 102 to the engagement structure of the idle-end bracket-adapter 136. The idle-end-mount 138 and the idle-end bracket-adapter 136 may be configured such that engagement of these components couples the idle-end-mount 138 relative to the mounting bracket 116, for instance, in a non-rotatable manner. With reference to FIGS. 38-40, the idle-end-mount 138 may also optionally couple with the motor assist, and may also optionally couple with the limit stop, each depending on the features included in the particular covering being installed. Additionally, a central shaft 142 may be coupled with the idle-end-mount 138, and thus to the idle-end bracket-adapter 136, in a non-rotatable manner to provide the resistance to rotation necessary for the operation of a limit stop or control assist. The optional control stop and the optional limit stop, if either or both are employed, operate in their own manner by including a component that couples with the rotating member 102 to rotate about a fixed component, which in this example is the central shaft 142 coupled with the bracket.

Figure 29:
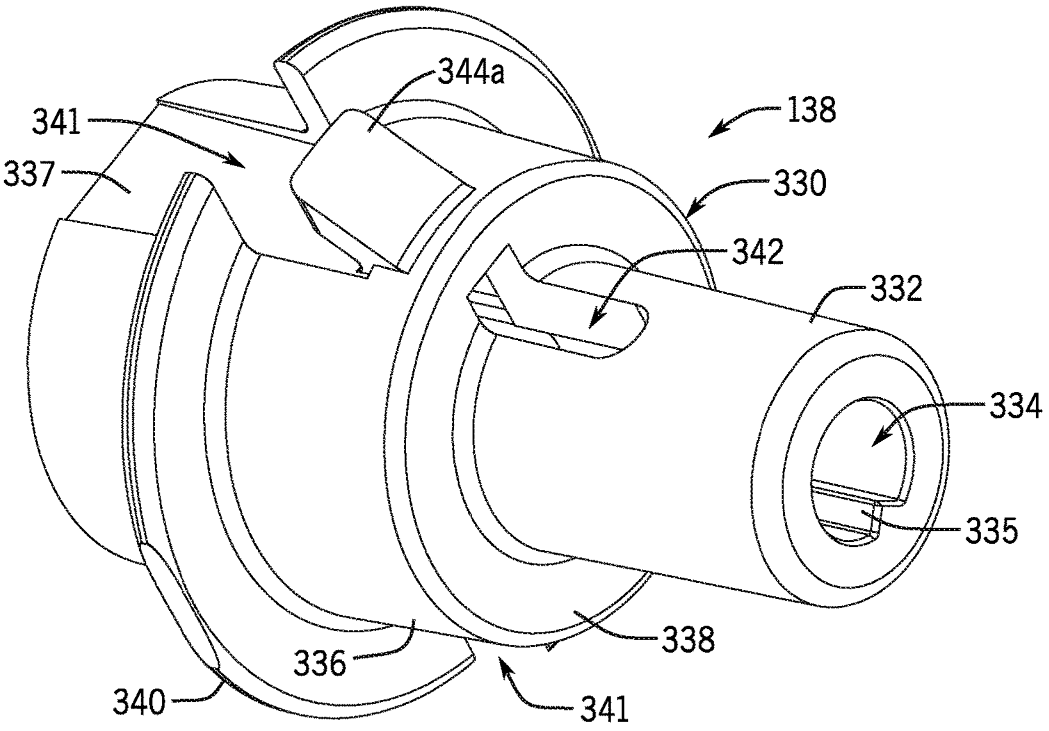
FIG. 29 is a front isometric view of an idle-end-mount of the idle-end mounting assembly of FIG. 1.
Figure 30:
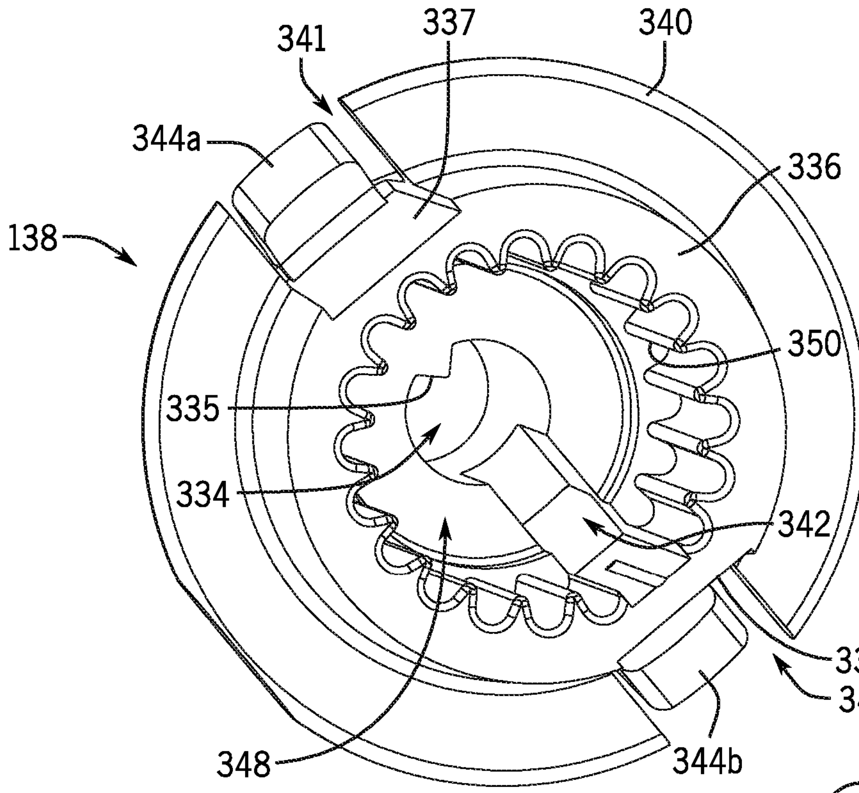
FIG. 30 is a rear isometric view of the idle-end-mount of FIG. 29.

Continuing with this example of the illustrated embodiment, the idle-end-mount 138 as shown in FIGS. 29 and 30 includes a body 330 having a first portion 332 that receives a central shaft 142 (see FIGS. 38-40), for instance in one example in a non-rotatable manner, and a second portion 336 that couples to the idle-end bracket-adapter 136, for instance in a non-rotatable manner. A cavity 334 may include a ridge 335 (also referred to as a "key") that mates with a corresponding groove formed on the central shaft 142 to resist any relative rotation between the two components. An aperture 342 may be formed in the outer wall of the first portion 332 for receiving a setscrew to optionally couple the central shaft 142 to the idle-end-mount 138.

The second portion 336 of the body 330 of the idle-end-mount 138 engages the idle-end bracket-adapter 136 as well as rotatably receives an optional idle-end rotating member size-adapter 140 (see FIGS. 38-40) that in turn engages the idle-end 106 of the rotating member 102. The second portion 336 is formed on the body 330 opposite the first portion 332 and has a cylindrical shape larger than the first portion 332, forming a shoulder 338. A cavity 348 may be formed in the second portion 336, which is configured to be non-rotatably received on a portion of the idle-end bracket-adapter 136 and is explained in greater detail below. In several embodiments, the second portion 336 of the body 330 may include circumferential engagement structure defined at or adjacent to the cavity 348 that is configured to engage the corresponding structure of the idle-end bracket-adapter 136. For instance in the illustrated embodiment, the second portion 336 of the body 330 includes inwardly directed splines 350 extending axially along all or a portion of the length of the sidewalls inside the cavity 348. In general, the splines 350 are sized in pitch, height, and/or length, to match with or otherwise circumferentially engage the outwardly directed splines 306 formed on the post 304 of the idle-end bracket-adapter 136, as explained in greater detail below. As indicated above, other engagement structure or elements may alternatively be used in place of or in addition to the splines described above, and in conjunction with corresponding engagement structure/elements on the post 304 of the idle-end bracket-adapter 136. In one embodiment, the cavity 348 may communicate with cavity 334 to form a continuous bore through the idle-end-mount 138. In some examples, the cavities 334, 348 may not communicate, such as where no drive assembly is included in the covering, or in other circumstances. A flange 340 radially extends from an outer surface of the second portion 336 and acts as a retaining feature for the idle-end rotating member size-adapter 140 (see FIGS. 38-40) when positioned on the idle-end-mount 138. The flange 340 extends at an intermediate location along the axial length of the second portion 336.

Figure 31:
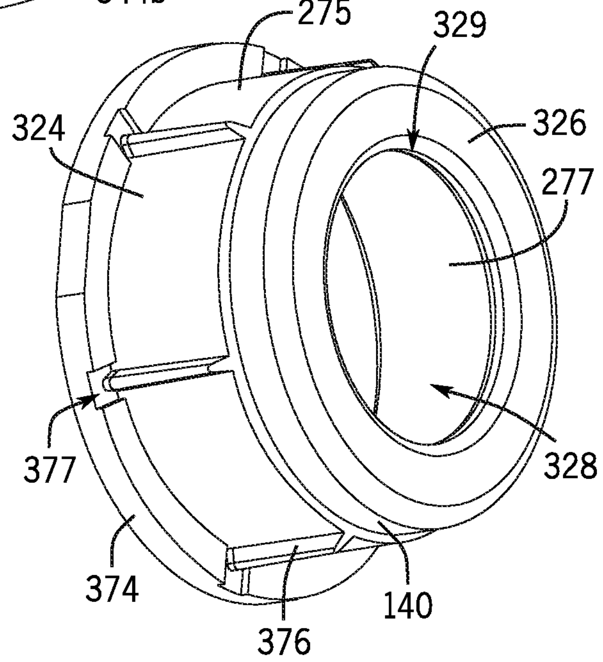
FIG. 31 is a front isometric view of a rotating member size-adapter of the idle-end mounting assembly of FIG. 1.
Figure 32:
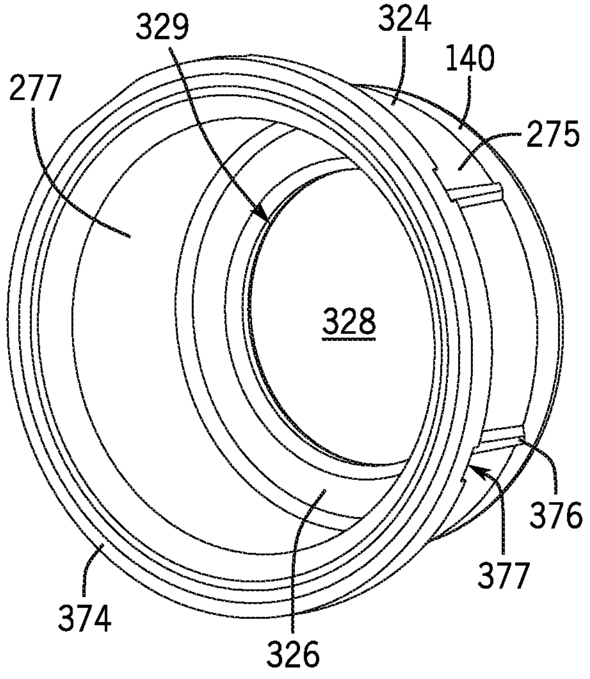
FIG. 32 is a rear isometric view of the rotating member size-adapter of FIG. 31.

As indicated above, the idle-end 106 of the rotating member 102 may be rotatably coupled with the bracket for relative rotation therewith, with the rotating member 102 rotatable relative to the idle-end-mount 138. An idle-end rotating member size-adapter 140, such as for example without limitation the idle crown, may be provided between the rotating member 102 and the idle-end-mount 138 in order to provide a bearing surface about which the rotating member 102 rotates relative to the idle-end-mount 138. The idle-end rotating member size-adapter 140 may be optional, such as where the idle-end bracket-adapter 136 includes a portion sufficiently sized to act as a bearing to rotatably couple with the idle-end 106 of the rotating member 102. In this example, the idle-end rotating member size-adapter 140 is rotatably received over the second portion 336 of the idle-end-mount 138. The idle-end rotating member size-adapter 140, as shown in FIGS. 31 and 32, has a sidewall 324 having an outer surface 275 and an inner surface 277, with the sidewall 324 having a generally cylindrical shape and defining a central aperture 329. A first end of the idle-end rotating member size-adapter 140 defines an annular flange 374 extending radially outwardly from the outer surface 275 of the sidewall 324. A second end of the idle-end rotating member size-adapter 140 defines an end wall 326, which defines a central aperture 329 for receiving an end of the idle-end-mount 138, as described below. The idle-end rotating member size-adapter 140 is positioned within the rotating member 102 in a manner so as to be non-rotatable relative to the rotating member 102. In this example, the non-rotatable engagement with the rotating member 102 is created by a press-fit engagement with the idle-end rotating member size-adapter 140. The press fit engagement of this example is created by a plurality of circumferentially-spaced tapered ridges 376 formed on the sidewall 324 that extend from generally adjacent the annular flange 374 axially along a portion of the sidewall 324. The tapered ridges 376 may taper (in a height dimension, a width dimension, or both) from a wide base adjacent the annular flange 374 to a nadir, which may be at an intermediate axial position along the sidewall 324. The annular flange 324 may define a number of chutes 377 positioned at the base of each of the tapered ridges 376. The tapered ridges 376 deform under compressive forces when the idle-end rotating member size-adapter 140 is press-fit and/or friction fit into the end of a rotating member 102, and couple the terminal end of the rotating member 102 in a position abutted against the annular flange 374. In some instances, portions of the tapered ridges 376 may deform or shear off of the sidewall 324 upon coupling with the rotating member 102 or otherwise during operation due to the compressive and shear forces acting on the interface between the sidewall 324 and the rotating member 102 as a motor rotates the rotating member 102 and supports the weight of the shade material 115. The chutes 377 allow for pieces of the tapered ridges 376 to be expelled from within the rotating member 102.

The idle-end-mount 138 may be received within the cavity 328 formed by the idle-end rotating member size-adapter 140, with the first portion 332 and a portion of the second portion 336 of the idle-end-mount 138 extending through the central aperture 329 of the end wall 326 of the idle-end rotating member size-adapter 140. The flange 340 of the idle-end-mount 138 may be positioned adjacent to or abutting with the inside of the end wall 326 of the idle-end rotating member size-adapter 140 to restrain any further movement of the idle-end-mount 138 through the central aperture 329 of the end wall 326. As shown in FIGS. 29 and 30, a resilient catch member or deflectable member 344*a*, such as a retention tab, extends at an angle from the second portion 336 adjacent the shoulder 338 and away from the first portion 332. The free end of the deflectable member 344*a* terminates to define a gap or space between it and the flange 340. The deflectable member 344*a* and the flange 340 define a securement structure. A second deflectable member 344*b* may be positioned opposite the other deflectable member, but is optional. Further flexible retention tabs may be used if desired. The flange 340 may be interrupted by gaps 341 aligned with each of the deflectable members 344*a*, 344*b*. An exterior wall of the second portion 336 may be formed with shallow, flat channels 337 aligned with each of the deflectable members 344*a*, 344*b* and the gaps 341 in the flange 340.

When the idle-end rotating member size-adapter 140 and the idle-end-mount 138 are assembled together, the deflectable member 344*a*, deflects towards the second portion 336 when passing through the central aperture 329 of the idle-end rotating member size-adapter 140, and resiliently moves outwardly to act as a catch or retaining member to resist or inhibit the idle-end-mount 138 from moving back through the central aperture 329 and separating the idle-end-mount 138 from the idle-end rotating member size-adapter 140. The end wall 326 of the idle-end rotating member size-adapter 140 is captured between the flange 340 of the idle-end-mount 138 and the retaining member formed by at least one deflectable member 344*a*. The second deflectable member 344*b*, or catch member, if present, may also act as a retaining member for the same purpose and help maintain a generally coaxial alignment of the idle-end-mount 138 within the idle-end rotating member size-adapter 140. The general coaxial alignment makes it easier to couple the idle-end 106 of the rotating member 102 onto the mounting bracket 116 using a spear-type installation technique. If the idle-end-mount 138 is in alignment, the cavity 348 of the idle-end-mount 138 is more easily positioned properly relative to the placing structure 310, for example the seat 312, of the idle-end bracket-adapter 136, as noted below with reference to FIG. 41.

The idle-end-mount 138 and the idle-end rotating member size-adapter 140 may be assembled together as explained above either before or after the idle-end rotating member size-adapter 140 is positioned inside the idle-end 106 of the rotating member 102. Typically, the idle-end rotating member size-adapter 140 is first press-fit into the idle-end 106 of the rotating member 102. The idle-end-mount 138 is then received within the cavity 328 of the idle-end rotating member size-adapter 140, which is held in place on the idle-end-mount 138 between the flange 340 and the deflectable member(s) 344*a* and 344*b*.

The idle-end of the cover assembly may be conveniently mounted on a support structure using the idle-end mounting assembly. The idle-end mounting assembly provides a repeatable, adjustable, and simple installation technique. A portion of the idle-end mounting assembly may be positioned on the idle-end of the cover assembly, and a portion of the idle-end mounting assembly may be positioned on the support structure. In one example, an idle-end rotating member end mount may be coupled with the idle-end of the cover assembly, and a bracket may be coupled to the support structure. The idle-end rotating member end mount may be received in an engagement structure on the bracket to mount the idle-end of the cover assembly on the support structure. In this example, the coupling between the engagement structure and rotating member end mount is defined by a nesting engagement.

The idle-end rotating member end mount may include the idle-end-mount together with the idle-end size-adapter. The idle-end rotating member end mount may be positioned at least partially within and adjacent to an end (e.g., the idle-end) of the rotating member and used to couple the idle-end of the rotating member with the bracket, and specifically with the idle-end bracket-adapter positioned in the idle-end bracket. The idle-end rotating member end mount may engage the idle-end bracket-adapter in a non-rotatable manner, and may engage the idle-end of the rotating member in a rotatable manner. The idle-end rotating member end mount may be assembled in the rotating member before shipping to the user. In some examples, the idle-end rotating member end mount 352 (FIG. 38) may comprise the idle-end-mount 138 where used separately from the idle-end rotating member size-adapter 140, such as when it is used to rotatably support a rotating member 102 without the use of a rotating member size-adapter. As indicated above, the coupling between the idle-end-mount and the engagement structure on the idle-end bracket-adapter may be defined as a nesting engagement, which in one example is where two or more components are assembled so that at least a portion of one component is positioned within or received by a portion of another component.

FIGS. 36, 37, 38, 39, and 40 show the idle-end-mount 138 assembled with the idle-end rotating member size-adapter 140, forming the idle-end rotating member end mount 352 as noted above, and in this example are positioned together in the idle-end 106 of the rotating member 102. The idle-end rotating member size-adapter 140 may be rotatably received over or coupled with the boss 296 of the idle-end bracket-adapter 136, rotatably received on the idle-end-mount 138, and non-rotatably engaged or coupled with the rotating member 102 in order to provide a bearing surface for the rotating member 102 on the boss 296. The idle-end-mount 138 may be a separate component from the idle-end rotating member size-adapter 140, as in this example, in order for a larger or smaller sized idle-end rotating member size-adapter to be used to allow different sizes of shades (e.g., having larger or smaller diameter rotating members) to be attached to the idle-end mounting bracket 116 using a shared idle-end-mount 138 configuration and a shared idle-end bracket-adapter 136 configuration. As discussed above, additional adapters may be used to facilitate use of larger or smaller diameter rotating members.

The idle-end-mount 138, with reference here to FIG. 40, may be received at least partially within and adjacent to an end of the rotating member 102. The first portion 332, or coupling portion, of the idle-end-mount 138 may be in operable engagement with the central shaft 142 of the drive unit, and at least a portion of the second portion 336 adjacent to the end of the rotating member 102. The second portion 336 of the idle-end-mount 138 may define an engagement portion 349 of the idle-end-mount 138 for receipt in a placing structure 310. In one illustrative embodiment, the placing structure 310 may include, for example, a seat 312 on the idle-end bracket-adapter 136 positioned in the mounting bracket 116 as indicated in FIG. 40 and may also include suitable circumferential engagement structure of the idle-end bracket-adapter 136 (e.g., splines 306).

The idle-end mounting assembly 126 may include the engagement portion 349 of the idle-end-mount 138 received in the seat 312 formed by the idle-end bracket-adapter 136 with continuing reference to FIG. 40. In one example, this is considered to be a nesting engagement or a female/male engagement, where one portion is received within another component of the assembly, which is an efficient manner of stacking or coupling components to reduce an assembled dimension. For example, the cavity 348 of the idle-end-mount 138 may be aligned with the post 304 of the idle-end bracket-adapter 136, and the engagement portion 349 may be received over the post 304, and within the boss 296, again in one example of a nesting engagement or a female/male engagement, to non-rotatably engage the idle-end 106 of the rotating member 102 to the idle-end mounting bracket 116.

Additionally, in this example of the embodiment, the idle-end-mount 138 and the idle-end rotating member size-adapter 140 may be mounted on the idle-end bracket-adapter 136 regardless of the circumferential orientation of any of these components. For example, as indicated above, the corresponding engagement structure or elements of the idle-end bracket-adapter 136 and the idle-end-mount 138 may allow for the idle-end-mount 138 to be installed relative to the idle-end bracket-adapter 136 at a plurality of different circumferential orientations. Specifically, in the illustrated embodiment, the mating splines 306, 350 may allow for the circumferential orientation of the idle-end-mount 138 to be incrementally adjusted relative to the idle-end bracket-adapter 136. In such an embodiment, the circumferential resolution or degree to which the circumferential orientation of the idle-end-mount 138 may be adjusted relative to the idle-end bracket-adapter 136 may vary depending on, for example, the number, dimensions (e.g., the circumferential width), and/or circumferential spacing of the splines 306, 350. For instance, in one embodiment, the engagement structure for the idle-end bracket-adapter 136 and the idle-end-mount 138 may allow for the circumferential orientation of the idle-end-mount 138 to be adjusted relative to the idle-end bracket-adapter 136 in circumferential increments corresponding to less than 90 degrees, such as less than 45 degrees, or less than 30 degrees or less than 20 degrees or less than 15 degrees or less than 10 degrees and/or any other subranges therebetween.

In the illustrated embodiments referenced above, the idle-end rotating member end mount 352 may be formed of multiple components separably engaged together, such as the idle-end-mount 138 and the idle-end rotating member size-adapter 140 as noted above. However, it will be appreciated that the multiple components may be combined into a single component without detracting from the scope of the present disclosure.

The fully assembled idle-end mounting assembly 126 is shown in FIGS. 38, 39, and 40, with the rotating member 102 shown in broken lines. The idle-end mounting bracket 116 receives the idle-end rotating member end mount 352 (including in this example the idle-end-mount 138 and the appropriate (and optional) idle-end rotating member size-adapter 140 for the selected rotating member). An optional collar 370 may be placed over the first portion 332 of the idle-end-mount 138 to couple the idle-end-mount 138 to the central shaft 142, such as by a setscrew 372. The collar 370 helps reduce the deformation of the idle-end-mount that may be caused by repeated torsional loads applied during extension and retraction of the shade material 115. The collar 370 supports and maintains the outer dimension of the first portion 332 of the idle-end-mount 138, and thereby keeps it in a fixed position with respect to the central shaft 142. An end cap cover 158 may be positioned over the edges and outer surface of the second portion of the mounting bracket 116 to cover the primary aperture 153 and opening into the rotating member 102 as well as to provide a finished appearance.

Figure 49:
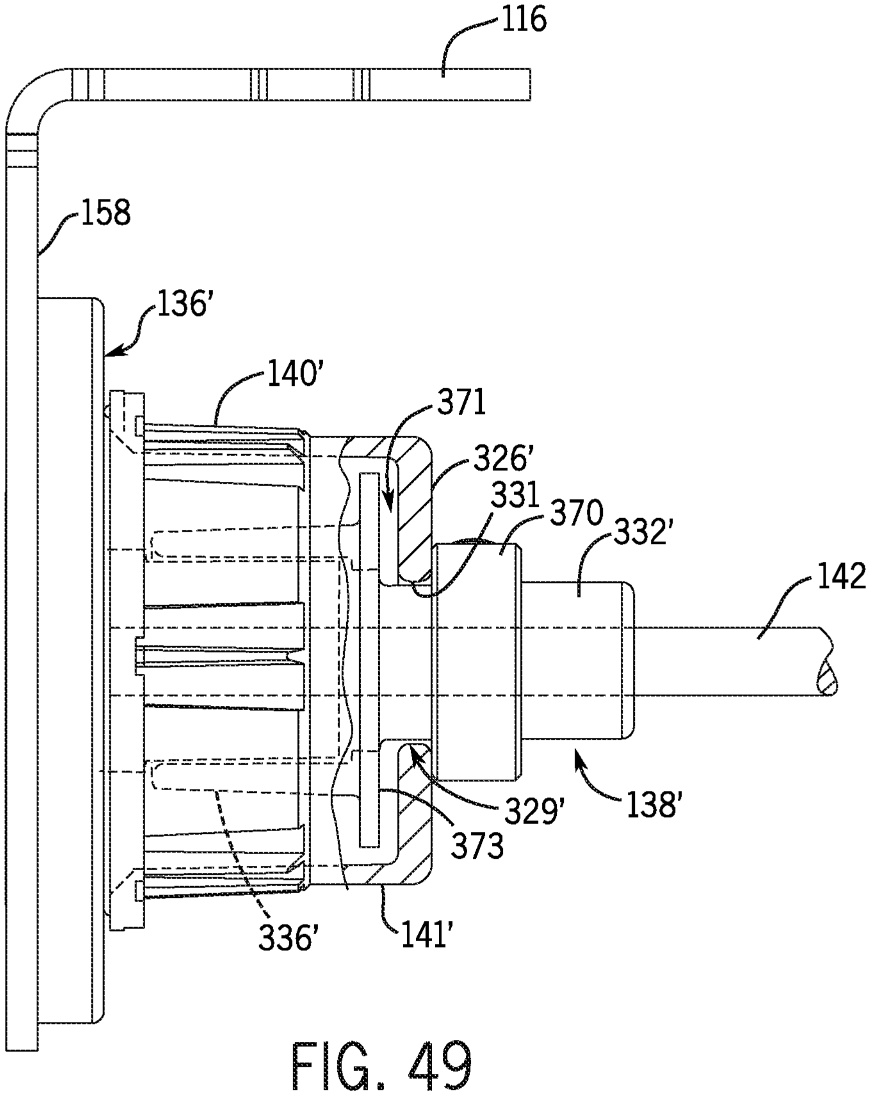
FIG. 49 is a section of one illustrative example of an alternate example of the idle-end mounting assembly.

Another illustrated embodiment of the idle-end mounting assembly is shown in FIG. 49, which is similar to FIG. 39, except that the idle-end bracket-adapter 136' is simplified to not include a boss 296, and the idle-end rotating member size-adapter 140' rotatably engages the first portion 332' of the idle-end-mount 138' as opposed to the larger second portion 336'. This allows the idle-end-mount 138' to have a shorter longitudinal dimension for space saving benefits. The idle-end-mount 138' is modified to allow the positioning of the idle-end rotating member size-adapter 140' without use of the deflectable members 344*a* and 344*b*, as shown in FIG. 39. The idle-end rotating member size-adapter 140' is modified to be positioned over the first portion 332' of the idle-end-mount 138', as opposed to the larger second portion 336'. In this example, as with the embodiment shown in FIGS. 36-39, the idle-end-mount 138' is coupled by a spearing motion to the idle-end bracket-adapter 136', and receives the central shaft 142. The idle-end-mount 138' is fixed to the shaft by collar 370, which is coupled to the shaft, such as by a setscrew. The idle-end-mount 138' does not include the deflectable members 344*a* or 344*b* included in the embodiment of FIG. 39.

Continuing with FIG. 49, the idle-end rotating member size-adapter 140' is positioned on the idle-end-mount 138' by being placed in a gap 371 formed between an annular flange 373 and collar 370. Idle-end rotating member size-adapter 140' has a main body 141' defining an end wall 326' having a central aperture 329'. The idle-end rotating member size-adapter 140' is rotatably positioned around the idle-end-mount 138' with the first portion 332' positioned through central aperture 329' of the end wall 326'. The end wall 326' of the rotating member size-adapter 141' fits in the gap 371, and is trapped by the securement structure formed by the collar 370 (coupled to the central shaft 142 and circumferential wall 373, thereby maintaining the end wall 326' within gap 371 and thus holding the idle-end rotating member size-adapter 140' in position. The central aperture 329' of end wall 326' has a diameter smaller than the diameter of the collar 370 or the circumferential wall 373, and is thus captured therebetween to rotate about the smaller first portion 332'. The end wall 326' fits within the gap 371 to allow the idle-end rotating member size-adapter 140' to rotate with the rotating member 102 and relative to the idle-end-mount 138'. The idle-end bracket-adapter 136' of FIG. 49 does not include a boss 296 (FIG. 39) to support the rotation of the idle-end rotating member size-adapter 140'. While the idle-end rotating member size-adapters 140, 140' of the embodiments shown in FIGS. 39 and 49 both rotate relative to and bear upon the respective idle-end mounts 138 and 138', they bear on different portions of their respective idle-end mounts. In the embodiment shown in FIG. 49, the annular wall 331 forming the central aperture 329' of the idle-end rotating member size-adapter 140' bears on the first portion 332' of idle-end-mount 138' as it rotates, in distinction to the example of FIG. 39 where the idle-end rotating member size-adapter 140 rotatably bears on the second portion 336 of idle end mount 138.

The idle-end mounting assembly 126 not only creates a standardized assembly structure for various size coverings, but may also reduce the size of the light gap at the idle-end of the covering. The light gap at the idle-end may be the same as or approximately the same as the light gap formed at the control-end of the covering. The narrow light gap may be achieved by nesting at least two or more of the components forming the idle-end mounting assembly 126. In at least one example, the components are nested by the reception of the idle-end rotating member size-adapter 140, the idle-end-mount 138 and the boss 296 of the idle-end bracket-adapter 136 within the rotating member 102, which allows the idle-end 106 of the rotating member 102 and the shade material 115 rolled-up thereon to be positioned very close to the mounting bracket 116. Further, since the mounting structure 152 formed in the mounting bracket 116 may be defined within the thickness of the material, i.e., the primary aperture 153 and the key features 172; the contribution to the light gap by the mounting bracket 116 is limited.

For example, as shown in FIG. 39, the light gap 360 on this idle-end may be 0.430" or less, and in another example approximately 0.417" or less, between the inner edge 362 of the annular flange 374 of the idle-end rotating member size-adapter 140 and the outer surface of the end cap cover 158. If measured without the end cap cover 158, and instead to the outer surface 365 of the mounting bracket 116, the light gap may be approximately 0.339" or less. This light gap dimension includes skew accommodation for the lateral movement of the edge of the shade material on the rotating member 102 upon extension or retraction, and may be approximately 0.100" or less. The skew accommodation 361 is measured between the inner edge 362 of the annular flange 374 of the idle-end rotating member size-adapter 140 and the outer edge 364 of the annular flange 374 of the idle-end rotating member size-adapter 140 against which the edges of the shade material seats. As noted above, typical light gaps formed by other bracket assemblies are substantially larger.

Figure 41:
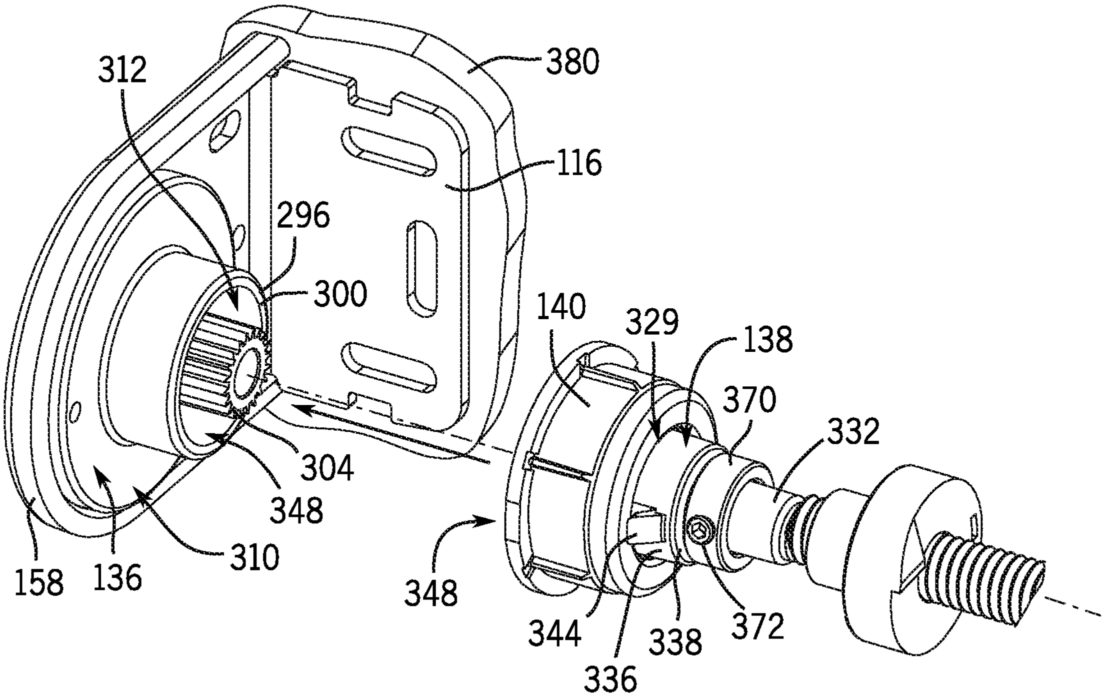
FIG. 41 is a schematic, isometric exploded view of the idle-end mounting assembly of FIG. 38, showing the idle-end rotating member mount moving axially in a spear-type motion to couple with the engagement structure on the bracket.
Figure 42:
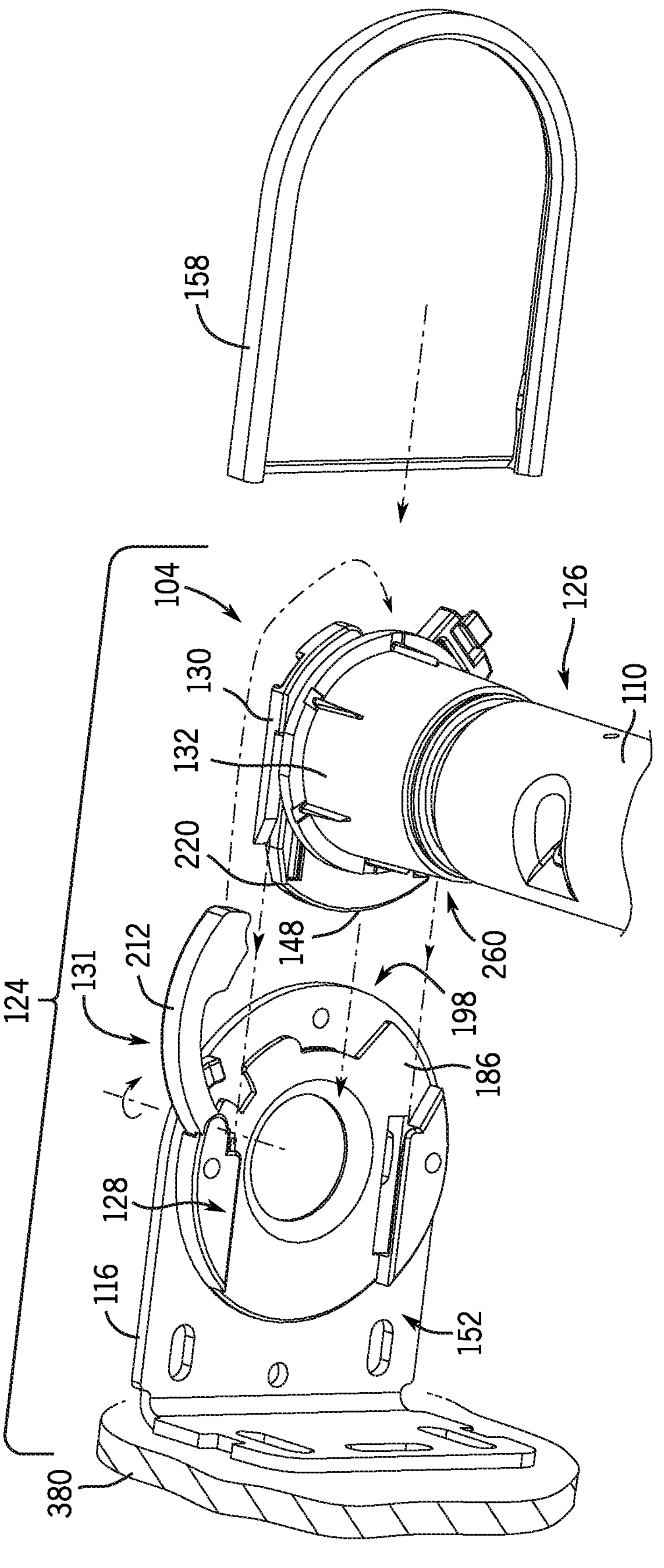
FIG. 42 is a schematic, isometric view of the control-end mounting assembly of FIG. 1, showing the control-end rotating member end mount moving laterally in a sliding motion to couple with the engagement structure on the bracket.

Installation of a covering having a mounting assembly as disclosed herein is simple, precise, repeatable, and requires less adjustment. Additionally or independently, the mounting assembly structure facilitates simplified installation of the covering 100 in the mounting brackets 116 as shown in FIGS. 41 and 42. The combination of the idle-end mounting assembly 126 at one end and the control-end mounting assembly 124 at the other end facilitates a robust engagement of the covering 100 with the respective mounting brackets 116.

The installation of a cover assembly with an idle-end mounting assembly, in one non-limiting example, includes a spear technique, where the idle-end of the cover assembly is axially moved toward the mounting structure on the bracket to couple together. More specifically, the idle-end is axially aligned with the mounting structure of the idle bracket, and then the idle-end is moved towards the idle bracket to axially couple the idle-end with the mounting structure on the idle bracket. Once the idle-end is coupled to the idle bracket, the circumferential orientation of the cover assembly relative to the bracket may be adjusted, as necessary or desired, by axially decoupling the idle-end from the mounting structure on the idle bracket and rotating the cover assembly relative to the bracket to permit relative "clocking" or adjustment of the circumferential alignment of the engagement structure provided between the idle-end and the idle bracket. Additionally, in one embodiment, the installation of a cover with a control-end mounting assembly includes a slide technique, where the control-end is moved generally laterally into a seat formed in the mounting structure of the control bracket. More specifically, the control-end of the cover assembly is positioned off-axis from the mounting structure of the control bracket, and is laterally spaced away from the mounting structure and aligned with an opening to the seat formed by the engagement structure on the mounting bracket. The control-end is then moved laterally, or slid, into the seat of the mounting structure to couple the control-end to the control bracket. Moreover, where a cover includes an idle-end mounting assembly at one end of the cover assembly, and a control-end mounting assembly at the opposing end of the cover assembly, then the installation may include spearing the idle-end to couple the idle-end with the idle bracket and pivoting the cover assembly about the idle-end to allow the control-end to be slid or otherwise moved into engagement with the corresponding structure of the control bracket.

In particular, and as one example of installing a cover according to one illustrated embodiment described herein, the covering 100 may be prepared by positioning the idle-end rotating member end mount 352 in the idle-end 106 of the rotating member 102, and positioning the control-end rotating member end mount 260 in the control-end 104 of the rotating member 102. The two mounting brackets 116 are each attached to a support structure 380 (e.g., a wall or ceiling) at the proper distance apart to receive the length of the rotating member 102. The idle-end bracket-adapter 136 may be attached to the mounting bracket 116 corresponding to the idle-end 106 of the rotating member 102. Similarly, the control-end bracket-adapter 128 may be attached to the mounting bracket 116 corresponding with the control-end 104 of the rotating member 102. The entry 198 of the seat 186 in the control-end bracket-adapter 128 may, for example, be oriented outward with respect to the architectural feature and accessible to the installer. As an example, FIG. 41 shows the mounting bracket 116 on the idle-end 106 attached to a support structure 380.

In several embodiments, the axially-directed, spear mounting of the idle-end occurs before the laterally-directed slide, mounting of the control-end. For example, the female engagement portion of the idle-end-mount 138 (e.g., the cavity 348) may be initially aligned axially with the male engagement portion of the idle-end bracket-adapter 136 (e.g., the post 304) as shown in FIG. 41. In doing so, the circumferential orientation of the idle-end-mount 138 relative to the idle-end bracket-adapter 13$ may also be adjusted, as necessary, by rotating the idle-end-mount 138 (and, thus, the rotating member 102 coupled thereto) to provide the desired circumferential alignment between the corresponding engagement structure provided between the idle-end-mount 138 and the idle-end bracket-adapter 136 (e.g., splines 306, 350). Once aligned properly (e.g., both axially and circumferentially), the idle-end-mount 138 may be moved axially, in a spear-like motion, and received over the post 304 to allow for engagement between the corresponding circumferential engagement structure provided at the interface between the idle-end-mount 138 and the idle-end bracket-adapter 136. The idle-end-mount 138 and idle-end-mount rotating member size-adapter 140 may then be positioned against the idle-end bracket-adapter 136 to form the idle-end mounting assembly 126. As indicated above, if it is determined that the circumferential alignment of the cover assembly relative to the bracket(s) (or relative to the adjacent architectural feature) is not as desired, the idle-end-mount 138 may be moved axially away from the idle-end bracket-adapter 136 to disengage the components and to allow the idle-end-mount 138 (and, thus, any covering components coupled thereto) to be rotated relative to the idle-end bracket-adapter 136. Once the circumferential orientation has been adjusted, the idle-end-mount 138 may then be re-speared onto the idle-end bracket-adapter 136 as described above.

With the idle-end mounting assembly 126 completed using the spear motion, the control-end rotating member end mount 260 at the control-end 104 of the covering is coupled to the control-end mounting bracket 116 using a sliding motion. Particularly, the leading edge 148 of the base plate 220 of the control-end-mount 130 may be off-axis and spaced laterally away from the mounting structure 152 of the mounting bracket 116 but aligned with the entry 198 of the seat 186 in the control-end bracket-adapter 128, as shown in FIG. 42 (rotating member not shown for clarity). The retention structure 131 is in a position so the entry 198 is open to receive the control-end rotating member end mount 260. In this example as illustrated, the retention structure 131 is shown by retention arm 212 pivoted to a position so the entry 198 is unobstructed. FIG. 42 also shows the end cap cover 158 in position to be slid over and retained on the mounting bracket 116.

Continuing with FIG. 42, once properly aligned, the cover assembly 114 may be generally pivoted about the idle-end mounting assembly 126, moving the base plate 220 of the control-end-mount 130 through a slight arc, such as a curved path, or in a path having a radius of curvature defined in part by the length of the rotating member 102. The curvature of the arc may be accommodated in the tolerances designed into the seat 186 of the control-end bracket-adapter 128 and the base plate 220 of the control-end-mount 130. The base plate 220 may then be translated and slid through the entry 198 and into position in the seat 186 of the control-end bracket-adapter 128. Depending on the orientation of the control-end bracket-adapter 128, the seat 186 may be oriented with the entry 198 open in many different directions, such as downwardly or facing into the room, or other orientations. The base plate 220 may slide through the entry 198 of the seat 186. The attachment of the control-end-mount 130 to the control-end bracket-adapter 128 forms the control-end mounting assembly 124. The retention structure 131 is then closed, and in this example as illustrated, the retention structure 131 may be retention arm 212 of the control-end bracket-adapter 128 which may be pivoted to a closed position to engage with features in the control-end-mount 130 to couple the control-end-mount 130 into the control-end bracket-adapter 128, and to the mounting bracket 116. The end cap cover 158 may then be positioned on the mounting bracket 116.

It should be appreciated that the installation of the covering 100 into the mounting brackets 116 that may be afforded by the mounting assemblies 124, 126 is quick and accurate, with a reduced level of adjustment required at the installation site. In this regard, the spear mounting system is quite distinct from the installation technique used for basic shades, such as some shade assemblies. At least one distinction is that the control-end and idle-end mounting assemblies reduce the necessity of adjusting the length of the mounting components because the nesting relationship between the idle-end-mount and the corresponding engagement structure of the idle-end bracket allows for some relative telescopic or axial movement after the spear engagement is completed. Additionally or optionally, the coupling does not require tools for coupling or adjustment once the brackets are mounted on the support structure.

An alternative illustrative embodiment of the control-end mounting assembly 124 of the shade described above with respect to FIGS. 3-23 is shown in FIGS. 43, 44, 45, 46, and 47. In the earlier example, such as with respect to FIG. 42, a portion of the control-end rotating member end mount 260 may be received in the seat 186 formed on the control-end bracket-adapter 128 and the annular rim 204 of the control-end bracket-adapter 128 may be positioned in the mounting structure 152, i.e., the primary aperture 153, in the mounting bracket 116. The multiple alignment (also, orientation) key features 172 about the primary aperture 153 allow the seat 186 to be re-oriented within the mounting bracket 116 to accommodate different installation orientations of the mounting bracket 116.

However, in the alternative illustrative embodiment shown in FIGS. 43, 44, 45, 46, and 47, the bracket-adapter is eliminated and an alternative seat 486 may be formed as an integral part of an alternative form of a bracket 416. In such an embodiment, the control-end rotating member end mount 560 may be received directly into the seat 486 without the need for a bracket-adapter component. For example, the seat 486 may be formed by a plurality of engagement elements, such as clips 472 positioned directly on the bracket 416. The seat 486 formed by the dips 472 may also be considered an illustrative example of the engagement portion of the mounting structure formed directly on the bracket 416, akin to the opposing rails 184 on the control-end bracket-adapter 128 of the embodiment illustrated in FIG. 42.

Figure 43:
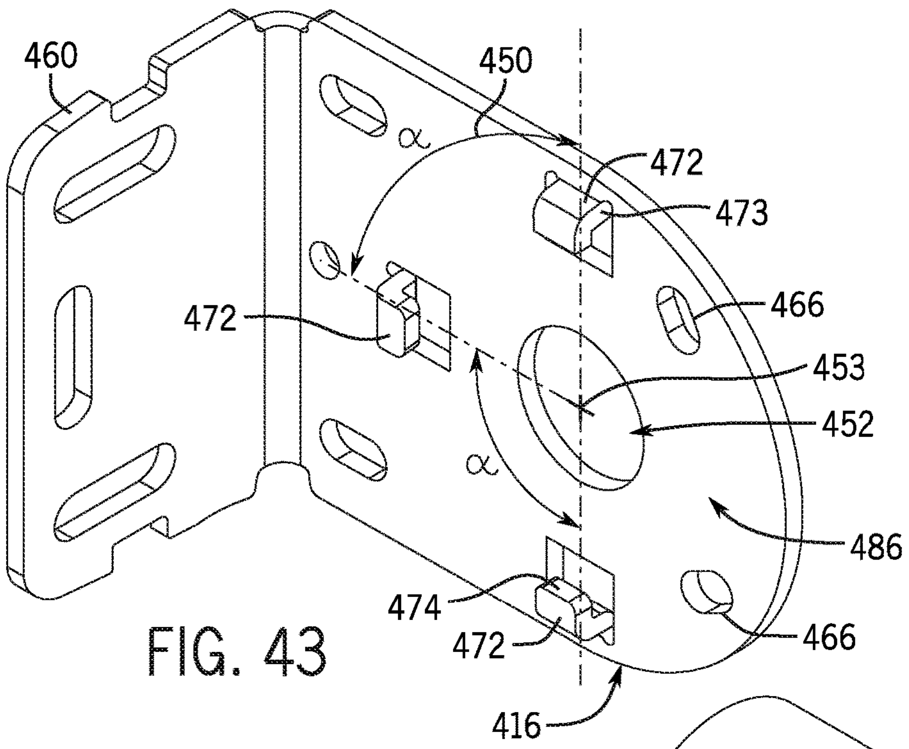
FIG. 43 is an isometric view of one illustrative example of a bracket in an alternate embodiment of a mounting assembly, the bracket defining a mounting structure and engagement structure.
Figure 45:
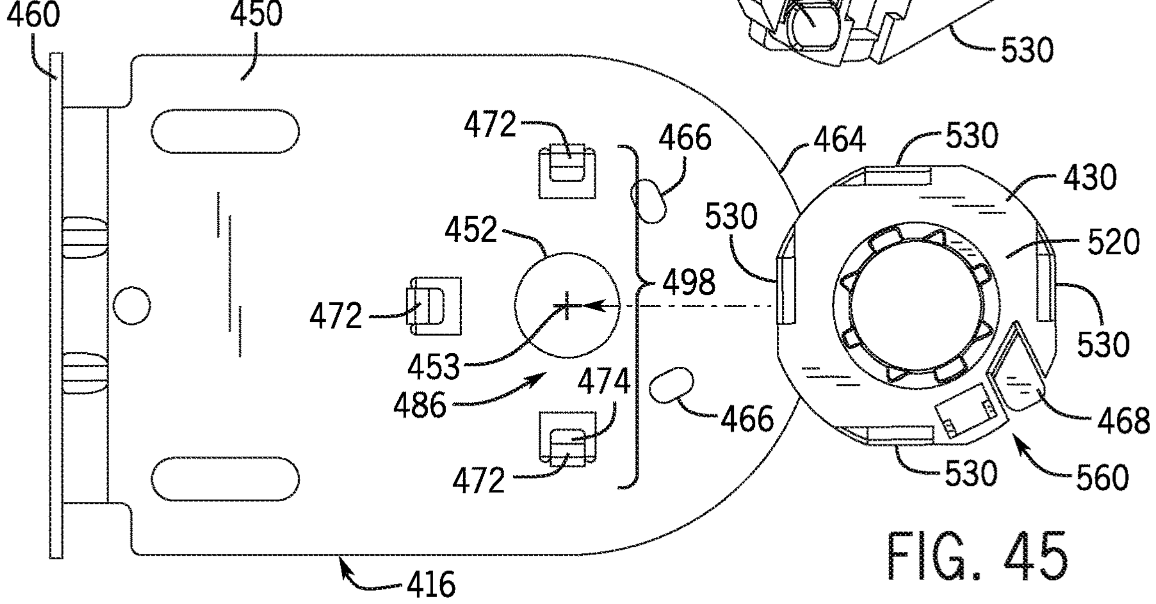
FIG. 45 is a front elevation view of the bracket of FIG. 43 and the control-end-mount of FIG. 44 positioned for insertion of the control-end-mount into the bracket by a lateral, sliding motion.
Figure 46:
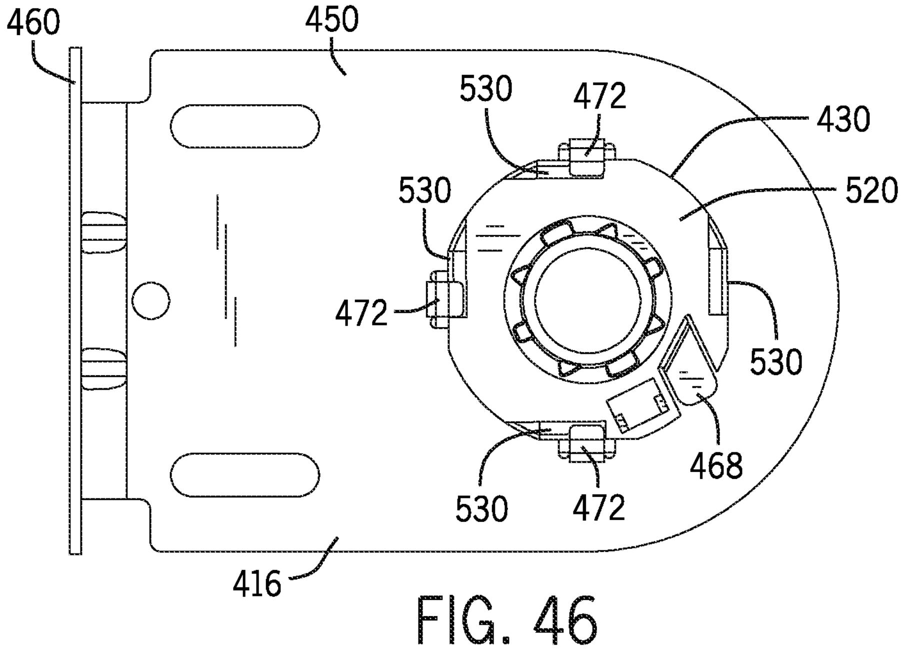
FIG. 46 is a front elevation view of the bracket of FIG. 43 and the control-end-mount of FIG. 44 positioned in the bracket.

FIG. 43 shows a mounting bracket 416 having a first portion 450 with an optional curved front edge 464 and a second portion 460, and is shown oriented for use in mounting the covering to a wall through the second portion 460. The general shape of the mounting bracket 416 may be similar to that of the mounting bracket 116 described above, and may also have other shapes. The first portion 450 defines a primary aperture 452 and a seat 486 for receiving the control-end rotating member end mount 560 in a select variety of bracket orientations (an example of which is shown in FIGS. 45 and 46).

As indicated above, the seat 486 may, in one embodiment, be defined by a plurality of clips 472 positioned on an inner surface of the first portion 450 of the mounting bracket 416. The clips 472 are sized and oriented to receive the control-end-mount 430. Each clip 472 has an extension portion 473 extending away from the first portion 450, and a tab portion 474 extending from a top end of the extension portion 473 and inwardly toward a central region of the first portion 450. In one example, a clip 472 may have an "L" shape. The extension portion 473 spaces the tab portion 474 of each clip 472 away from the inner surface of the first portion 450 to form the seat 486 for receiving the opposing flanges 530 of base plate 520 of the control-end-mount 430. The tab portions 474 capture and retain the opposing flanges 530. The seat 486 is an example of engagement structure that is configured to couple to the control-end-mount 430. In the example shown in FIGS. 43 and 45, more than one clip, in this example three clips 472, are positioned about the primary aperture 452, each at an angle alpha from the other. In the illustrated example of this embodiment, the clips 472 are positioned equidistant about the primary aperture 452 at angle alpha equaling 90 degree intervals, with a first clip positioned directly above the center 453 of the aperture 452, a second clip positioned laterally and away from the front edge of the first portion 450 and 90 degrees offset from the first clip, and a third clip positioned opposite the first clip and 90 degrees offset from the second clip. The clips 472 together form the seat 486 of the engagement structure for receiving an engagement portion, e.g., opposing flanges 530 on the base plate 520 of the control-end-mount 430, and the space between the first and third clips forms the opening or entry 498 in the seat 486. The clips 472 may be stamped out of the bracket material, or may be otherwise attached to the first portion 450 of the bracket 416.

Figure 44:
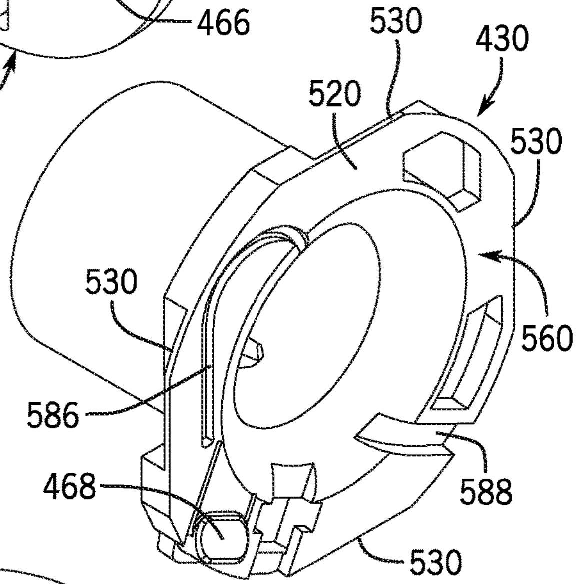
FIG. 44 is an isometric view of an alternate embodiment of a control-end-mount configured to couple to the bracket of FIG. 43.
Figure 47:
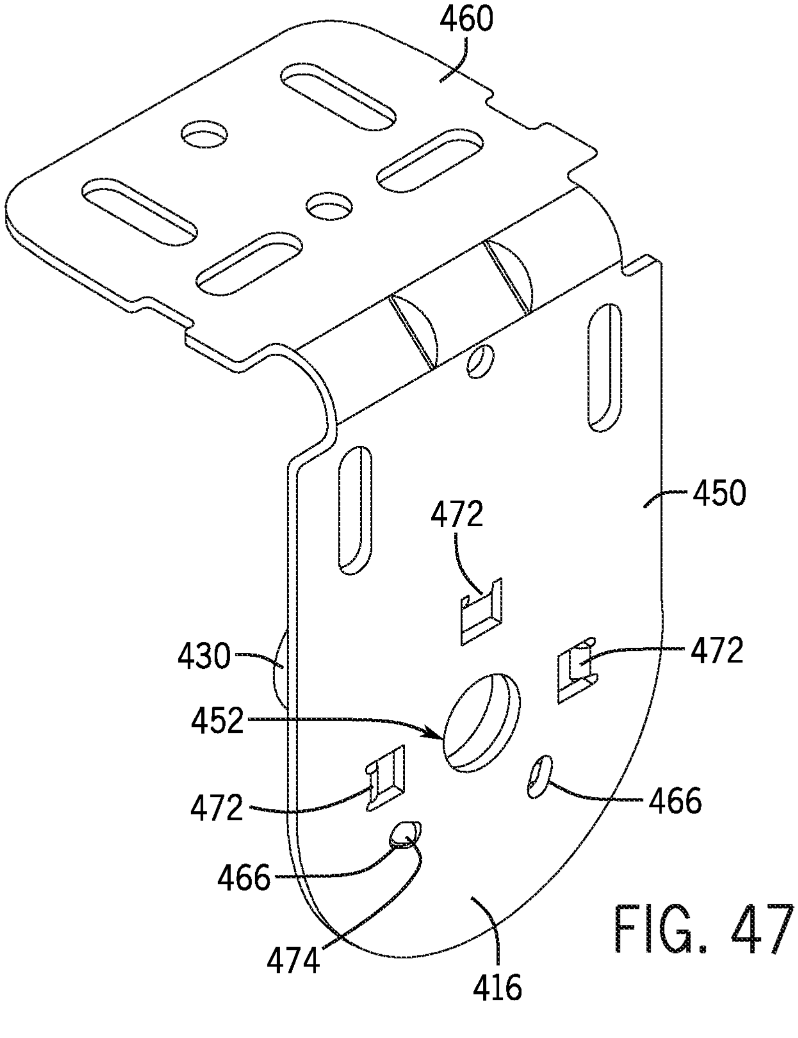
FIG. 47 is a rear isometric view of the control-end-mount of FIG. 44 positioned in the bracket of FIG. 43.

With reference to FIG. 44, the control-end-mount 430 of this example may be structurally similar to the control-end-mount 130, for instance as shown in and described with respect to FIG. 22. For example, the base plate 520 may include an antenna wire slot 586 and a power wire slot 588. Also, as noted above, the base plate 520 defines opposing flanges 530 configured for the coupling of the control-end-mount 430 to the seat 486 on the mounting bracket 416. However, in this embodiment, opposing flanges 530 may be formed on all four sides of the base plate 520 to allow for mounting the control-end-mount 430 within the clips 472 in multiple orientations. Another distinction is that the base plate 520 includes a retention feature in the form of an integral spring tab 468. When mounted in the seat 486, as shown in FIGS. 46 and 47, the tab portion 474 on the end of the spring tab 468 may be biased into one of several retention apertures 466 (shown in FIGS. 43 and 45) formed in the second portion of the bracket. Engagement of the spring tab 468 in one of the retention apertures 466 selectively fixes the base plate 520 in the seat. As should be appreciated, the specific retention aperture 466 engaged will depend upon the orientation of the control-end-mount 430. To remove the base plate 520 from the seat 486, and, thus, the covering from the mounting bracket 416, the lobe of the spring tab 468 may be pushed out of the retention aperture 466 from the second side of the first portion of the mounting bracket 416 (as shown in FIG. 47).

Figure 48:
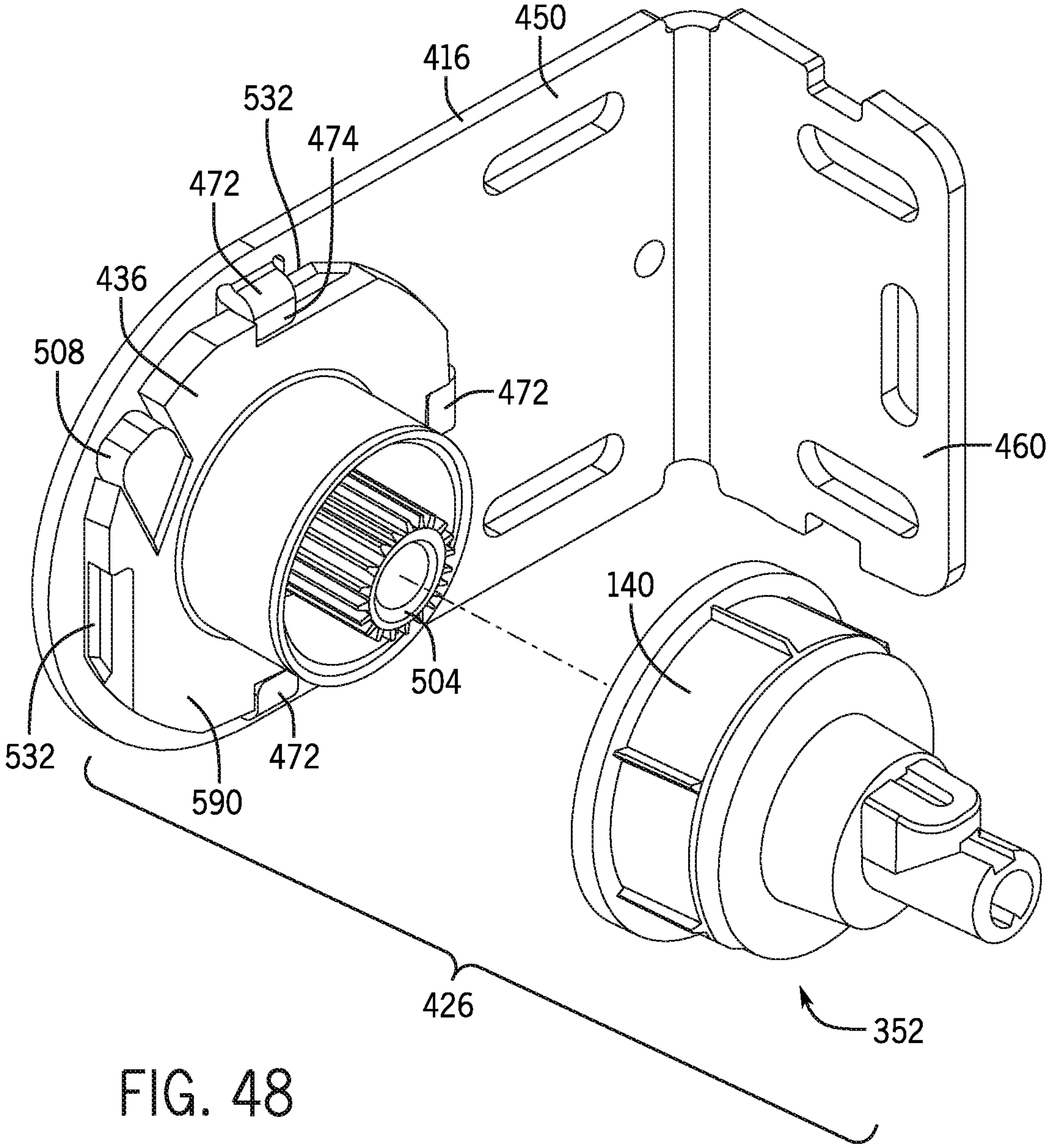
FIG. 48 is a schematic, isometric view of the alternate embodiment of the bracket of FIG. 43, showing the idle-end-mount and rotating member size-adapter being coupled by an axial spearing motion to a bracket adapter coupled to the bracket.

An alternative illustrative embodiment of the mounting assembly for the idle-end 106 of the cover assembly 114 described above, for instance with respect to FIG. 41, is shown in FIG. 48. The bracket 416 of FIG. 43 may also be usable as the bracket for mounting the idle-end 106 of the covering. In this illustrative example, the idle-end bracket-adapter 436 may be received in mounting structure formed on the mounting bracket 416 by the clips 472 as described above with respect to FIGS. 43, 44, 45, 46, and 47, and shown in FIG. 48. Similar to the control-end-mount 430, the idle-end bracket-adapter 436 may be formed with recessed flanges 532 on each side of the base plate 590. The mounting structure formed by the clips 472 performs a similar function as the mounting structure formed by the primary aperture 153 of the mounting bracket 116 (and related fastening screws in apertures 322) and allows for re-orientation of the idle-end bracket-adapter 436 within the mounting structure.

Further referring to FIG. 48, the base plate 590 of the idle-end bracket-adapter 436 may be received in the mounting structure formed by the clips 472 on the bracket 416, and may be coupled or captured in that position by the lobe (not visible) on the end of the spring tab 508, which may be biased into a retention aperture 466 formed in the second portion of the bracket 416. The idle-end rotating member end mount 352 is shown in FIG. 48 aligned with a male engagement portion of the idle-end bracket-adapter 436 (e.g., post 504) for engagement of the two together to form the idle bracket mounting assembly 426. For instance, the idle-end bracket-adapter 436 may be axially speared onto the post 504 to couple the components together (e.g., via engagement of their corresponding circumferential engagement structure, such as splines or other suitable engagement elements. As shown, the idle-end rotating member end mount 352 may be of the same structure as in the prior illustrative embodiments or it could be formed as a different structure as long as it is configured to interface with the male engagement portion of the idle-end bracket-adapter 436 in a manner consistent with the disclosure provided herein.

In several embodiments, the mounting assembly may be constructed of substantially any type of material. For example, the assembly components may be constructed from natural and/or synthetic materials, including metals, ceramics, plastics, and/or other suitable materials that insulate against static electricity discharge. Plastic materials may include thermoplastic material (self-reinforced or fiber-reinforced), ABS, polycarbonate, polypropylene, polystyrene, PVC, polyamide, or PTFE, among others. The components may be formed or molded in any suitable manner, such as by plug molding, blow molding, injection molding, or the like. In many of the illustrative embodiments disclosed herein, the brackets may be made of thin steel plate or other metal with the various apertures, openings, and tab features stamped or cut therein. The motor assembly 110 in some of the illustrative embodiments may also be made of molded or stamped steel or metal components to provide adequate strength for support of the motor assemblies. It is anticipated that most of the other adapter assemblies disclosed in the illustrative embodiments may, in certain embodiments, be made of plastic materials, which provide sufficient strength and rigidity for the purposes of the mounting systems described herein.

In a particular embodiment, the control-end bracket-adapter 128, the control-end-mount 130, the idle-end bracket-adapter 136, and the idle-end-mount 138 may be made of plastic, such as by injection molding, which is light-weight, strong, and relatively inexpensive. In such an embodiment, the plastic components may be mated, for example, with a mounting bracket 116 made of metal, such as stamped metal, which provides strength to the overall mounting of the covering to the support structure. Additionally, in one embodiment, the control-end bracket-adapter 128 and control-end-mount 130 are components positioned near the motor controller 246, and its associated antenna wire 287. In such an embodiment, the plastic structure may interfere less with electrical signals, such as light and radio signals, than would components made of metal.

Figure 50B:
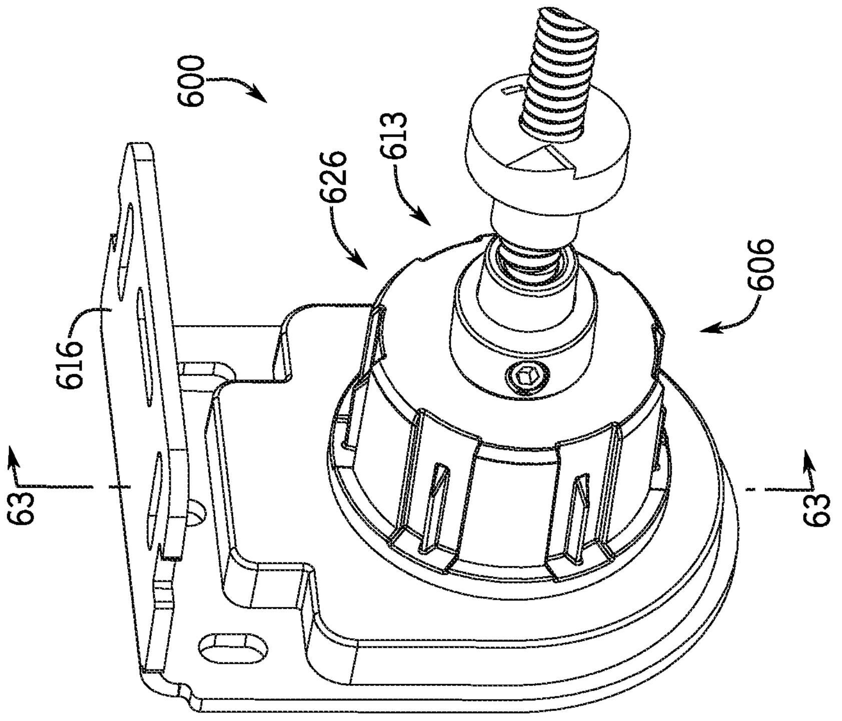
FIG. 50B is an isometric view of one illustrative example of an alternate embodiment of an idle-end mounting assembly.
Figure 50A:
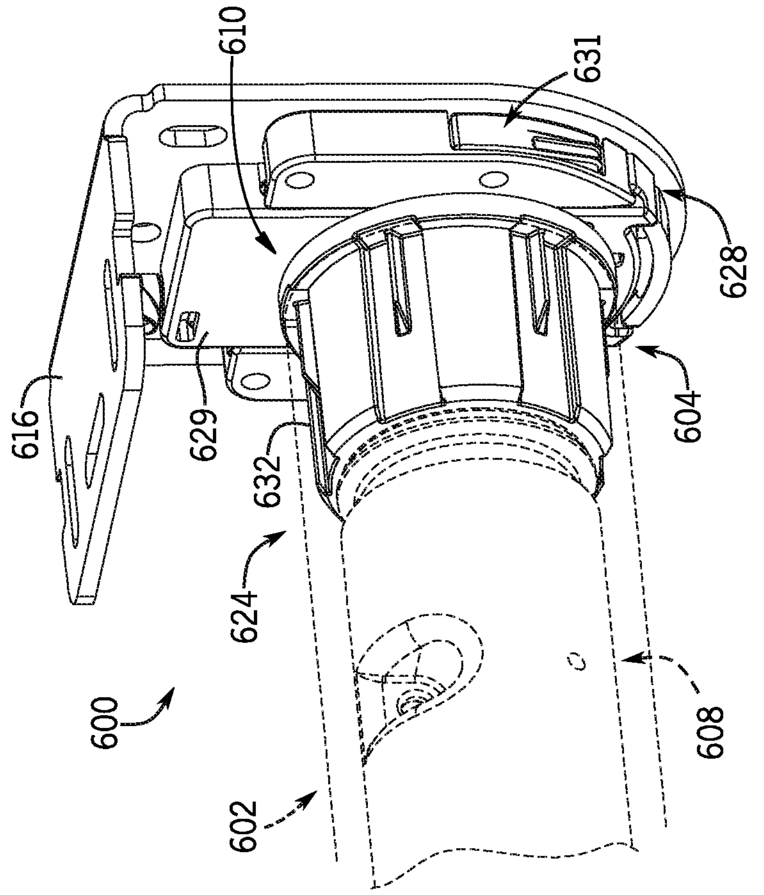
FIG. 50A is an isometric view of one illustrative example of an alternate embodiment of a control-end mounting assembly.

Further examples of suitable mounting assemblies 624, 636 are shown in FIGS. 50A and 50B. In this example, as with the others herein, the control-end 604 of the cover assembly may be mounted on a support structure by a control-end mounting assembly 624, and the idle-end of the cover assembly may be mounted on a support structure by an idle-end mounting assembly 626. These examples of the control-end 624 and idle-end 626 mounting assemblies are configured so that the idle-end of the cover assembly is mounted on a bracket 616 with a spear-type axial motion, and the control-end of the mounting assembly is mounted on a bracket 616 with a sliding-type lateral motion. While the idle-end mounting assembly 626 of this example is described below, an example of the control-end mounting assembly 624 is shown fully assembled in FIG. 50A and includes a control-end rotating member end mount 610 coupled to an engagement structure of a mounting bracket 616. The control-end rotating member end mount 610 is positioned on or adjacent the control-end of the cover assembly, with the bracket 616 being coupled to an adjacent support structure. In one example, a retention structure may be provided that retains the rotating member end mount 610 relative to the bracket 616 in the assembled configuration. For instance, in one embodiment, the retention structure may automatically retain the control-end rotating member end mount 610 in engagement with the bracket 616. Additionally, the retention structure may be released, as desired, to allow the control-end rotating member end mount to be de-coupled from the bracket. Also, in this example of the control-end mounting assembly 624, a control-end-mount 630 of the control-end rotating member end mount 610 (See, e.g., FIGS. 51-53) may be coupled with the bracket 616 by a lateral sliding motion, as explained in greater detail below. Additionally, as with some of the other mounting assemblies described herein, a motor assembly 608 for controlling the rotating member 602 to actuate and extend or retract the shade or cover panel may be coupled with the control-end of the rotating member 602. The motor assembly 608 may be operatively coupled with the rotating member 602, and in some examples may be positioned at least partially within the rotating member 602. The motor assembly 608 may be optional if the user does not wish to include the cover assembly control function of the motor assembly.

Figure 51:
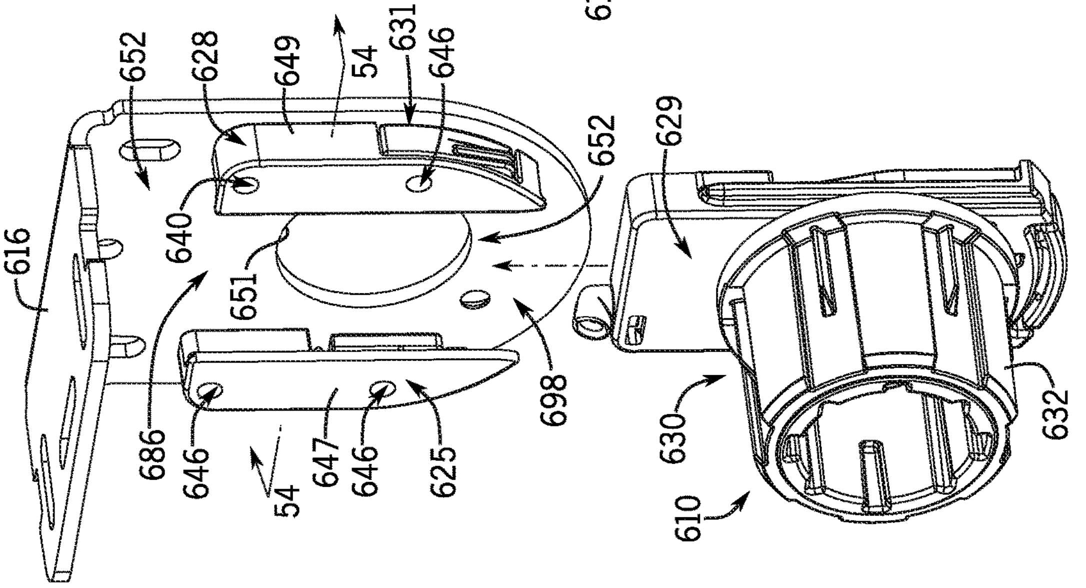
FIG. 51 is an isometric view of the control-end rotating member end mount, mounting bracket, and control-end bracket-adapter of FIG. 50A prior to coupling.
Figure 52:
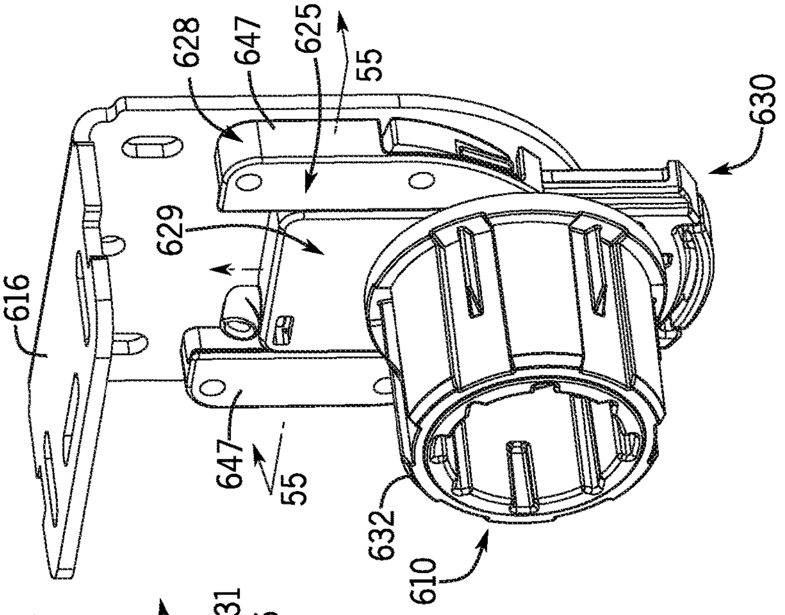
FIG. 52 is an isometric view of the control-end rotating member end mount, mounting bracket and control-end bracket-adapter of FIG. 50A during coupling.
Figure 53:
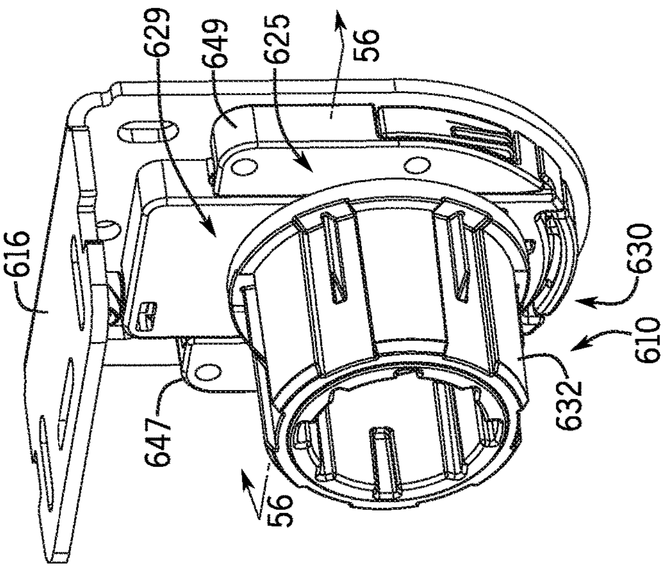
FIG. 53 is an isometric view of the control-end rotating member end mount, mounting bracket and control-end bracket-adapter of FIG. 50A coupled together.

One example of the control-end mounting assembly 624 is shown in detail in FIGS. 50A, and 51-57. As shown in FIGS. 50A and 51, in several embodiments, the control-end mounting assembly 624 includes, for example, the control-end rotating member end mount 610, the bracket 616, and one or more other assembly components. The control-end rotating member end mount 610 may be coupled with the control-end 604 of the rotating member 602, and the bracket 616 may be coupled to the support structure. As shown in FIGS. 51-56, the control-end rotating member end mount 610 includes at least a control-end-mount 630 defining an engagement portion 629. An optional control-end rotating member size-adapter 632 may be provided where the control-end-mount 630 does not include a portion sufficiently sized to rotatably receive the control-end of the rotating member 102. The mounting bracket 616 may define a mounting structure 652 (see FIG. 51), which may be configured to receive a control-end bracket-adapter 628. Additionally, in several embodiments, the bracket-adapter 628 defines an engagement structure 625 (see FIGS. 51, 54) for receiving a portion of the control-end-mount 630. In the illustrated embodiment, the engagement structure 625 includes a seat 686 having an entry 698, and also includes a retention structure 631 (each shown in FIG. 51). To couple the control-end-mount 630 with the mounting bracket 616, the engagement portion 629 may be received in the seat 686 of the engagement structure 625. In this example, the control-end-mount 630 is retained in the seat 686 of the bracket-adapter 628 via engagement with the retention structure 631 (see FIGS. 54-56, and 58-59). In one example, the retention structure 631 is automatically actuated by the positioning of the control-end-mount 630 within the seat 686. Additionally, the engagement portion 629 of the control-end-mount 630 may be removed, as desired, from the bracket-adapter 628 by disengaging the retention structure 631. Also, in this example of the control-end mounting assembly 624, the engagement portion 629 of the control-end-mount 630 may be positioned in the seat 686 of the bracket-adapter 628 by sliding the engagement portion 629 laterally through the entry 698 of the seat 686, as explained in greater detail below.

In one embodiment, the control-end rotating member end mount 610 is coupled with the bracket 616 by sliding the control-end-mount 630 into the seat 686 of the engagement structure 625 formed by the control-end bracket-adapter 628. When received in the engagement structure 625 of the control-end bracket-adapter 628, the opposing edges of the control-end-mount 630 are captured between the rails of the control-end bracket-adapter 628 and selectively coupled in the seat 686 by the retention structure 631 (see FIGS. 54-56). An optional biasing mechanism, such as loading mechanism 645 (see FIG. 54), may be provided that applies a biasing force against the control-end-mount 630 to reduce or minimize any tolerances between the control-end mount 630 and the engagement structure 625.

Figure 58:
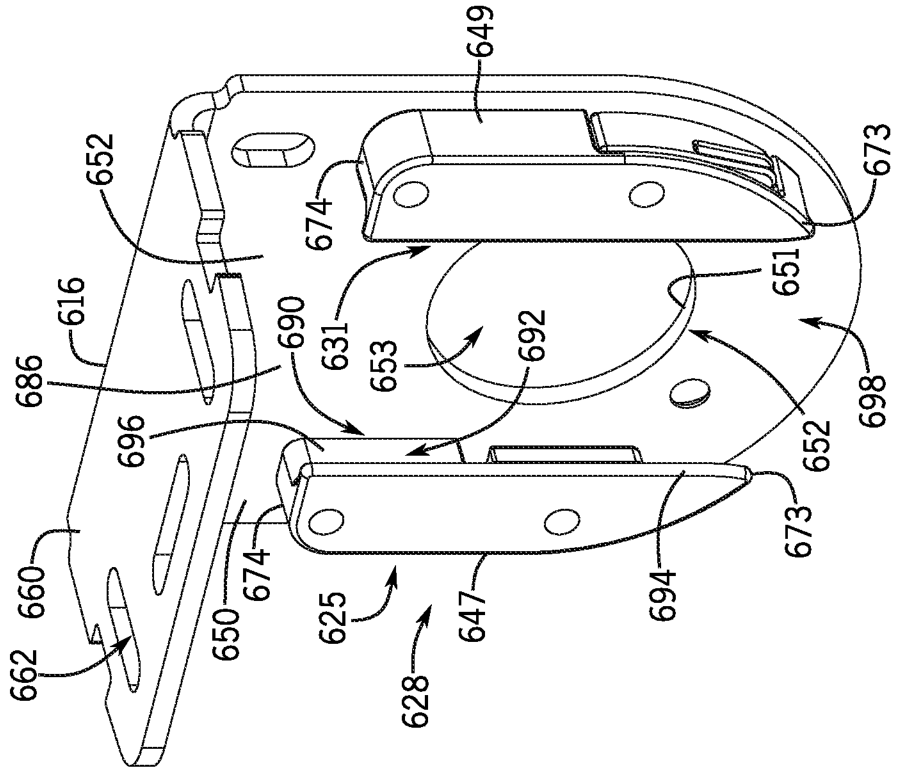

Similar to the brackets described above with respect to other embodiments of the mounting assembly, and as shown in FIGS. 51 and 58, the mounting bracket 616 may, for example, include a first portion 650 and a second portion 660 forming an L-shaped bracket. In addition, the mounting bracket 616 includes at least one aperture 662 for use in securing the bracket to the support structure surrounding the architectural feature. However, in other embodiments, the bracket 616 may have any other suitable configuration(s), including being generally flat.

In several embodiments, the first portion 650 of the bracket 616 includes a mounting structure 652 for receiving the control-end bracket-adapter 628, which in this example includes at least one fastening aperture 646 (see FIGS. 51 and 54) to operably couple the control-end bracket-adapter 628 to the mounting bracket 616, e.g., with a fastener (not shown). As noted above with respect to the mounting structure 152, the mounting structure 652 may include a primary aperture 651 and at least one fastening aperture 646. In one embodiment, the primary aperture 651 may be centrally located on the bracket 616. The coupling of the control-end bracket adapter 628 to the mounting structure 652 may, in one example, utilize only the fastening apertures, and in another example may utilize the fastening apertures and the primary aperture. In a further example, mounting the bracket-adapter to the mounting structure may utilize only the primary aperture. Where there is more than one fastening aperture 646, the apertures may be positioned to form a pattern as described above with respect to the mounting structure 152. In the example shown in this embodiment, the fastening apertures are formed in a pattern, and in particular have a rectangular-shaped pattern. Additionally, as shown in FIGS. 50A-50B, the mounting brackets 616 may each be used to support either the control-end 604 or the idle-end 606 of the cover assembly. As noted above with respect to the other embodiments, the mounting structure 652 formed in the mounting bracket 616 may be a shared feature allowing alternative types and configurations of mounting brackets 616 to be utilized with either the control-end mounting assembly 624 or the idle-end mounting assembly 626.

Figure 54:
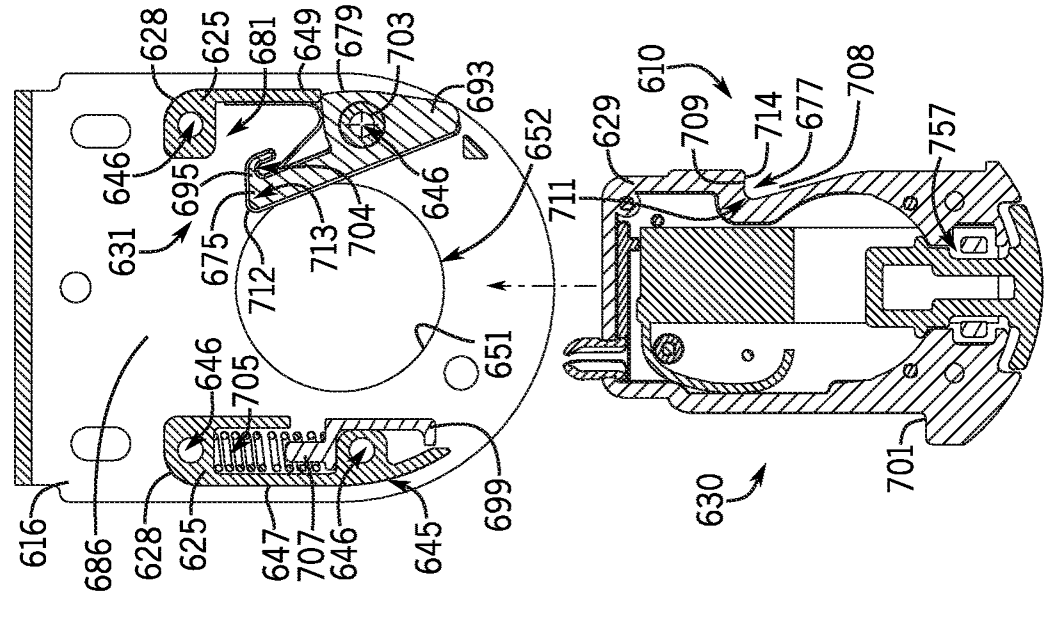
FIG. 54 is a cross-sectional view taken along line 54-54 in FIG. 51 showing the control-end rotating member end mount, mounting bracket, and control-end bracket-adapter prior to coupling.

As shown in FIGS. 51 and 54, the control-end bracket-adapter 628 is coupled with the mounting bracket 616 and, in one embodiment, includes an engagement structure 625 configured to couple with the rotating member 602 via the control-end rotating member end mount 610. Additionally, the control-end bracket-adapter 628 may be coupled with the mounting bracket 616 by the mounting structure 652. As shown in FIGS. 51 to 56, the control-end bracket-adapter 628 in this example includes two separate components coupled to the bracket 616 by the mounting structure 652. The two separate components are elongated members 647, 649, each mounted to the bracket 616 in a spaced-apart orientation. Also referring to FIGS. 58 and 59, the region of the mounting bracket 616 spanning between each of the elongated members 647, 649 may encompass a relatively large primary aperture 653 formed in the mounting bracket 616. In one example, the elongated members 647, 649 each extend generally along opposing edges of the mounting bracket 616 in a generally parallel relationship. The elongated members 647, 649 may be positioned in other locations on the mounting bracket 616, and may be oriented in angled and other non-parallel orientations.

Figure 56:
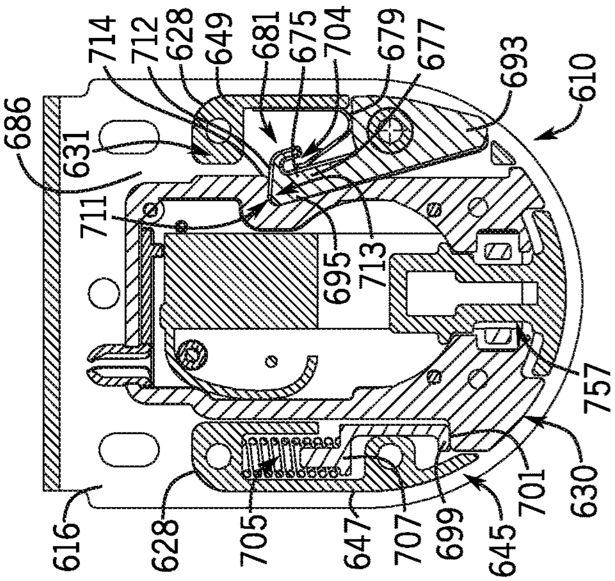
FIG. 56 is a cross-sectional view taken along line 56-56 in FIG. 53 showing the control-end rotating member end mount, mounting bracket, and control-end bracket-adapter coupled together.
Figure 55:
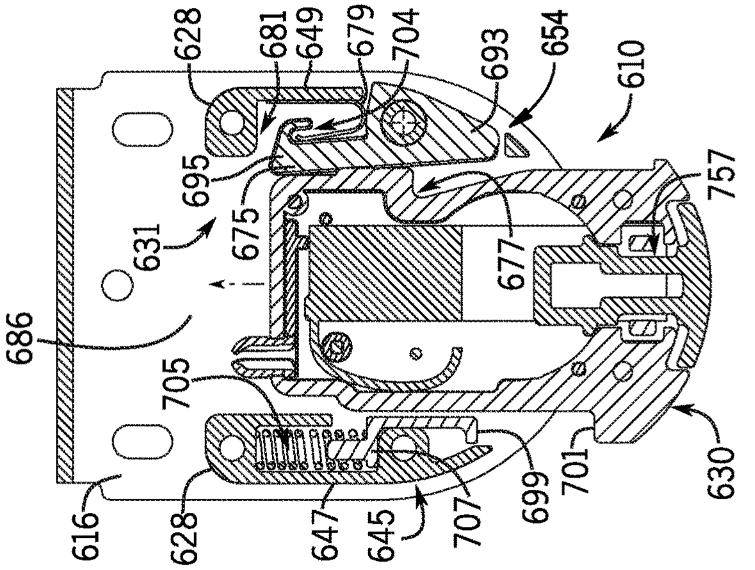
FIG. 55 is a cross-sectional view taken along line 55-55 in FIG. 52 showing the control-end rotating member end mount, mounting bracket, and control-end bracket-adapter during coupling.
Figure 59:
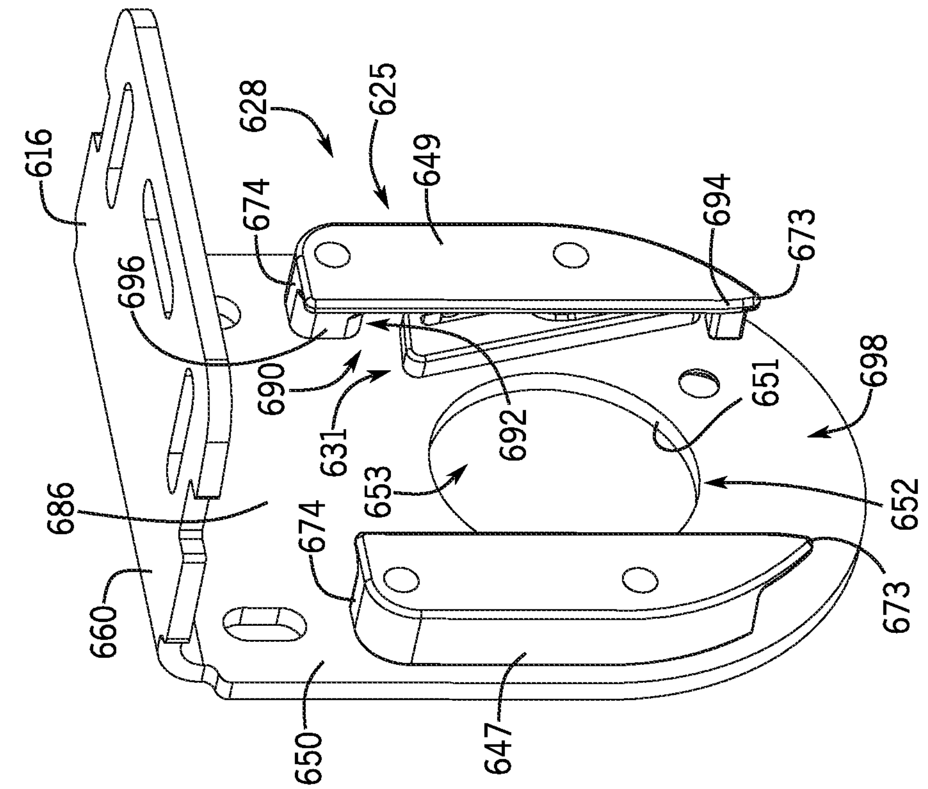
FIGS. 58 and 59 are front and rear isometric views, respectively, of an example of the bracket and control-end bracket-adapter of FIG. 50A.

As shown in FIGS. 58-59, in this example of the illustrated embodiment, the elongated members 647, 649 form opposing rails (e.g., a first rail 647 and a second rail 649). In one embodiment, the opposing rails 647, 649 may define the engagement structure 625 of the control-end bracket-adapter 628, which includes, for example, a seat 686, and an entry 698 into the seat 686, for receiving the control-end-mount 630. In other embodiments, the engagement structure 625 may have any other structural form that allows for selective releasable engagement with the control-end bracket-adapter 628. Continuing with reference to FIGS. 58-59, each rail 647, 649 may include a first end 673 forming a leading edge and an opposing second end 674. An engagement portion 690 extends at least partially along the length of each rail 647, 649 between the first end 673 and second end 674, (e.g., along an inside edge of each rail 647, 649). In one embodiment, the engagement portion 690 of each rail 647, 649 may be defined by an overhanging flange 694 extending from a recessed wall 696. Additionally, the overhanging flange 694 and the recessed wall 696 extending along the inside edge of each rail 647, 649 may define a channel 692. With continued reference to FIGS. 51-53, as indicated above, the engagement structure 625 may be formed at least partially by the seat 686, which includes the channels 692 (see FIGS. 58-59) and the space between the rails 647, 649. The entry 698 into the seat 686 is formed between the first ends 673 of each of the rails 647, 649. The control-end rotating member end mount 610 is received in the engagement structure 625, and in this example may be positioned adjacent the entry 698 to the seat 686 and slid laterally into the seat 686 to engage the channels 692 (see FIGS. 58-59). With reference to FIGS. 54-56, a wall, for instance a retaining shoulder 699, may be formed on at least one of the rails 647, 649 and may act as an abutment surface for the control-end-mount 630 when received within the seat 686.

Once coupled as intended during installation, any relative movement between the control-end-mount 630 and the engagement structure 625 may be undesirable. For instance, it may be desirable for the control-end-mount 630 to remain coupled with the engagement structure 625 to maintain proper alignment relative to the architectural feature, as well as to allow desired operation by the user. Unintended de-coupling of the control-end-mount 630 may also result in the cover assembly failing to operate properly, or even separating from the support structure. As indicated above, in order to mitigate the risk of decoupling, a retention structure may be included in the control-end mounting assembly. In several embodiments, the retention structure may allow the user to selectively maintain coupling and selectively cause de-coupling of the control-end-mount 630 (and thus the control-end rotating member end mount 610) from the bracket 616.

With reference to FIGS. 54-56, one example of a retention structure 631 of the control end mounting assembly is illustrated. In this example, the retention structure 631 is operably associated, at least in part, with the control-end bracket-adapter 628. In one example, the retention structure includes a pawl 675 (also referred to as an arm) provided in operative association with a portion of the control-end bracket-adapter 628 and an associated catch recess 677 defined by the control-end mount 630, which allows for selective coupling and de-coupling of the control-end-mount 630 relative to the engagement structure 629 of the control-end bracket-adapter 628. Additionally, the retention structure 631 helps mitigate unintended de-coupling of the control-end-mount 630 from the control-end bracket-adapter 628, such as via the engagement of the pawl 375 with the catch recess 677. In one embodiment, the retention structure 631 may also include a biasing mechanism, such as loading mechanism 645, that acts to fully seat the control-end-mount 630 in the engagement structure 625 and reduce or eliminate any looseness of the control-end-mount 630 when seated in the engagement structure 625. The loading mechanism 645 is optional, such as where the looseness of the control-end-mount 630 within the engagement structure 625 is not of any concern, or the tolerances are sufficiently high in the coupling structure to not require additional stabilizing forces.

A portion of the retention structure 631, in this case the pawl 675 as well as the optional loading mechanism 645, may, in one embodiment, be integrated into or otherwise coupled to the rails 647, 649 of the control-end bracket-adapter 628, as best shown in FIGS. 54 to 56. In the illustrated embodiment, the pawl 675 and catch recess 677 provide for engagement between the control-end bracket-adapter 628 and the control-end-mount 630. In several embodiments, the pawl 675 is pivotably coupled to one rail (e.g., the right or second rail 649 in FIGS. 51-56) and is movable between an extended position (see FIGS. 54 and 56), at which the pawl 675 extends outwardly relative to the second rail 649 into a portion of the seat 686 defined between the opposed rails 647, 649, and a retracted position (see FIG. 55), at which the pawl 675 is least partially retracted within the second rail 649. Additionally, a biasing or resilient member 679 (e.g., a torsion spring or a compression spring) may be coupled between a portion of the second rail 649 and the pawl 675 to bias the pawl 675 to the extended position. In such an embodiment, as the control-end-mount 630 is moved along the rails 647, 649, such as in FIG. 55 and into the seat 686, the control-end-mount 630 engages the pawl 675 and deflects it against the biasing force of the resilient member 679 into a cavity 681 formed in the rail 649 toward its retracted position. When the control-end-mount 630 is slid into the seat 686 a sufficient amount, such as in FIG. 56, the catch recess 677 formed in a base plate of the control-end-mount 630 is aligned with the pawl 675, thereby allowing the resilient member 679 to bias the pawl 675 outwardly from the rail 649 and into the catch recess 677. As a result, the pawl 675 engages the catch recess 677 and retains the control-end-mount 630 in the seat 686 in a manner that prevents the control-end mount 630 from moving in the reverse direction so as to become decoupled from the seat 686. Thereafter, to allow the control-end-mount 630 to be removed from the seat 686 of the engagement structure 625, the pawl 675 may be moved out of engagement with the catch recess 677, as will be described below.

In one embodiment, a retaining shoulder 699, also referred to herein as an end wall, may control the extent to which the control-end-mount 630 extends into the seat 686 of the engagement structure. The retaining shoulder 699, in this example and as shown in FIGS. 55 and 56, is formed on the opposite rail from the pawl (the left or first rail 647 in FIGS. 51-56). When the control-end-mount 630 is slid into the seat 686 sufficiently for the pawl 675 and catch recess 677 to engage, such as in FIG. 56, and in one example prior to such engagement, the retaining shoulder 699 engages a corresponding abutment shoulder 701 formed on the control-end-mount 630 to inhibit further movement into the seat 686. In one embodiment, the retaining shoulder 699 may be fixed on the rail 647. Alternatively, the retaining shoulder 699 may form part of a biasing or loading mechanism included in the control-end bracket-adapter 628, which will be described in greater detail below.

With reference to FIG. 54, the pawl 675 in this example may be an elongated member defining an engagement end 695 and a generally opposing actuation end 693. Referring to FIGS. 54-56, in one embodiment, the pawl 675 is pivotably coupled with the second rail 649 at a position located between the actuation end 693 and the engagement end 695. In this example, a pivot axis 703 (see FIG. 54) is formed about a fastener positioned through one of the apertures 646 securing the rail 649 to the mounting bracket 616. Alternatively, the pivot axis may be formed at a location independent of a fastener. The side of the pawl 675 exposed to the seat 686 is generally long and continuous fir sliding engagement with the control-end-mount 630 as the control-end-mount 630 moves into the seat 686 (see FIG. 55). The opposite side of the pawl 675 defines a recess 704 for receiving a portion of the biasing member 679. Another portion of the biasing member 679 engages the rail 649 surrounding the cavity 681, and acts to bias the pawl 675 into the extended position (as shown in FIGS. 54 and 56). In this example, the biasing member 679 is a generally U-shaped metal leaf spring. However, the biasing member 679 may also be other structures, such as a metal coil spring or a non-metal resilient structure for instance. The actuation end 693 of the pawl 675 is accessible through the outer edge of the rail 649, such as via an access opening 654 (FIG. 55) defined through a portion of the outer edge of the rail 649, and may conform to the general shape of the rail 649. The pawl 675 is caused to pivot about the pivot axis 703 when either the actuation end 693 or the engagement end 695 is moved. For example, the engagement end 695 moves towards the seat 686 (laterally, counter-clockwise between FIGS. 55 and 56) and causes the engagement end 695 of the pawl 675 to move out of the cavity 681 in the rail and into the catch recess 677 to retain the control-end-mount 630 in the seat 686.

In the illustrated example, the engagement end 695 of the pawl 675 is laterally captured in the catch recess 677, which limits the lateral movement of the engagement end 695 out of the catch recess 677. Full disengagement of the pawl 675 from the catch recess 677, in this example, may optionally require the control-end-mount 630 be initially moved further into the seat 686 to create a slight initial separation between the engagement end 695 of the pawl 675 and the walls of the catch recess 677 before the engagement end 695 can move laterally toward the rail 649 and out of the catch recess 677. This initial movement helps insure that the engagement end 695 is moved out of the catch recess 677 intentionally and not accidentally. In one embodiment, the engagement end 695 is laterally captured in the catch recess 677 due to the walls 708, 709 of the catch recess 677 forming an acute angle, with an outer edge 714 extending below the apex 711 of the catch recess 677 (see FIG. 54). In such an embodiment, the tip 712 of the engagement end 695 may define an acute angle, with the apex 713 of the tip 712 positioned adjacent the recess apex 711 when engaged (See FIG. 56). In this position, because the outer edge 714 of the catch recess 677 is lower than the tip apex 713, the tip 712 of the pawl 675 is laterally constrained. To allow the tip 712 to move laterally and out of the catch recess 677, the tip 712 and the walls 708, 709 of the catch recess 677 must be initially moved relative to one another so that the tip apex 713 can clear the outer edge 714 of the catch recess 677. As indicated above, this may be done by moving the catch recess 677 away from the tip apex 713, such as by moving the control-end-mount 630 slightly further into the mounting structure 652 (e.g., in a direction away from the entry 69$ of the seat 686) and at least sufficiently further by an amount to allow the tip apex 713 to pass by the outer edge 714 of the catch recess 677 as the pawl 675 is pivoted into the recess 681 in the rail 649. With the engagement end 695 of the pawl 675 clear of the catch recess 677 in the lateral direction, the actuation end 693 of the pawl 675 may be actuated towards the control-end-mount 630 (e.g., via a user accessing the actuation end 693 via the access opening 654 defined in the rail 649 and pushing the actuation end 693 towards the control-end-mount 630) to cause the pawl 675 to pivot about its pivot axis 703 in a direction (e.g., the clockwise direction in the illustrated embodiment) that results in the engagement end 695 of the pawl 675 being moved to its retracted position, thereby allowing the control-end-mount 630 to be slid out of seat 686 defined between the opposed rails 647, 649 of the control-end bracket-adapter 628. It should be appreciated that the above-described configuration allows for the retention structure 131 to function a safety feature while still allowing the end mount 630 to be quickly and easily decoupled from the control-end bracket-adapter 628 by the user when desired. Specifically, by requiring the control-end-mount 630 to be initially moved or pushed upwardly further into the seat 686 to allow the pawl 675 to be fully disengaged from the catch recess 677, unintentional or accidental decoupling of the end mount from the bracket-adapter can be prevented.

The optional biasing or load mechanism 645 of the illustrated example may provide for improved engagement of the control-end-mount 630 in the seat 686, and is best shown in FIGS. 54, 55, and 56. In one embodiment, the load mechanism 645 includes a biasing member 705 coupled with a shoulder member 707, which in this example is a separate component from the rail 647. The shoulder member 707 may move relative to the rail 647 between an extended position (see FIGS. 54-55) and a retracted position (see FIG. 56). As shown, the shoulder member 707 is in the extended position when the control-end-mount 630 is not positioned in the seat 686 of the mounting structure 652 on the mounting bracket 616 (see FIG. 54). When the control-end-mount 630 is slid into the seat 686 a sufficient distance, and in one example just prior to the engagement of the retention structure 631, the abutment shoulder 701 on the control-end-mount 630 engages the retaining shoulder 699 on the shoulder member 707. As the control-end-mount 630 is slid further into the seat 686, the shoulder member 707 is moved against the force of the biasing mechanism 705, increasing the compression load on the biasing member 705. When the retention structure 131, which in this example is the pawl 675 and catch recess 677, is engaged, the biasing mechanism 705 applies a biasing force to the abutment shoulder 701 on the control-end-mount 630 in a direction towards the entry 698 of the seat 686. This causes the catch recess 677 and the tip of the pawl 675 to engage more tightly to resist the force of the biasing member 705 of the load mechanism 645, as well as to reduce or minimize any tolerances that may cause looseness in the interface between the control-end-mount 630 and the engagement structure 625. The biasing member 705 in this example is a metal coil spring, but in another example may be a metal leaf spring, a non-metal resilient member or any other suitable resilient member.

Figure 61:
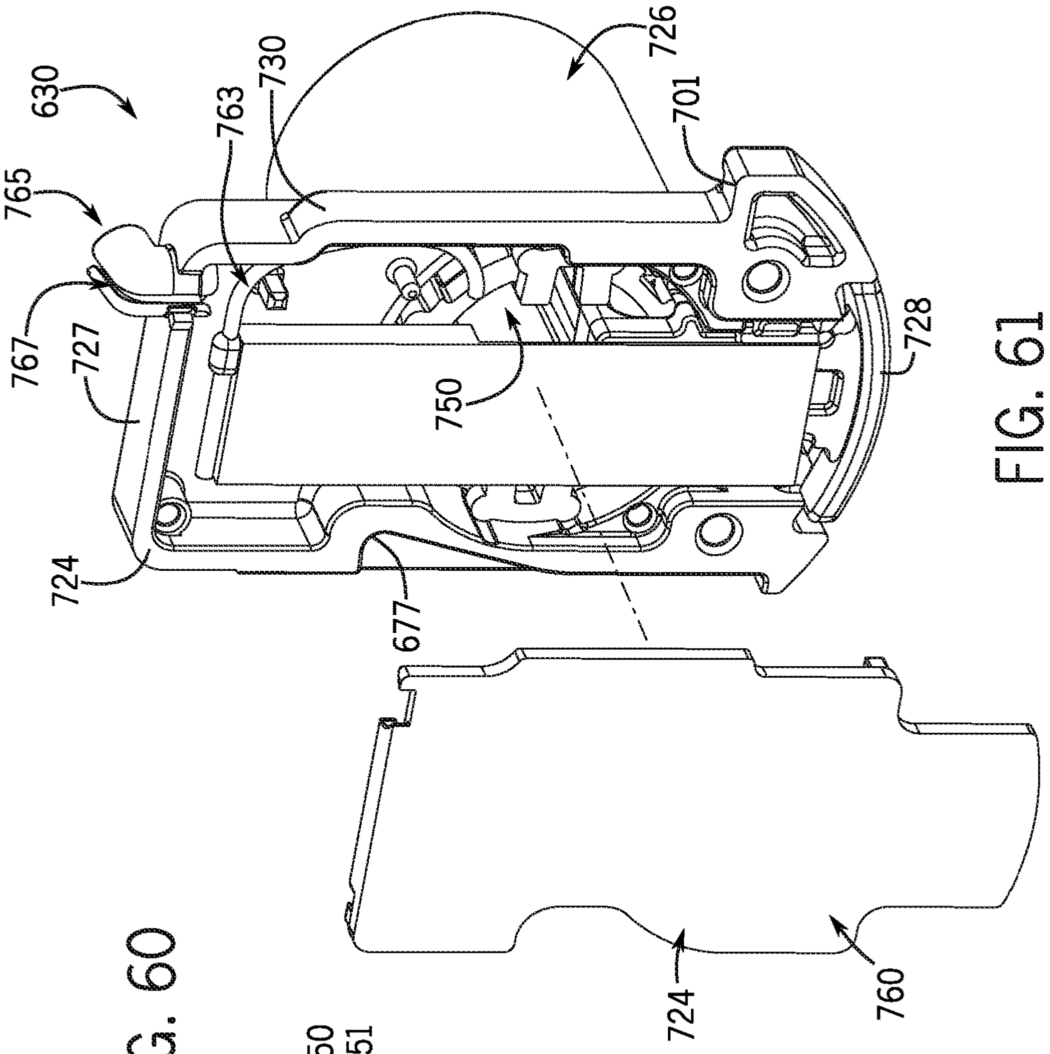
FIGS. 60 and 61 are front and rear isometric views, respectively, of the control-end-mount shown in FIG. 50A.
Figure 60:
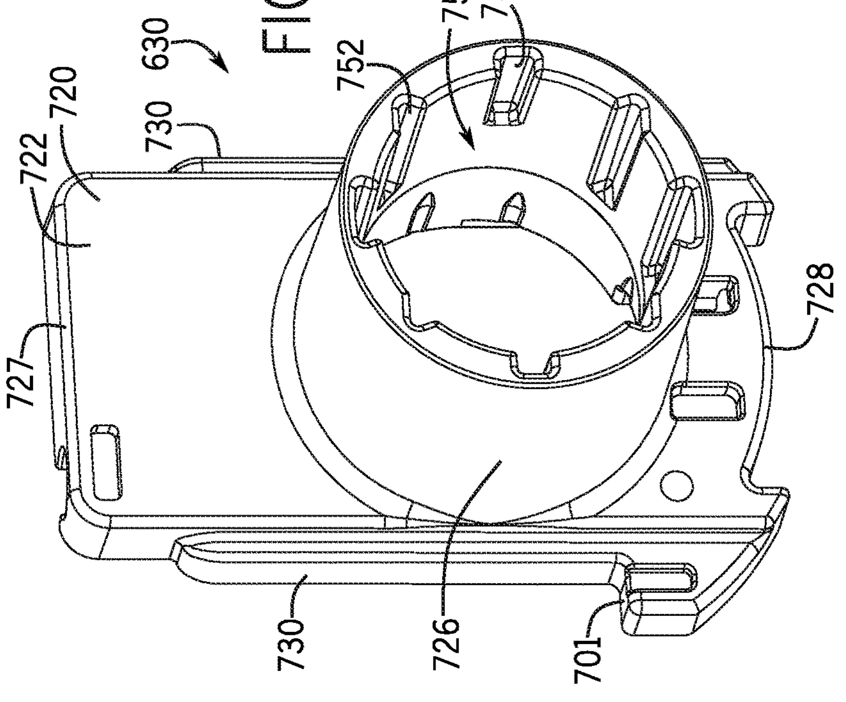

Various components of the control-end-mount 630 are shown in FIGS. 51-53, and FIGS. 60-61. The control-end-mount 630 includes a portion configured to couple with the engagement structure of the bracket-adapter 628, and a portion for rotatably coupling with the control-end of the rotating member 102, and thus facilitates the coupling of the rotating member 102 to the mounting bracket 616. Additionally, the control-end-mount 630 may be configured to receive at least a portion of a drive assembly 608, if included in the cover assembly 114, and couple it with the bracket 616. In one embodiment, the control-end-mount 630 includes a base plate 720 having a first face 722 and a second face 724 and a hub 726 extending from the first face 722 of the base plate 720, as shown in FIGS. 60 and 61. The base plate 720 is generally configured and sized to be received in the seat 686 of the control-end bracket-adapter 628, and includes a first end 727 and a second end 728, and opposing flanges 730 extending along the lateral sides between the first and second ends 727, 728. Each flange 730 may include a portion of its length having a reduced thickness dimension as compared to the general thickness dimension of the base plate 720. This reduced thickness dimension may be sufficient to be received within the channel 692 formed by the rails 647, 649 of the seat 686 of the engagement structure 625 of the control-end bracket-adapter 628 (see FIGS. 58-59). The catch recess 677 is formed in one of the lateral sides of the base plate 720, and in this example the right side as shown in FIG. 54-56, such as by being formed between the flange 730 and the second face 724, as best shown in FIG. 61. The retaining shoulder 701, for limiting movement of the base plate 720 into the engagement structure 625, is formed on the opposite lateral side, and in this example may extend outwardly from the flange 730 near or adjacent to the second end 728 of the base plate 720.

Figure 57:
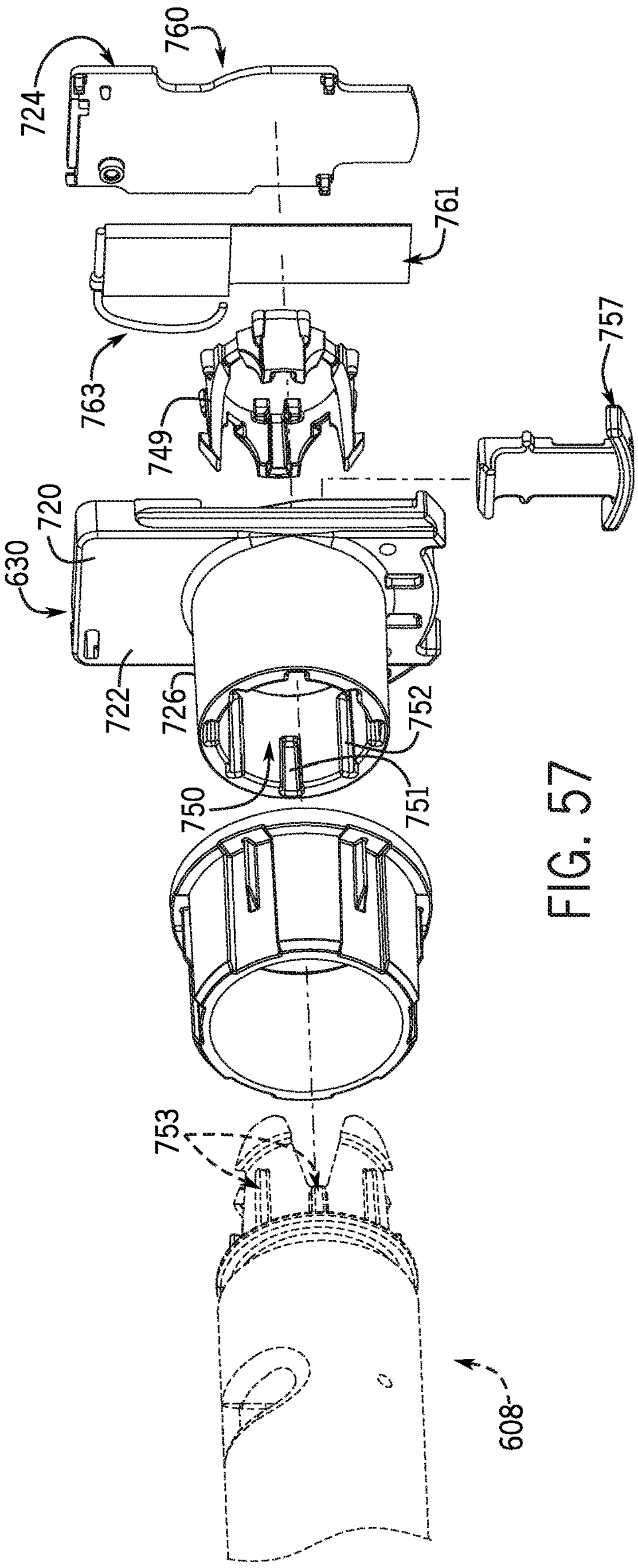
FIG. 57 is an exploded view of a portion of the control-end mounting assembly of FIG. 50A.

With reference to FIGS. 57 and 60, the portion of the control-end-mount 630 upon which the control-end of the cover assembly rotatably couples is in this example formed by a hub 726 extending away from the first face 722 of the base plate 720. The hub 726 has a generally cylindrical outer surface to form a bearing surface upon which the rotating member 602 may freely rotate. An anchor cavity 750 is formed within the hub 726 and extends through the base plate 720. In this example, the inner wall forming the cavity 750 includes a first set of at least one groove 752 extending from the end of the hub 726 and partially along the length of the hub 726. The inner wall also has a second set of at least one groove 751 extending from the opening in the base plate 720 and partially along the length of the wall of the cavity 750. Similar to the example shown above in FIG. 25, the anchor cavity 750 is configured to receive an end of the motor assembly 608 in a non-rotating engagement. For example, as shown in the embodiment of FIG. 57, the axially extending grooves 751, 752 may mate with and receive corresponding splines 753 formed on the engagement end portion 755 of the motor assembly 608 when the engagement end portion 755 is inserted into the anchor cavity 750. The grooves 751, 752 may be uniform in size and shape or they may be of different sizes and shapes as shown in FIG. 57 in order to engage the motor assembly 608 in a particular orientation. The motor assembly 608 is coupled to the control-end-mount 630 by a retention clip 749, as shown in FIG. 57, inserted into the anchor cavity 750 through the opening in the base plate 720 to couple with the hub 726.

In the embodiments where a motor assembly is included in the covering, controlling the function of the motor assembly is beneficial. In one example, the function of the motor assembly may be controlled by a switch that is accessible from outside the control-end mounting assembly and operably extends through the control-end mounting assembly to control the motor assembly. Similar to the example illustrated in FIG. 24 above, the example described with respect to FIGS. 54-57 and 61 includes a switch accessible by the user for controlling the motor assembly. Referring to FIGS. 57 and 61, an elongated switch member 757 is received in an opening in the second end of the base plate 720. In one embodiment, the switch member 757 may be a light pipe. The switch member 757 extends from the periphery of the base plate 720 adjacent to or into the central cavity 750 of the hub 726 and allows a user to actuate a control member on a motor controller, which forms part of the motor assembly 608. The switch member 757 is housed within the base plate 720, in the space formed between the first and second faces 722, 724. A first end of the switch member 755 may be flush, under-flush, or protrude from the periphery of the base plate 720 in an orientation accessible by a user. The switch member 757 may translate longitudinally in the slot 759 (see FIGS. 54 and 55) to actuate the control member to power the motor assembly 608 and to determine a direction of rotation for the rotating member 102, i.e., rotation in a retraction direction or in an extension direction. In embodiments in which the switch member 757 is formed of an internally refractive, "light pipe" material, the switch member 757 receives light from an adjacent LED or other light source and may "glow" for ease of location and selection by a user. As shown in FIGS. 57 and 61, a back wall 760 of the base plate 720 includes the back face 722, and may be a separate component and removably or permanently coupled with the base plate 722.

With continued reference to FIGS. 57 and 61, in one embodiment, an antenna 761 may be housed within the base plate 720 in the space between the first 722 and second 724 faces. The antenna 761 may be operably coupled with the motor assembly 608. In one embodiment, the antenna wire is positioned within the base plate 720 and extends along at least a portion of the length of the base plate 720. Additionally, a wire clip retainer 765 (FIG. 61) is positioned at a first end of the base plate 720 (e.g., near or adjacent a lateral side edge) and guides any wires that may need to exit the base plate 720 and extend to external couplings. In one embodiment, the wire clip retainer 765 is generally L-shaped, with one end rotatably mountable within an aperture formed in the housing. The wire clip retainer 765 may also include a slot 767 on its exterior wall to allow wires to be positioned inside the wire clip retainer 765 without having to thread the wires through the wire clip retainer 765 from one end to the other. The wire clip retainer 765 may provide strain relief to the wire or wires passing through it.

The idle-end of the cover assembly is mounted to the support structure by an idle-end mounting assembly, such as in the illustrated example shown in FIGS. 50, and 62, 63 and 64. An example of the idle-end mounting assembly is shown fully assembled in FIG. 50B, with an idle-end rotating member end mount positioned on or adjacent to the idle-end of the cover assembly and coupled to an engagement structure of a mounting bracket, which is, in turn, coupled to a support structure. The idle-end rotating member end mount includes at least an idle-end-mount defining an engagement portion, and an idle-end rotating member size-adapter rotatably coupled with the idle-end mount. The idle-end rotating member size-adapter is optional, such as where a portion of the idle-end-mount is sufficiently sized and shaped to receive the idle end of the cover assembly in a rotatable manner. The bracket may include a bracket-adapter coupled with the mounting structure, and defining engagement structure including a seat having an entry. The idle-end-mount may be coupled with the bracket by the engagement portion being received in the seat of the engagement structure of the bracket-adapter. In this example of the idle-end mounting assembly, the engagement portion of the idle-end-mount may be positioned in the seat of the bracket-adapter by spearing the engagement portion axially through an entry of the seat in order to be received in the engagement portion. The idle-end of the cover assembly may optionally include the drive mechanism for the covering, as described with respect to the embodiment illustrated in FIGS. 1 and 3.

Figure 63:
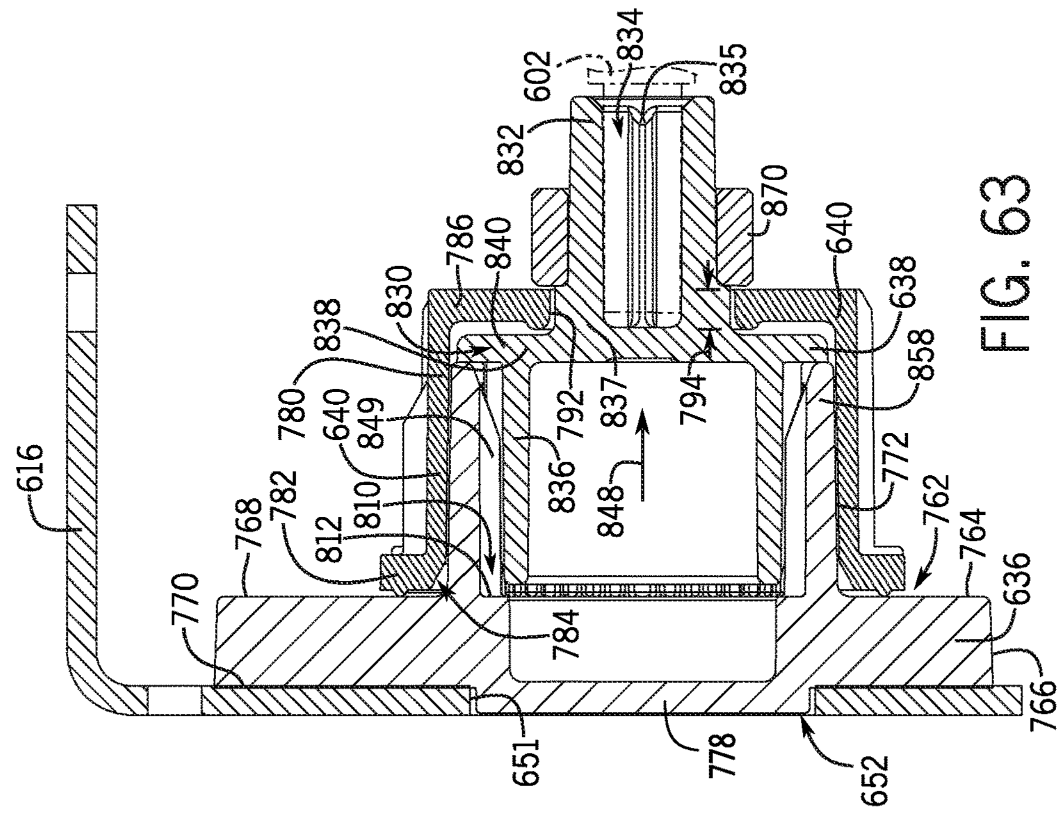
FIG. 63 is a cross-sectional view along line 63-63 of FIG. 50B.
Figure 62:
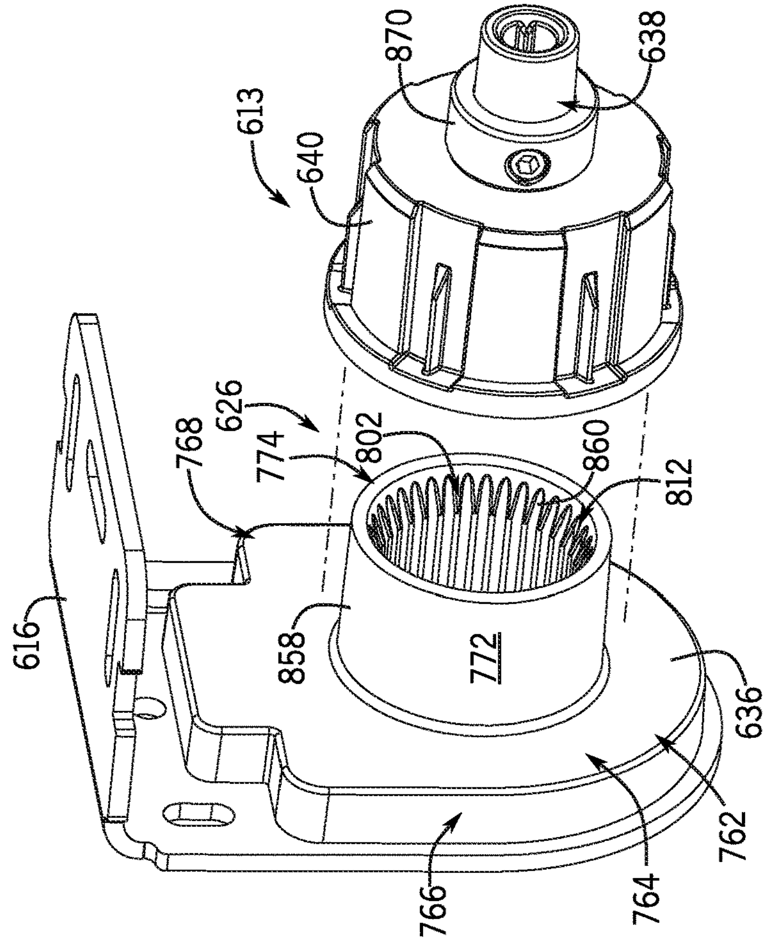
FIG. 62 is a partially exploded view of the idle-end mounting assembly shown in FIG. 50B.

The illustrated embodiment of the idle-end mounting assembly 626 shown in FIGS. 50B, 62, and 63, which is similar to FIGS. 3, 36, and 49, may include, for example, the idle-end bracket 616, the idle-end bracket-adapter 636, the idle-end-mount 638, and the idle-end rotating member size-adapter 640. The idle-end rotating member size-adapter 640 is optional as described with respect to other examples, and may be included, as it is in this example, where it aids in coupling with the cover assembly. The idle-end mounting bracket 616 may be the same or similar to the mounting bracket described in reference to the control-end mounting assembly 624 of FIGS. 50A, and 51-56, including the mounting structure 652. The mounting structure 652 on the idle-end bracket, as with the control-end bracket, may receive the idle-end bracket-adapter 636 or the control-end bracket-adapter 628 (See FIG. 51). In one embodiment, be idle-end bracket-adapter 636 includes, with reference to FIGS. 62, 63 and 64, a base 762, and in at least one example the base 762 defines a plate 764 having in one example an optional circular periphery 766. The base 762 defines a first adapter end face 768, also referred to as an adapter end face, and a second bracket-engagement face 770. The first adapter end face 768 includes a female engagement portion (e.g., a boss 858) extending axially away from a central portion of the base plate 762. The boss 858 may have a cylindrical outer surface 772 terminating in a circular rim 774, and may define an interior cavity 776 formed by an inner wall. In one embodiment, the first adapter end face 768 forms an end wall at the base of the cavity 776 formed by the boss 858.

Additionally, in several embodiments, the idle-end bracket-adapter 636 may include suitable circumferential engagement structure for engaging corresponding structure of the idle-end-mount 638. For example, in the illustrated embodiment, the circumferential engagement structure may correspond to ridges and grooves defined by the inner wall of the boss 858 that form inwardly directly splines 860 around the inner perimeter of the cavity 776. In one embodiment, the splines 860 may extend longitudinally along at least a portion of the inner wall, such as by configuring the splines 860 to extend at least to the rim 774. The engagement structure provided in operative association with the boss 858 receives a portion of the corresponding engaging structure of the idle-end-mount 638 in a non-rotatable manner. Specifically, in this example, the splines 860 in the cavity 776 of the boss 858 matingly engage corresponding splines 850 formed on the second or engagement portion of the idle-end-mount 638 to create the non-rotatable engagement between the idle-end bracket-adapter 636 and the idle-end-mount 638, as is described in detail below. In one example, the outer surface 772 of the boss 858 may rotatably receive the idle-end rotating member size-adapter 640 to allow the cover assembly to rotate with respect to the idle-end bracket-adapter 636 and, thus, the idle-end bracket 616. Where the boss 858 is sufficiently sized and shaped to receive the idle-end of the cover assembly in a rotating manner, the rotating member size-adapter 640 may be optional.

Moreover, in one embodiment, a seat 812 is formed by the cavity 776 in the boss 858, with the entry or opening to the seat 812 formed by the circular rim 774. Seat 812, including the associated splines 860, is one example of an engagement structure formed on the idle-end bracket-adapter 636. In this example, as in other examples herein, the seat is also referred to as a placing structure or a location structure.

Referring to FIG. 63, the idle-end bracket-adapter 636 may be coupled with the mounting structure 652 of the bracket 616, in this example, by utilizing the primary aperture 651 and/or at least one fastening aperture 646. In this example, more than one fastening aperture 646 is used, and the plurality of fastening apertures form a rectangular shaped pattern. The second bracket engagement face 770 of the idle-end bracket-adapter 636 may be positioned against the bracket 616, with a central protrusion 778 (FIG. 63) received within, and in some examples extending through, the primary aperture 651 of the mounting structure 652. The fastening apertures 646 (FIG. 64) forming the mounting structure 652 of the bracket may be aligned with a securement aperture (not shown) formed in the second bracket engagement face 770 of the idle-end bracket-adapter 636 for use with a fastening mechanism 783 to couple the idle-end bracket-adapter 636 to the mounting structure 652 of the bracket 616.

Figure 64:
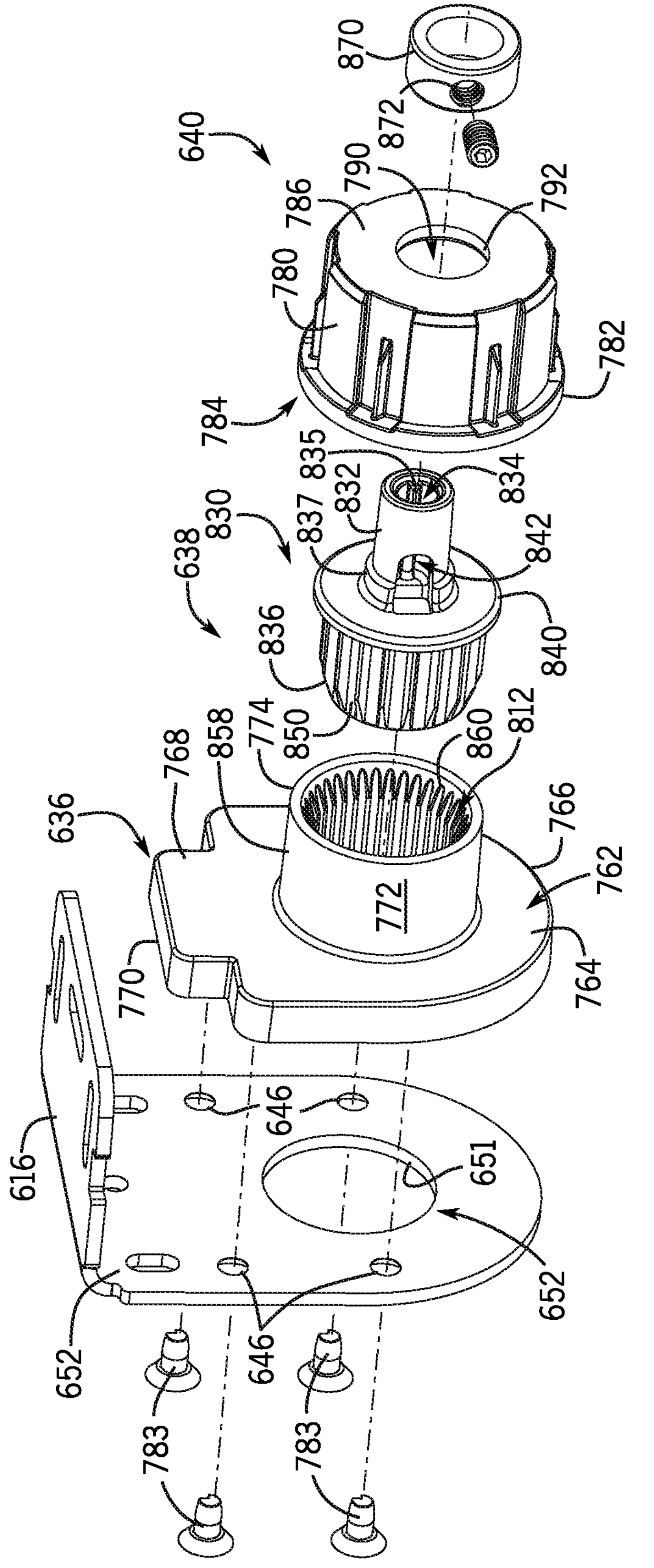
FIG. 64 is an exploded view the idle-end mounting assembly of FIG. 50B.
Figure 66:
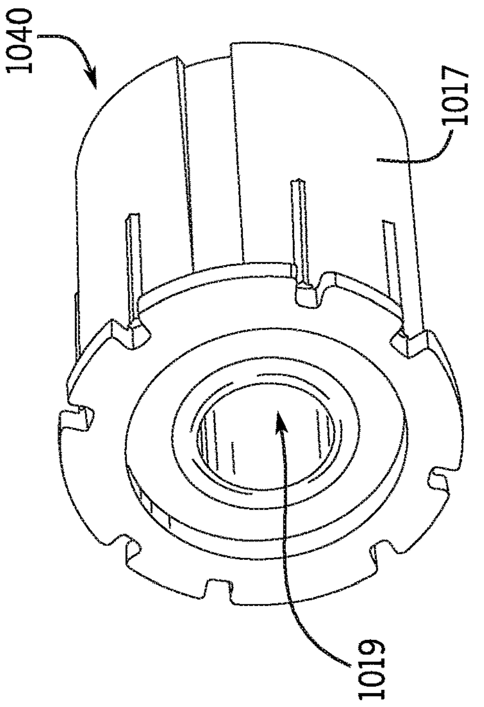
FIG. 66 is a rear isometric view of a rotating member size-adapter.

The idle-end-mount 638 as shown in FIGS. 63-64 includes a body 830 having a first portion 832, a second portion 836 that non-rotatably couples to the idle-end bracket-adapter 636, and a third, central, portion 837. Where a rotating member size-adapter 640 is used, the third, or central, portion 837 may, for example, rotatably receive the rotating member size-adapter 640. The rotating member size-adapter then in turn engages the idle-end 606 of the rotating member 602. As shown, the central portion 837 extends between a radially extending flange 840 of the body 830 and the first portion 832. Additionally, a bore 834 is formed in the first portion 832 for non-rotatably receiving a central shaft. The bore 834 may include a ridge 835 (also referred to as a "key") that mates with a corresponding groove formed on the central shaft to resist any relative rotation between the two components. Moreover, an aperture 842 may be formed in the outer wall of the first portion 832 for receiving a setscrew to optionally couple the central shaft to the idle-end-mount 638. Further, in one embodiment, a collar 870 may be positioned over the first portion 832, and include an aperture 872 (see FIG. 64) through which the setscrew is positioned to both couple the central shaft and the collar 870 to the first portion 832. The collar 870 may be used to help position the idle-end rotating member size-adapter 640 in position, as explained in greater detail below.

The second portion 836 of the idle-end-mount 638 may be a boss structure formed in this example by a wall extending in a cylindrical shape (and also referred to herein as a male engagement portion), the cylindrical shape being larger than the first portion 832. A cavity 848 (see FIG. 63) may be formed inside the second portion 836 by the wall. As shown in FIG. 64, the outer surface of the second portion 836 may, in one example, include engagement structure configured to circumferentially engage the corresponding engagement structure of the idle-end bracket-adapter 636. For example, in one embodiment, the engagement structure may correspond to outwardly directed splines 850 extending axially along the length of the second portion 836. In such an embodiment, the splines 850 are sized in pitch, height, and length, to match with the internally-directed splines 860 formed on the boss 858 of the idle-end bracket-adapter 636, as described in more detail below. Other engagement elements may alternatively be used in place of or in addition to the splines 850 described above, and in conjunction with corresponding engagement elements or structure on the idle-end bracket-adapter 636.

As shown in FIG. 63, the flange 840 extends radially from an outer surface of the second portion 836 and acts as a retaining feature for the idle-end rotating member size-adapter 640 when positioned on the idle-end-mount 638. Additionally, a circumferential wall 838, also referred to as a facial wall, is formed between the third portion 837 and the second portion 836. The cavity 848 of the second portion $36 may communicate with the bore 834 of the idle-end-mount 638 to form a continuous bore through the idle-end-mount 638. In some examples, the cavity 834 and the cavity $48 may not communicate.

As shown in FIGS. 63 and 64, the idle-end rotating member size-adapter 640, when utilized, has a generally cylindrical main body 780 having a rim 782 and defining a cavity 784, and an end wall 786 having a central aperture 790 (see FIG. 64) defined by a bearing rim 792. The idle-end rotating member size-adapter 640 is positioned on the idle-end-mount 638 with the second portion 836 positioned within the cavity 784 of the main body 780 and the bearing rim 792 of the aperture 790 positioned on the third, or central, portion 837 of the idle-end-mount 638. The end wall 786 of the idle-end rotating member size-adapter 640 fits in the gap 794 formed between the collar 870 (coupled to the first portion 832 and the shaft) and circumferential wall 838, thereby maintaining the end wall 786 within gap 794 and thus holding the idle-end rotating member size-adapter 640 in position. The central aperture 790 of end wall 786 has a diameter smaller than the diameter of the collar 870 or the circumferential wall 838, and is thus trapped therebetween. The end wall 786 fits loosely within the gap 794 to allow the idle-end rotating member size-adapter 640 to rotate with the rotating member 602 and relative to the idle-end-mount 638.

The idle-end-mount 638, with reference here to FIG. 63, may be received at least partially within and adjacent to an end of the rotating member 602. For example, the first portion 832 of the idle-end-mount 638 may be in operable engagement with the central shaft of the drive assembly 608, and at least a portion of the second portion 836 of the idle-end-mount 638 adjacent to the end of the rotating member 602. Additionally, the second portion 836 may be positioned within the rotating member 602 and define an engagement portion 849 of the idle-end-mount 638 for receipt in the placing structure 810. In one illustrative embodiment, the placing structure 810 may include, for example, a seat 812 on the idle-end bracket-adapter 636 positioned in the bracket 616 as indicated in FIG. 63.

In several embodiments, the idle-end mounting assembly 626 may include the engagement portion of the idle-end-mount 638 received in the seat 812 formed by the idle-end bracket-adapter 636 with continuing reference to FIGS. 62 and 63. In this example, this is considered to be a nesting engagement or a female/male engagement, where one portion is received within another component of the assembly, which is an efficient manner of nesting, or also stacking or coupling components to reduce an assembled dimension. As indicated above, the boss 858 of the idle-end bracket-adapter 636 may be axially aligned with second portion 836 (see FIG. 63) of the idle-end-mount 638, and the second portion 836 of the idle-end-mount may be received in the seat 812 by an axial spearing motion, resulting in relative telescopic or axial motion. This is one example of a nesting engagement or a female/male engagement, to non-rotatably engage the idle-end 106 of the rotating member 102 to the idle-end bracket 116. For example, when the second portion 836 of the idle-end-mount 638 is received within the seat 812, the interlocking or mating splines 850, 860 may circumferentially engage one other, thereby preventing relative rotation between the idle-end bracket-adapter 636 and the idle-end-mount 638. Additionally, similar to the embodiments described above, the mating splines 850, 860 may also allow for the circumferential orientation of the idle-end-mount 638 relative to the idle-end bracket-adapter 636 to be adjusted, as desired, when such components are otherwise axially decoupled.

In another illustrative embodiment shown in FIGS. 65-68, an idle-end of the cover assembly is mounted to a support structure by an idle-end mounting assembly as shown. The idle-end of the cover assembly may optionally include the drive mechanism for the covering, as described with respect to the embodiment illustrated in FIGS. 1 and 3. One example of the idle-end mounting assembly is shown fully assembled in FIG. 65, with an idle-end rotating member end mount positioned on or adjacent to the idle-end of the rotating member and coupled to an engagement structure of a mounting bracket, which is, in turn, coupled to a support structure. In this example, the engagement structure allows for adjusting the position of the idle-end mounting assembly relative to the mounting bracket, as explained in greater detail below.

Figure 65:
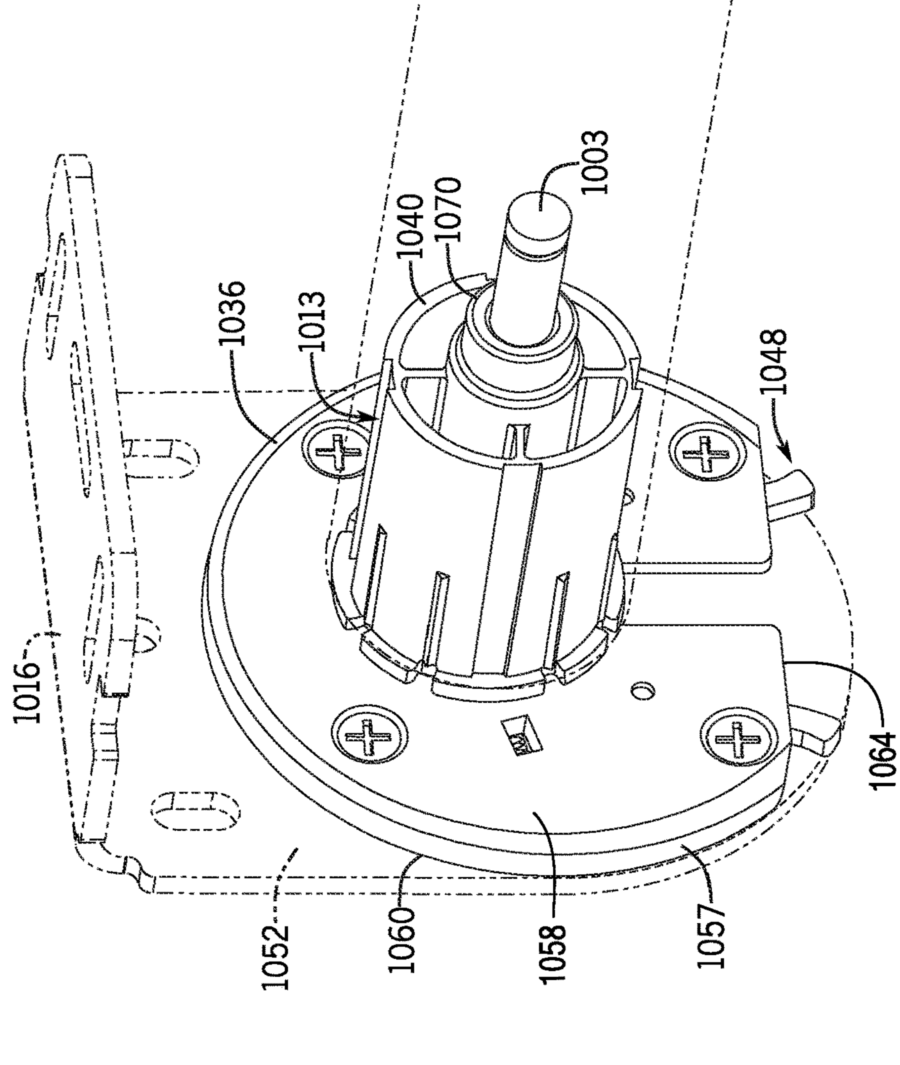
FIG. 65 is an isometric view of one illustrative example of an alternate embodiment of a mounting assembly, including a bracket, bracket-adapter, and rotating member end mount.
Figure 67:
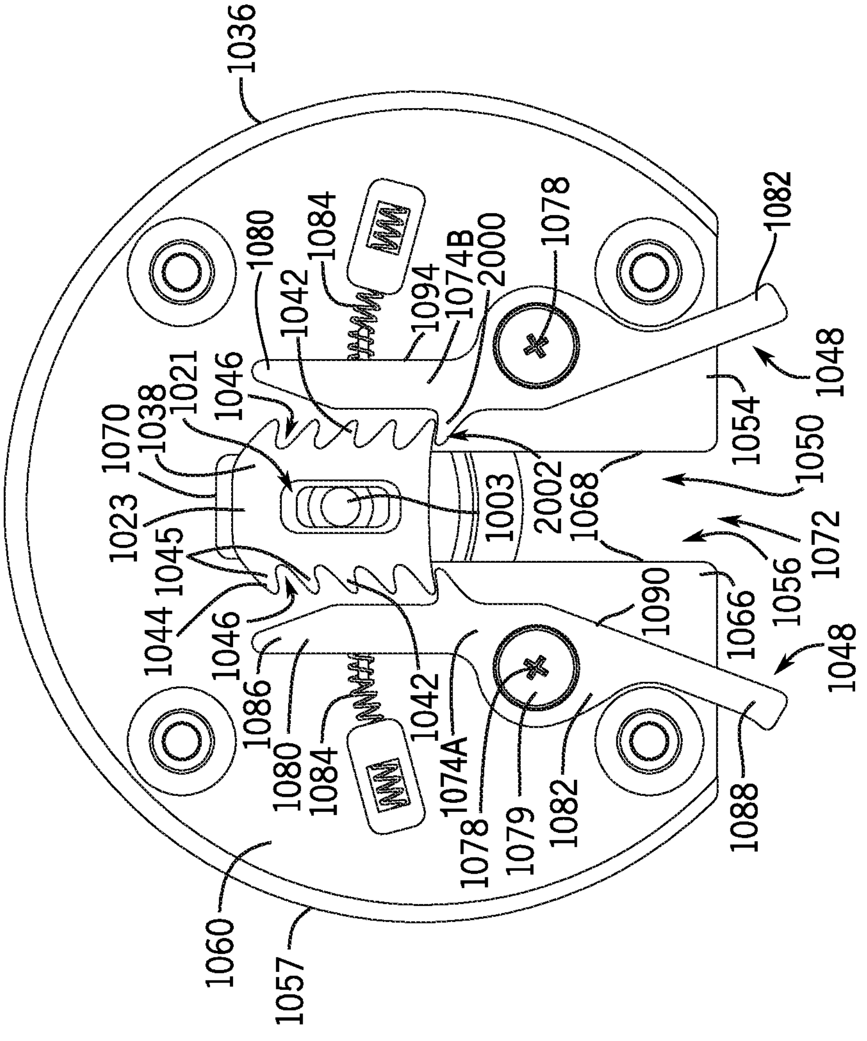
FIG. 67 is a rear elevation view of a bracket-adapter and idle-end-mount of the mounting assembly shown in FIG. 65.
Figure 68B:
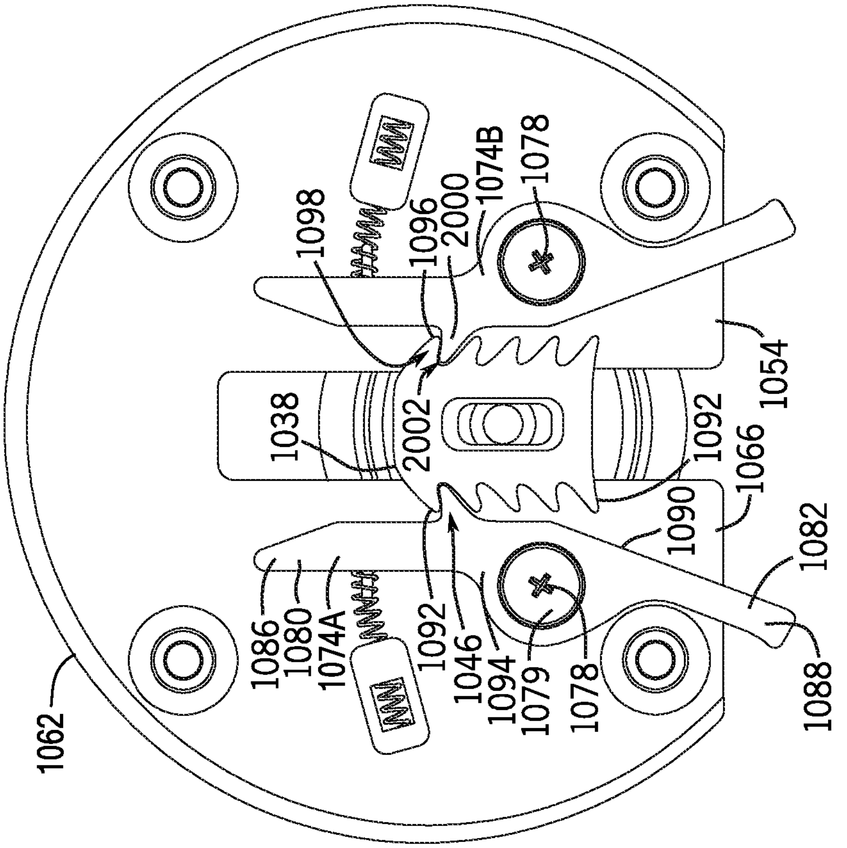
FIG. 68B is a rear elevation view of the mounting assembly shown in FIG. 65, showing the retention structure engaged.
Figure 68A:
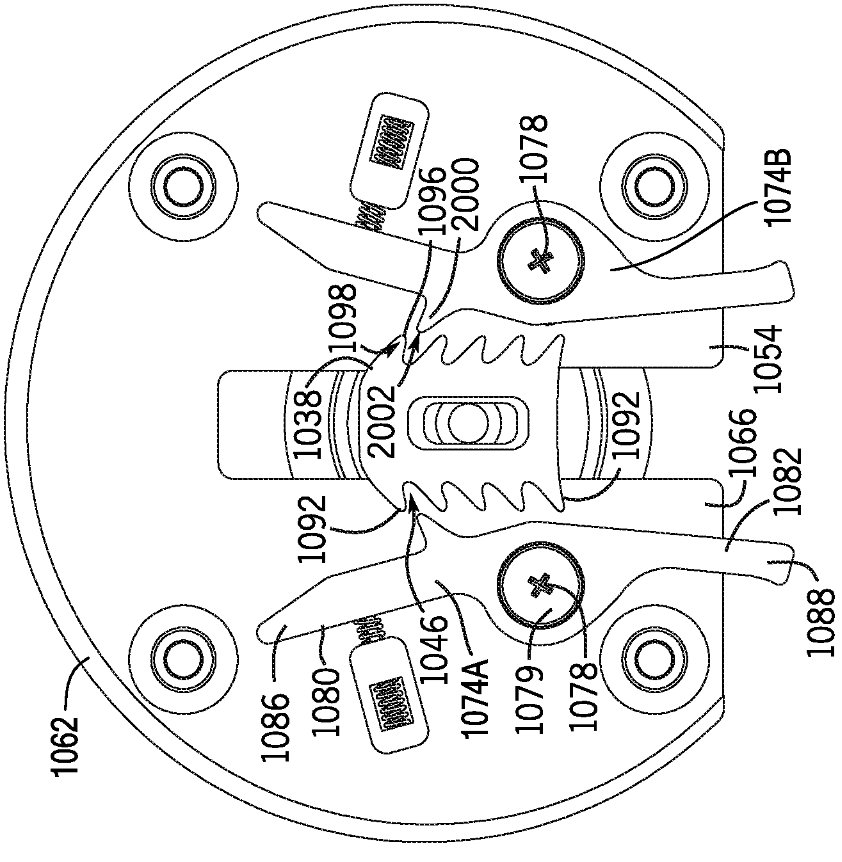
FIG. 68A is a rear elevation view of the mounting assembly shown in FIG. 65, showing the retention structure disengaged.

In one embodiment, the idle-end rotating member end mount 1013 shown in FIGS. 65, 67 and 68 includes at least an idle-end-mount 1038 (FIGS. 67, 68A, and 68B) defining an engagement portion 1015, and an idle-end rotating member size-adapter 1040 rotatably coupled with the idle-end-mount 1038. The idle-end rotating member size-adapter 1040 may be optional, such as where the idle-end-mount 1038 has a portion with a sufficient size to couple with the idle-end of the cover assembly in a rotatable manner. In this example, where used, the idle-end rotating member size-adapter 1040 is rotatably mounted over a central shaft 1003, and coupled from moving further along the shaft 1003 by a retaining member, such as a collar 1070 coupled to the central shaft 1003. In one embodiment, the idle-end rotating member size-adapter 1040 has a generally cylindrical outer surface 1017 for non-rotatingly engaging an inner surface of a rotating member 1002. Additionally, a bore 1019 (FIG. 66) is formed axially through the idle-end rotating member size-adapter 1040 for receiving the central shaft 1003. Referring to FIGS. 67 and 68, an end of the central shaft 1003 is coupled with the idle-end-mount 1038. In this example, the central shaft 1003 is non-rotatably coupled to the idle-end-mount 1038 by a non-circular shaped end portion being received in a correspondingly non-circular shaped aperture 1021 formed in the idle-end-mount 1038. However, other torque-transmitting couplings may be used. In one embodiment, the idle-end-mount 1038 includes a base plate 1023 having opposing longitudinal edges or sides 1042, which form at least a portion of the engagement portion 1044 of the idle-end-mount 1038. Each edge or side 1042 may include at least one, and optionally a plurality, of protruding teeth 1045 each spaced apart by catch recesses 1046. For example, a plurality of first catch recesses 1046 may be defined along the left edge or side 1042 of the base plate 1023 (also referred to herein as the first side) while a plurality of second catch recesses 1046 may be defined along the right edge or side 1042 of the base plate 1023 (also referred to herein as the second side). In several embodiments, the idle-end-mount 1038 is received in and engages with the retention structure 1048 formed on the idle-end bracket-adapter 1036, as described in more detail below.

In one embodiment, the mounting bracket 1016 (FIG. 65) may include an idle-end bracket-adapter 1036 coupled with the mounting structure 1052, and defining the engagement structure 1050, which may include, for example, a seat 1054 having an entry 1056. In several embodiments, the idle-end-mount 1038 may be coupled with the mounting bracket 1016 by the engagement portion 1044 being received in the seat 1054 of the engagement structure 1050 of the idle-end bracket-adapter 1036. For instance, in this example of the idle-end mounting assembly 1026, the engagement portion 1044 of the idle-end-mount 1038 may be positioned in the seat 1054 of the idle-end bracket-adapter 1036 by sliding the engagement portion 1044 in a laterally directed motion through an entry 1056 of the seat 1054 in order to be received in the engagement structure 1050.

In one embodiment, the idle-end bracket-adapter 1036 couples with the mounting structure 1052 of the idle-end bracket 1016 in a manner similar to or the same as that shown with respect to the embodiment described in FIG. 64. Specifically, in the example shown in FIG. 65, the idle-end bracket-adapter 1036 is coupled to the mounting structure 1052 of the mounting bracket 1016 by at least one aperture, through which a corresponding fastener is inserted to attach to the mounting bracket 1016. Additionally, in one embodiment, the idle-end bracket-adapter 1036 includes a main body 1057 having a first face 1058 and a second face 1060. As shown in FIG. 65, the first face 1058 is directed towards the rotating member 1002, and the second face 1060 is directed towards the mounting bracket 1016. A rim 1062 (see FIGS. 68A and 68B) may extend generally at right angles to the body 1057 from at least a portion of the periphery to create a shallow recess on the second face 1060. In one example, as shown in FIG. 65, the main body 1057 has a generally circular periphery with a flat portion 1064. The flat portion 1064 shortens one dimension of the mounting bracket 1016, and in one example accommodates a portion of the retention structure 1048 as described below. In one embodiment, the periphery may generally match the shape of the bracket 1016 upon which it is mounted.

As indicated above, the idle-end bracket-adapter 1036 includes an engagement structure 1050 for receiving the idle-end rotating member end mount 1013. In one embodiment, the engagement structure 1050, as shown in the example of FIGS. 65 and 67, includes a slot 1066 formed in the idle-end bracket-adapter 1036, with the slot 1066 defined by sidewalls 1068. In one example, the slot 1066 may have parallel sidewalls 1068, an end wall 1070, and an open end 1072 formed at a peripheral edge of the idle-end bracket-adapter 1036. In such an embodiment, the open end 1072 may form an entry or opening into the slot 1066. For instance, in the example shown, the open end 1072 of the slot 1066 is formed on the flat portion 1064 of the periphery of the main body 1057. In one example, the opposing longitudinal edges or sides 1042 of the base plate 1023 of the idle-end-mount 1038 may each include a portion (not shown) that slidably engages a corresponding opposing sidewall 1068 of the slot 1066 in order to maintain the alignment of the idle-end-mount 1038 in the slot 1066, and may each also include a second portion that defines the teeth 1045 and corresponding catch recesses 1046, which extend beyond the sidewalls 1068 of the slot 1066. As such, the slot 1066 defines a seat 1054 of the engagement structure 1050 for receiving the idle-end rotating member end mount 1013.

As indicated above, the retention structure 1048 may be configured to couple the idle-end rotating member end mount 1013 in the engagement structure 1050 of the idle-end bracket-adapter 1036. In one example, the retention structure 1048 may be adjustable to allow the idle-end rotating member end mount 1013 to be coupled in a variety of positions within the engagement structure 1050, which allows the user to adjust the end of the shade as needed, such as for leveling the rotating member 1002 when mounted to a support structure. As shown in FIGS. 67 and 68, the retention structure 1048 may, in one embodiment, correspond to one or more pawls (e.g., a first pawl 1074A and second pawls 1074B) and the associated catch recesses 1046 that allow for selective coupling of the idle-end-mount 1038 with the engagement structure 1050 of the idle-end bracket-adapter 1036.

The pawls 1074A, 1074B in this example are coupled to the second face 1060 of the idle-end bracket-adapter 1036, as best shown in FIGS. 67 and 68, and are positioned adjacent the engagement structure 1050 (e.g., adjacent to the slot 1066). In one embodiment, a pawl 1074A, 1074B may be pivotably coupled adjacent to each opposing side 1068 of the slot 1066, with each pawl 1074A, 1074B being movable between an extended position coupled with the idle-end-mount 1038 (see FIG. 67) and a retracted position disengaged from the idle-end-mount 1038 (see FIG. 68). For instance, when at the extended position, the first pawl 1074A may be configured to engage one of the catch recesses 1046 defined along the left or first side 1042 of the idle-end-mount 1038 while the second pawl 1074B may be configured to engage one of the catch recesses 1046 defined along the right or second side 1042 of the idle-end-mount 1038. Additionally, in one embodiment, the pivot axis 1078 of each pawl 1074A, 1074B may delineate between a first portion 1080 and a second portion 1082 of each pawl 1074A, 1074B. Moreover, as shown in FIG. 67, a biasing member 1084 is positioned between the second face 1060 of the idle-end bracket-adapter 1036 and the first portion 1080 of each pawl 1074A, 1074B to bias the pawl 1074A, 1074B to the extended position (see FIG. 67). In this example, the biasing member 1084 may be a coil spring. However, the biasing member 1084 may also be other structures, such as a leaf spring or another form of a resilient structure.

With reference to FIGS. 67 and 68, each pawl 1074A, 1074B in this example may be an elongated member defining an engagement end 1086 on the first portion 1080 and a generally opposing actuation end 1088 on the second portion 1082. Additionally, each pawl 1074A, 1074B may be pivotably coupled with the idle-end bracket-adapter 1036 at a position located between the actuation end 1088 and the engagement end 1086. In this example, a pivot axis 1078 is formed about a fastener 1079 positioned through an aperture securing each pawl 1074A, 1074B to the idle-end bracket-adapter 1036. In one embodiment, the side of each pawl 1074A, 1074B closest to the seat 1054 may define the coupling portion 1090, and which may include in this example at least one, and optionally a plurality, of tooth-shaped structures 1045. With reference to FIG. 68, a bottom wall 1092 of each tooth 1045 may define a portion of a catch recess 1046 for engaging the adjacent pawl 1074A, 1074B. Additionally, the opposite side of each pawl 1074A, 1074B defines a sidewall 1094 that is coupled to the biasing member 1084. The coupling portion 1090 of each pawl 1074A, 1074B, when in the extended position without the idle-end-mount 1038 positioned therebetween, may be spaced apart by a dimension less than the width of the base plate 1023 of the idle-end-mount 1038, and may or may not overlap the slot 1066. This relatively small dimension ensures that the pawls 1074A, 1074B engage the idle-end-mount base plate 1023 when in the seat 1054 of the engagement structure 1050 (See FIG. 67). Additionally, the actuation end 1088 (or second portion 1082) of each pawl 1074A, 1074B extends past the periphery of the idle-end bracket-adapter 1036, and in one example extends past the flat portion 1064 of the idle-end bracket-adapter 1036, for access by a user to disengage the pawls 1074 from the idle-end-mount 1038 (See FIG. 68). As the idle-end-mount 1038 is moved along the slot 1066 and into the seat 1054, the idle-end-mount 1038 engages the pawls 1074A, 1074B and actuates each pawl 1074A, 1074B to deflect it away from the slot 1066, and allows the idle-end-mount 1038 to pass further into the slot 1066.

When the idle-end-mount 1038 is slid into the seat 1054 a sufficient amount, such as in FIG. 67, one of the catch recesses 1046 along each side of the idle-end-mount 1038 becomes aligned with the adjacent pawl 1074A, 1074B, and the associated resilient member 1084 biases the pawl 1074 towards the extended position and into engagement with the aligned catch recess 1046. As such, the pawls 1074 engage the aligned catch recesses 1046 and retain the idle-end-mount 1038 in the seat 1054, thereby preventing the idle-end-mount 1038 from becoming unseated by moving in the reverse direction. The position of the idle-end-mount 1038 along the slot 1066 may be adjusted by aligning the desired one of the plurality of catch recesses 1046 with the corresponding pawls 1074A, 1074B. Insertion of the idle-end-mount 1038 into the engagement structure 1050 may be done with or without actuating the pawls 1074. For instance, in one embodiment, the pawls 1074A, 1074B do not need to be moved to the retracted position (see FIG. 68) to position the idle-end-mount 1038 through the entry 1056 and into the seat 1054 of the engagement structure 1050. Because the pawls 1074A, 1074B are resiliently biased to the extended position, as the idle-end-mount 1038 passes along the slot 1066, the pawls 1074A, 1074B deflect away and let the idle-end-mount 1038 pass to the desired location in the slot 1066. In this example, the retention structure 1048 automatically engages the idle-end-mount 1038 to retain the idle-end-mount 1038 within the engagement structure 1050. This allows for a user to easily adjust, such as for example by using a single hand, the location of the idle-end-mount 1038 in the engagement structure 1050 on the bracket 1016, to adjust the height of the end of the rotating member 1002, and thus the cover assembly, relative to the bracket 1016.

To disengage the retention structure 1048 and allow the idle-end-mount 1038 to be adjusted within the seat 1054, or removed from the seat 1054 of the engagement structure 1050, each pawl 1074A, 1074B may be moved out of engagement with the particular catch recess 1046 with which it is engaged. For example, by moving the actuation ends 1088 (e.g., second portion 1082) toward the slot 1066, the engagement end 1086 (e.g. first portion 1080) of each pawl 1074A, 1074B is caused to pivot about the pivot axis 1078 to the retracted position (FIG. 68A). The actuation end 1088 of each pawl 1074A, 1074B thus moves towards the seat 1054 (laterally between FIGS. 67 and 68A) and causes the engagement end 1086 (e.g., first portion 1080) of each pawl 1074A, 1074B to move out of its catch recess 1046 and away from the seat 1054. This disengages the pawls 1074A, 1074B from the corresponding catch recesses 1046 of the idle end-mount 1038 and allows the idle-end-mount 1038 to be slid out of the seat 1054, or re-adjusted within the seat 1054.

In the illustrated example, the engagement end 1086 of each pawl 1074A, 1074B is laterally captured in its associated catch recess 1046, which limits the lateral movement of the engagement end 1086 out of the catch recess 1046. Full disengagement of each pawl 1074A, 1074B from the associated catch recess 1046, in this example, may require the idle-end-mount 1038 to be initially moved further into the seat 1054 to create a slight separation between the engagement end 1086 of each pawl 1074A, 1074B and the walls 1092 of each associated catch recess 1046 before each engagement end 1086 can move laterally away from the seat 1054 and out of the adjacent catch recess 1046. This initial movement helps ensure that each engagement end 1086 is moved out of the catch recess 1046 intentionally, and not accidentally. For example, each engagement end 1088 may be laterally captured in the associated catch recess 1046 because the walls 1092 of the catch recess 1046 form an acute angle, with an outer edge 1096 below the apex 1098 of the catch recess 1046. As shown in FIGS. 68A and 68B, the tip 2000 of the engagement end 1086 of each pawl 1074A, 1074B defines an acute angle, with the tip apex 2002 positioned adjacent the recess apex 1098 when engaged (FIG. 68B). In this position, because the outer edge 1096 of the catch recess 1046 is lower than the apex 1098 of the catch recess 1046, the tip 2000 of the engagement end 1086 of each pawl 1074A, 1074B is laterally constrained. Thus, to allow the tip 2000 to move laterally and out of the catch recess 1046, the tip 2000 and the walls 1092 of the catch recess 1046 (that also form the teeth 1045) must be initially moved relative to one another so that the apex 2002 of the tip 2000 can clear the outer edge of the catch recess 1046. As indicated above, this may be done by moving the catch recess 1046 away from the apex 2002 of the tip 2000, such as by moving the idle-end-mount 1038 slightly further into the mounting structure 1052, and at least sufficiently further by an amount to allow the tip apex 2002 of the tip 2000 to pass by the outer edge 1096 of the catch recess 1046 as each pawl 1074A, 1074B is pivoted away from the seat 1054.

In general, the retention structure as described above with respect to FIGS. 65-68 may include a pawl 1074A, 1074B and catch recess 1046 on either side of the base plate 1023 of the idle-end-mount 1038. This example would couple both sides of the idle-end-mount 1038 from moving out of the seat 1054 once in the engagement structure 1050. However, it is contemplated that the retention structure 1048 embodied by a pawl 1074 and catch recess 1046 may be employed where only one side of the idle-end-mount 1038 defines at least one catch recess 1046, and only one pawl 1074 is pivotably coupled to the idle-end bracket 1016 for biased engagement with that side of the idle-end-mount 1038. In this case, the idle-end-mount 1038 would still be coupled in the seat 1054 and be held from moving out of the seat 1054 until the pawl 1074 is moved to the retracted position.

The idle-end mounting assembly 1026 as described with respect to FIGS. 65-68 may also be utilized on a control-end mounting assembly 1024. In particular, the adjustable retention structure may be employed on a control-end bracket-adapter 1028 for adjustable engagement with a control-end-mount 1030 of a control-end rotating member end mount 1010.

Figure 69:
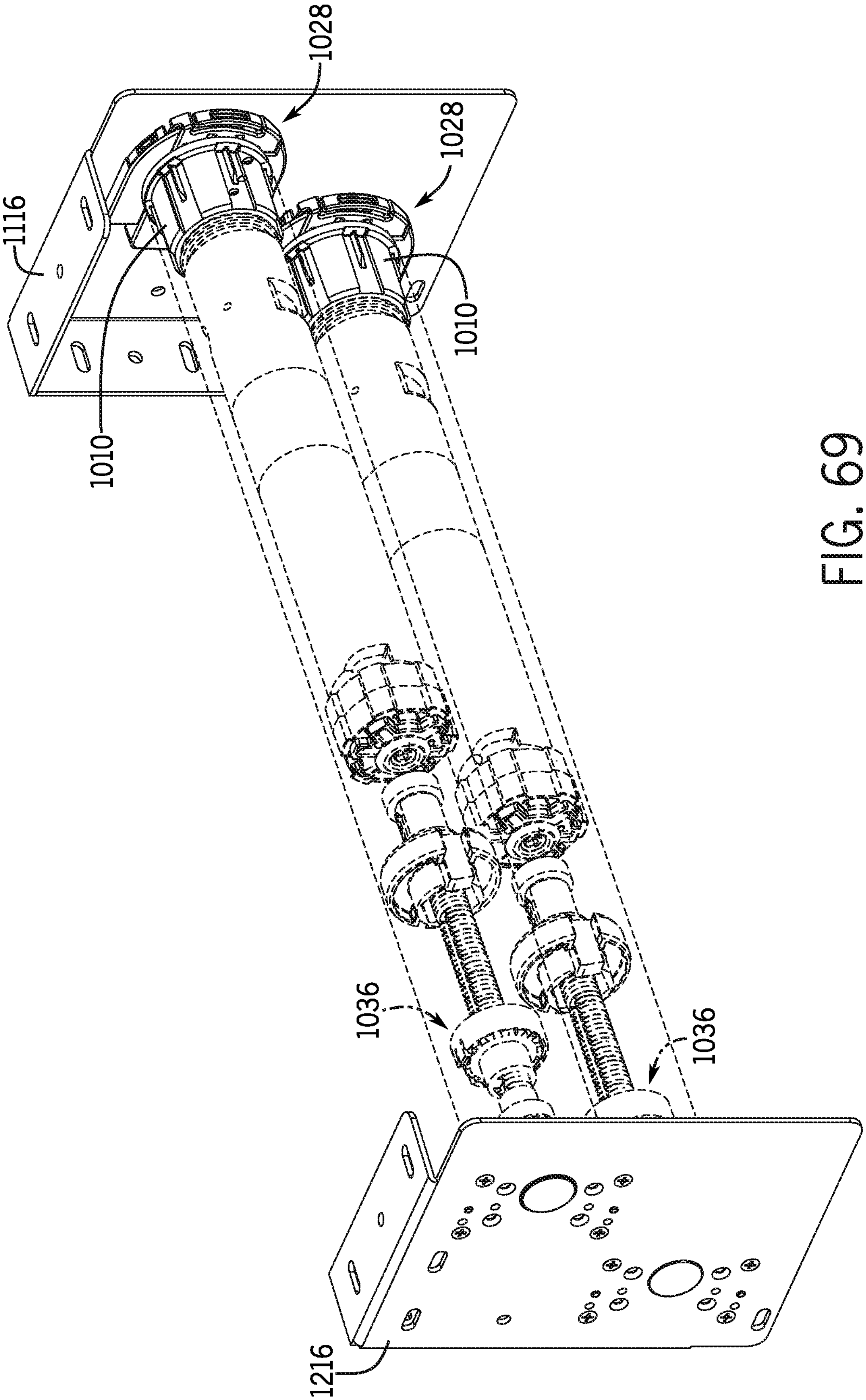
FIG. 69 is an isometric view of a cover assembly having dual rollers coupled to a single bracket supporting either end.

A covering for an architectural feature, in some examples, may include more than one rotating member mounted to a support structure using the same opposing mounting brackets. In such a case, each bracket may include two mounting structures, each for receiving a rotating member mounting assembly. Where the rotating member defines a control-end and an idle-end, one bracket may receive two control-end mounting assemblies, and one bracket may receive two idle-end mounting assemblies. As shown in FIG. 69, a control-end bracket 1116 may include a mounting structure to receive two control-end bracket-adapters 1028, wherein each control-end bracket-adapter 1028 in turn may receive a control-end rotating member end mount 1010, which in turn may include at least a control-end-mount. An optional rotating member size-adapter may also be included in a control-end rotating member end mount. Likewise, an idle-end bracket 1216 may include a mounting structure to receive two idle-end bracket-adapters 1036, which in turn may receive an idle-end rotating member end mount, which in turn may include an idle-end-mount and an optional rotating member size-adapter.

A further example of one embodiment of a mounting assembly is illustrated in FIGS. 70-79. In general, the embodiment of the mounting assembly shown in FIGS. 70-79 will be described herein as a control-end mounting assembly 1224. As such, the mounting assembly 1224 will generally be described as being used to couple the control-end of a cover assembly to a corresponding bracket 1216. However, in other embodiments, the mounting assembly may correspond to an idle-end mounting assembly and, thus, may be used to couple the idle-end of a cover assembly to a corresponding bracket 1216.

Figure 70:
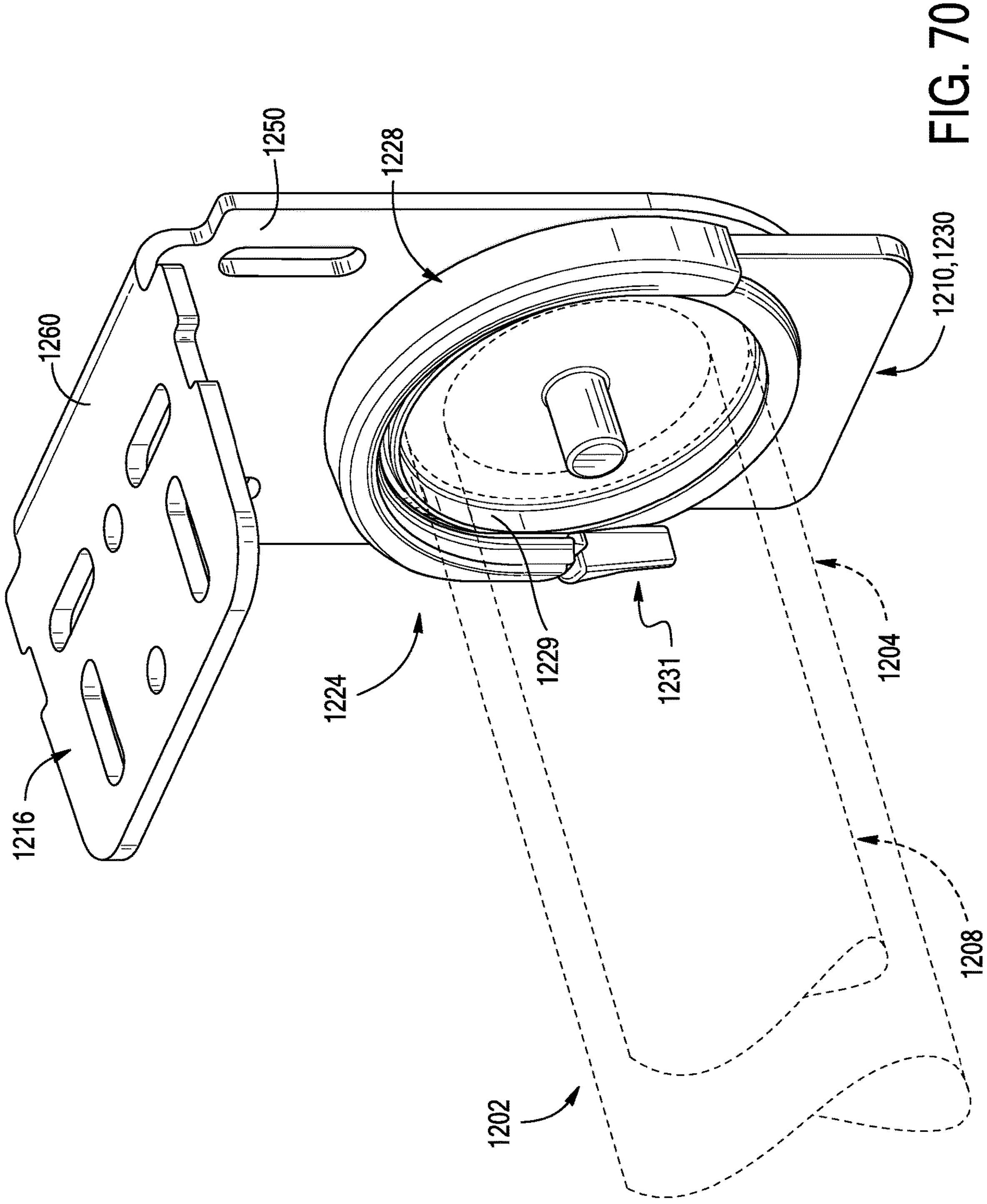
FIG. 70 is an isometric view of one illustrative example of an alternate embodiment of a mounting assembly.

An example of the mounting assembly 1224 is shown assembled in FIG. 70 and generally includes a rotating member end mount 1210 configured to be coupled to corresponding engagement structure of an associated mounting bracket 1216. In one embodiment, the rotating member end mount 1210 is configured to be positioned on or adjacent to the control-end of the cover assembly, with the bracket 1216 being coupled to an adjacent support structure. Additionally, the mounting assembly 1224 may include a retention structure that retains the rotating member end mount 1210 relative to the bracket 1216 in the assembled configuration. For instance, in one embodiment, the retention structure may automatically retain the rotating member end mount 1210 in engagement with the bracket 1216. Additionally, the retention structure may be released to allow the rotating member end mount 1210 to be dc-coupled from the bracket 1216.

Also, in this example of the mounting assembly 1224, an end-mount 1230 of the rotating member end mount 1210 (See, e.g., FIGS. 71-73) may be installed relative to the bracket 1216 by a lateral sliding motion, as explained in greater detail below. Additionally, as with some of the other mounting assemblies described herein and as shown in FIG. 70, a motor assembly 1208 for controlling the rotating member 1202 to actuate and extend or retract the shade or cover panel may be coupled with the control-end of the rotating member 1202. For instance, the motor assembly 1208 may be operatively coupled with the rotating member 1202, and in some examples may be positioned at least partially within the rotating member 1202. The motor assembly 1208 may be optional if the user does not wish to include the cover assembly control function of the motor assembly.

Figures 71, 72, 73:
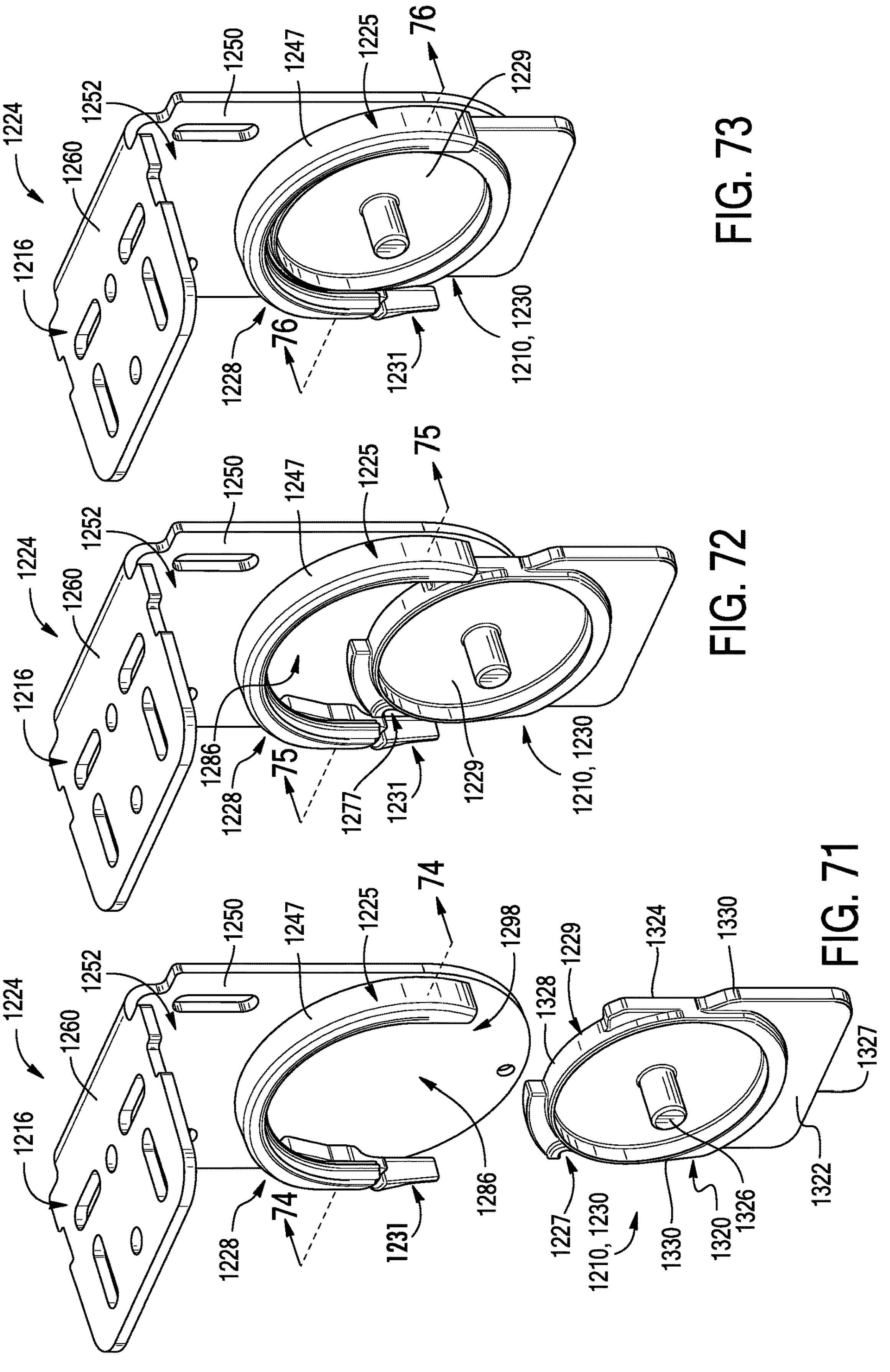
FIG. 71 is an isometric view of the rotating member end mount, mounting bracket, and bracket-adapter of FIG. 70 prior to coupling.
FIG. 72 is an isometric view of the rotating member end mount, mounting bracket and bracket-adapter of FIG. 70 during coupling.
FIG. 73 is an isometric view of the rotating member end mount, mounting bracket and bracket-adapter of FIG. 70 coupled together.
Figure 79:
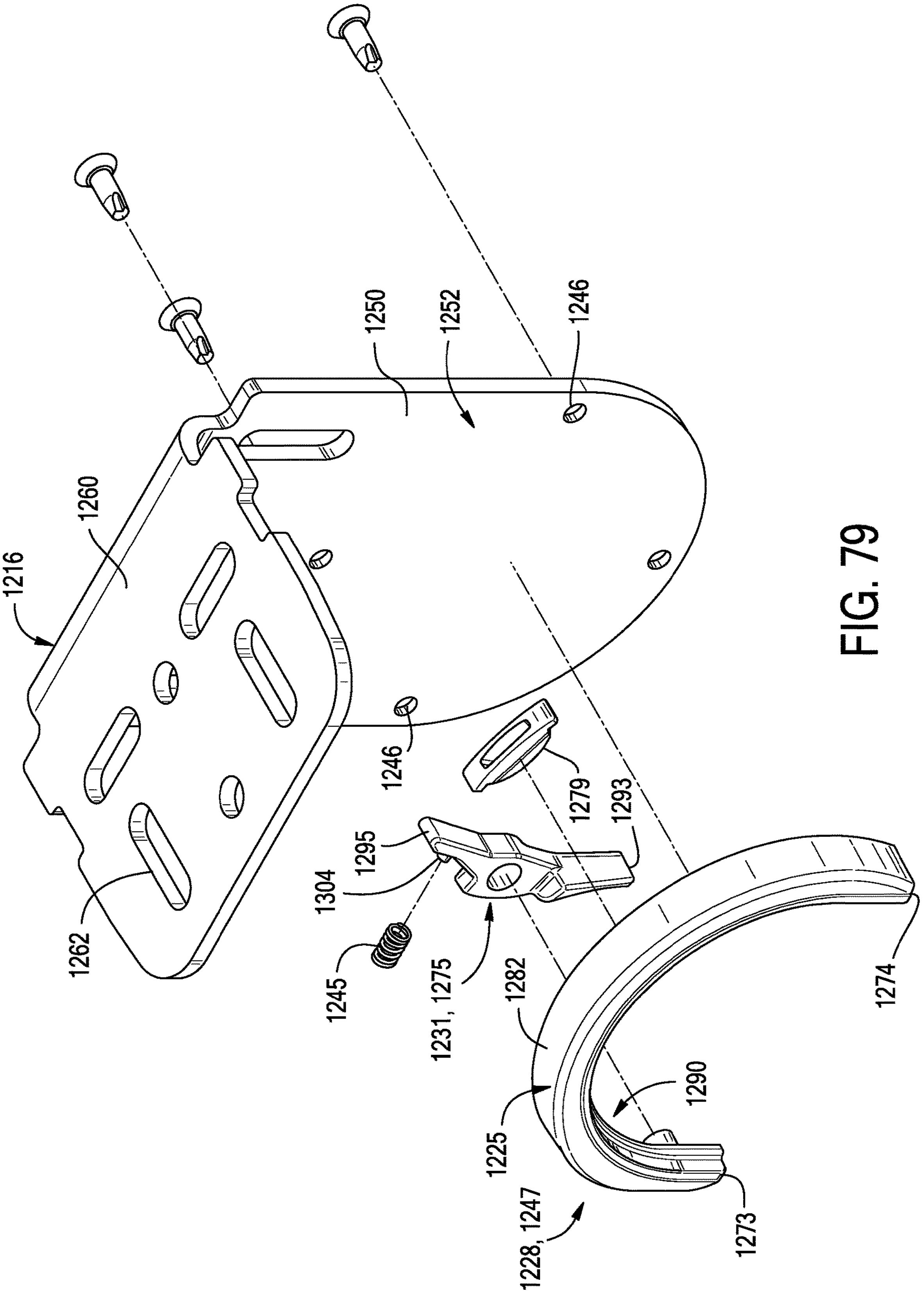
FIG. 79 is an exploded view of the portion of the mounting assembly of FIG. 77.

As shown in FIGS. 70 and 71, in several embodiments, the mounting assembly 1224 includes, for example, the rotating member end mount 1210, the bracket 1216, and one or more other assembly components. The rotating member end mount 1210 may be coupled with the control-end 1204 of the rotating member 1202, while the bracket 1216 may be coupled to the support structure of the adjacent or associated architectural feature. As shown in FIGS. 71-76, the rotating member end mount 1210 includes at least an end-mount 1230 defining an engagement portion 1229. An optional rotating member size-adapter or coupling (not shown) may be provided where the control-end-mount 1230 is not configured to be directly coupled to the control-end of the rotating member 1202. As shown in FIGS. 77 and 79, the mounting bracket 1216 may define a mounting structure 1252, which may be configured to receive a bracket-adapter 1228. In several embodiments, the bracket-adapter 1228 defines an engagement structure 1225 (see FIGS. 71, 74) for receiving a portion of the end-mount 1230. In the illustrated embodiment, the engagement structure 1225 includes, for example, a seat 1286 having an entry 1298, and may also include a retention structure 1231 (each shown in FIG. 71). To couple the end-mount 1230 with the mounting bracket 1216, the engagement portion 1229 of the end-mount 1230 may be received in the seat 1286 of the engagement structure 1225 of the bracket-adapter 1228. As will be described below, in several embodiments, the end-mount 1230 is retained in the seat 1286 of the bracket-adapter 1228 via engagement with the retention structure 1231 of the bracket-adapter 1228 (see FIGS. 74-76). In one embodiment, the retention structure 1231 may be automatically actuated by the positioning of the end-mount 1230 in the seat 1286 to allow the retention structure 1231 to engage the end-mount 1230 and, thus, retain the end-mount 1230 within the seat 1286. Additionally, the engagement portion 1229 of the end-mount 1230 may be removed from the bracket-adapter 1228 by disengaging the retention structure 1231, thereby allowing the end-mount 1230 to be removed from the seat 1286. Also, in this example of the mounting assembly 1224, the engagement portion 1229 of the end-mount 1230 may be positioned in the seat 1286 of the bracket-adapter 1228 by sliding the engagement portion 1229 laterally through its entry 1298, as explained in greater detail below.

In general, the rotating member end mount 1210 is coupled with the bracket 1216 by sliding the end-mount 1230 into the seat 1286 of the engagement structure 1225 formed by the bracket-adapter 1228. When received in the engagement structure 1225 of the bracket-adapter 1228, at least a portion of the end-mount 1230 is captured between opposed sides of the bracket-adapter 1228 and selectively coupled in the seat 1286 by the retention structure 1231 (see FIGS. 74-76). Additionally, an optional biasing mechanism 1245 (see FIG. 54) may be provided that applies a biasing force against the end-mount 1230 to reduce or minimize any tolerances between the end-mount 1230 and the engagement structure 1225.

Similar to the brackets described above with respect to other embodiments of the mounting assembly, and as shown in FIGS. 77 and 79, the mounting bracket 1216 may, for example, include a first portion 1250 and a second portion 1260 forming an L-shaped bracket. In addition, the mounting bracket 1216 includes at least one aperture 1262 for use in securing the bracket to the support structure surrounding the architectural feature. However, in other embodiments, the bracket 1216 may have any other suitable configuration (s), including being generally flat.

In several embodiments, the first portion 1250 of the bracket 1216 includes a mounting structure 1252 for receiving the bracket-adapter 1228, which in this example includes at least one fastening aperture 1246 (see FIG. 79) to operably couple the bracket-adapter 1228 to the mounting bracket 1216, e.g., with a fastener. Where there is more than one fastening aperture 1246, the apertures may be positioned to form a pattern as described above with respect to the mounting structure 152. In the example shown in this embodiment, the fastening apertures are formed in a pattern, and in particular have a rectangular-shaped pattern. As a result, the mounting bracket 1216 may, for example, be used to support either the control-end or the idle-end of the cover assembly. As noted above with respect to the other embodiments, the mounting structure 1252 formed in the mounting bracket 1216 may be a shared feature allowing alternative types and configurations of mounting brackets 1216 to be utilized with either a control-end mounting assembly or an idle-end mounting assembly.

Figure 74:
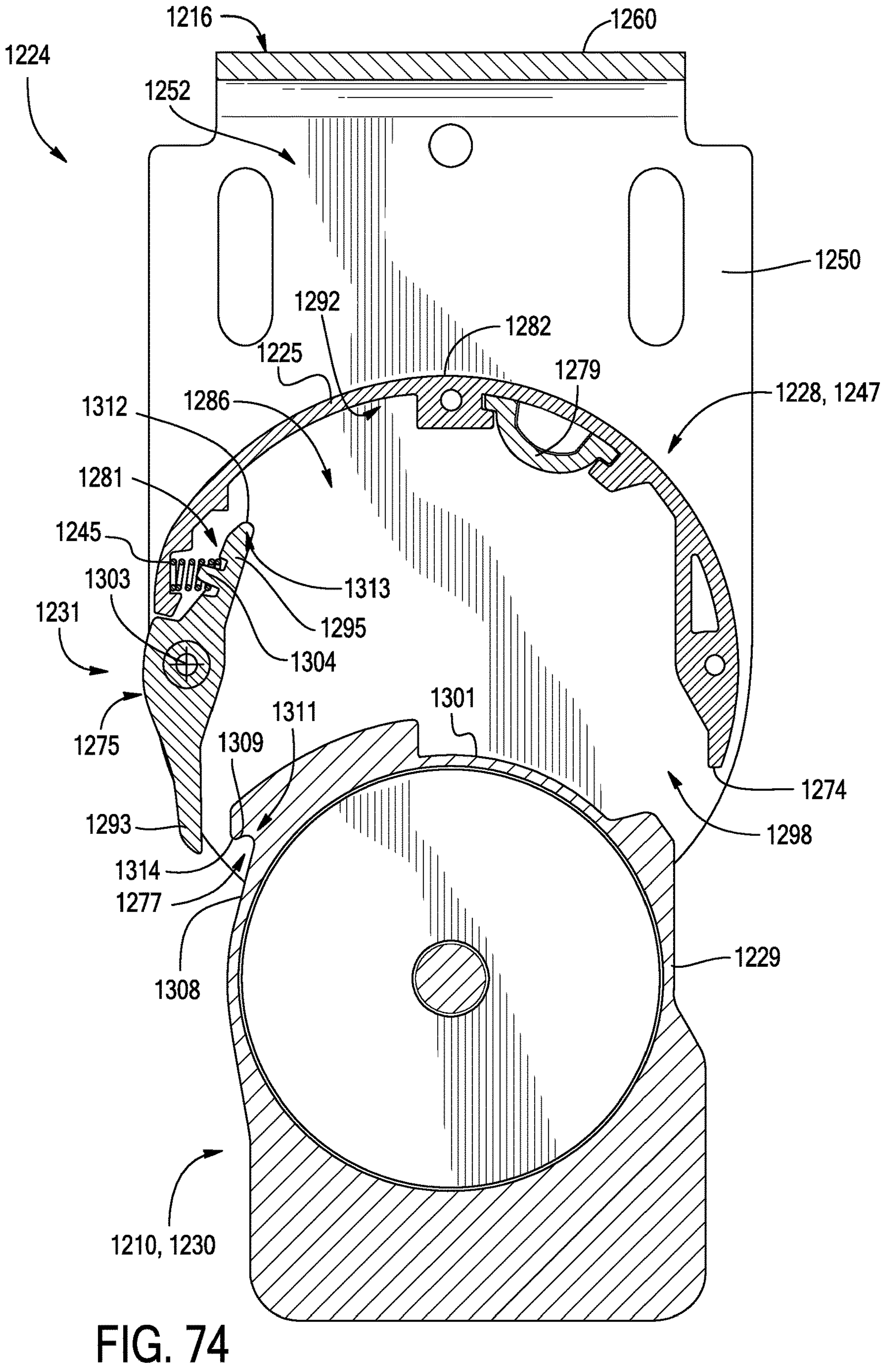
FIG. 74 is a cross-sectional view taken along line 74-74 in FIG. 71 showing the rotating member end mount, mounting bracket, and bracket-adapter prior to coupling.

As shown in FIGS. 71 and 74, the bracket-adapter 1228 is coupled with the mounting bracket 1216 and includes an engagement structure 1225 configured to couple with the rotating member 1202 via the rotating member end mount 1210. Additionally, the bracket-adapter 1228 may be coupled with the mounting bracket 1216 by the mounting structure 1252. As shown in FIGS. 71 to 76, the bracket-adapter 1228 in this example includes an adapter component coupled to the bracket 1216 by the mounting structure 1252. The adapter component may, for example, correspond to an arced or curved adapter member 1247 mounted to the bracket 1216.

Figure 78:
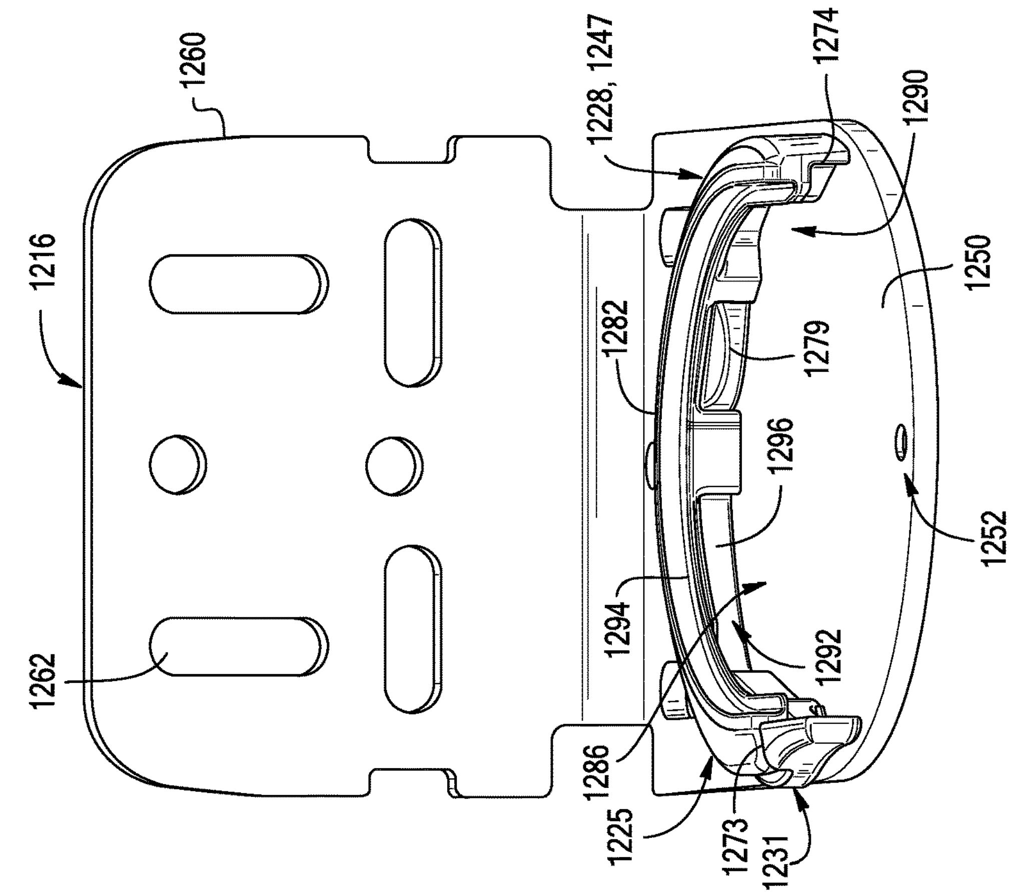
FIG. 78 is a bottom perspective view of the portion of the mounting assembly of FIG. 77.

As shown in FIGS. 77 and 78, in this example of the illustrated embodiment, the adapter member 1247 of the bracket-adapter 1228 forms a curved or arced rail that generally defines the engagement structure 1225 of the bracket-adapter 1228, which includes, for example, a seat 1286, and an entry 1298 into the seat 1286, for receiving the end-mount 1230. Alternatively, the engagement structure 1225 may have any other structural form that allow for selective releasable engagement with the bracket-adapter 1228. Continuing with reference to FIGS. 77 and 78, the adapter member 1247 may generally include a first end 1273 positioned on a first side of the adapter member 1247 and a second end 1274, positioned on a second side of the adapter member 1247, with the adapter member 1247 generally defining an arcuate or curved profile between the first and second ends 1273, 1274. For example, the adapter member 1247 may define a semi-circular shape between its first and second ends 1273, 1274, with the adapter member 1247 extending to a top or outer edge 1282 defined at the peak of the radius of curvature defined between the first and second ends 1273, 1274.

Additionally, as shown in FIGS. 77 and 78, an engagement portion 1290 of the adapter member 1247 may extend at least partially along the length of the adapter member 1247 between its first and second ends 1273, 1274, and in this example along an inside edge of the adapter member 1247. In one embodiment, the engagement portion 1290 may be defined by an overhanging flange 1294 extending from a recessed wall 1296. In such an embodiment, the overhanging flange 1294 and recessed wall 1296 along the inside edge of the adapter member 1247 define a channel 1292 extending around the inner perimeter of the adapter member 1247. With continued reference to FIGS. 71-73, the engagement structure 1225 of the adapter member 1247 is formed, for example, by the seat 1286, which includes the channel 1292 (see FIG. 78) and the space defined within the interior of the adapter member 1247. The entry 1298 into the seat 1286 is formed between the ends 1273, 1274 of the adapter member 1247. As indicated above, the rotating member end mount 1210 is received in the engagement structure 1225, and in this example may be positioned adjacent the entry 1298 to the seat 1286 and slid laterally into the seat 1286 to engage the channel 1292 (see FIG. 78).

Once coupled as intended during installation, relative movement between the end-mount 1230 and the engagement structure 1225 may be undesirable. For instance, it may be desirable for the end-mount 1230 to remain coupled with the engagement structure 1225 to maintain proper alignment relative to the architectural feature, as well as to allow desired operation by the user. Unintended de-coupling of the end-mount 1230 may also result in the cover assembly failing to operate properly, or even separating from the support structure. As indicated above, in order to mitigate the risk of decoupling, a retention structure may be included in the mounting assembly. In several embodiments, the retention structure may allow the user to selectively maintain coupling and selectively cause de-coupling of the end-mount 1230 (and thus the rotating member end mount 1210) from the bracket 1216.

Figure 75:
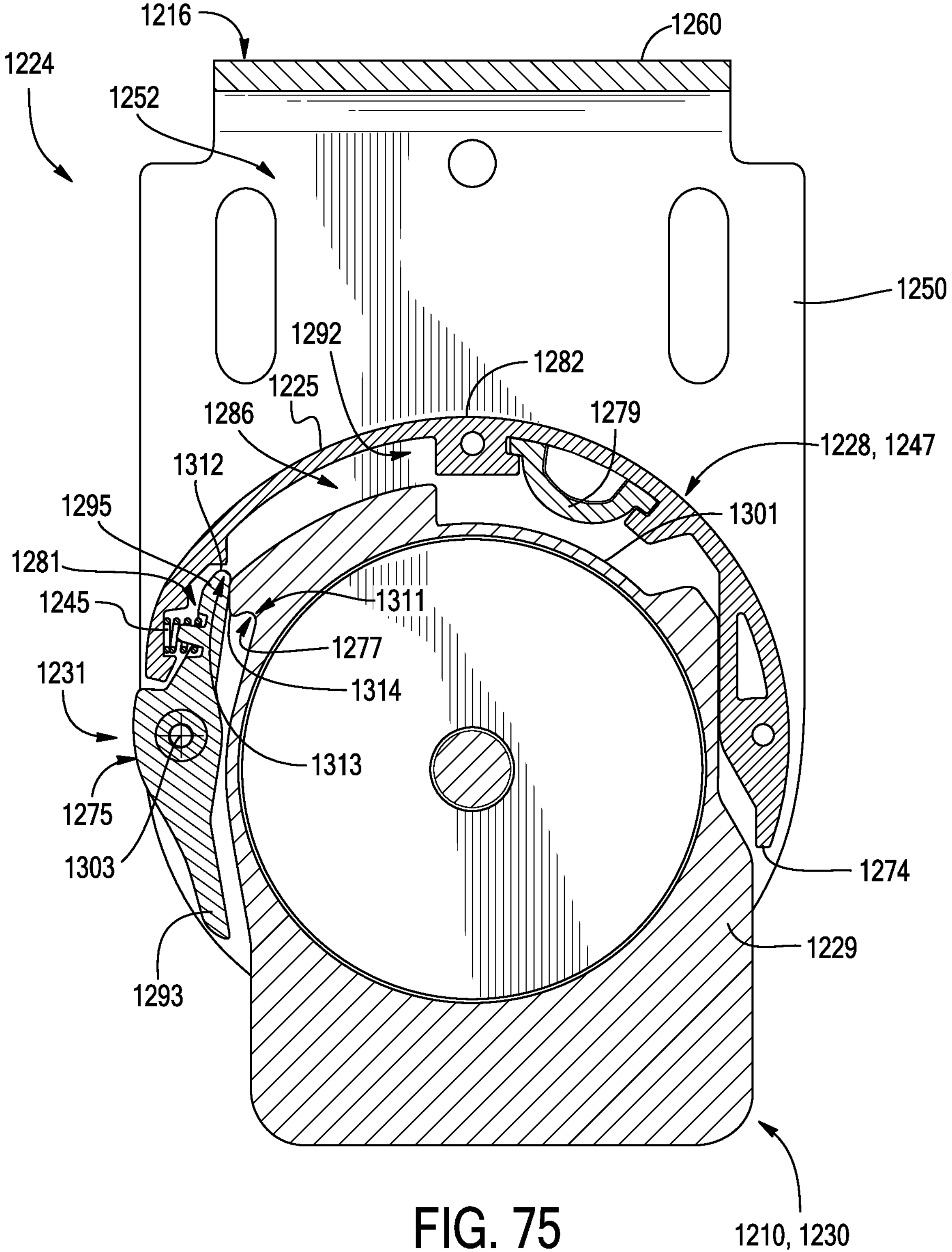
FIG. 75 is a cross-sectional view taken along line 75-75 in FIG. 72 showing the rotating member end mount, mounting bracket, and control-end bracket-adapter during coupling.
Figure 76:
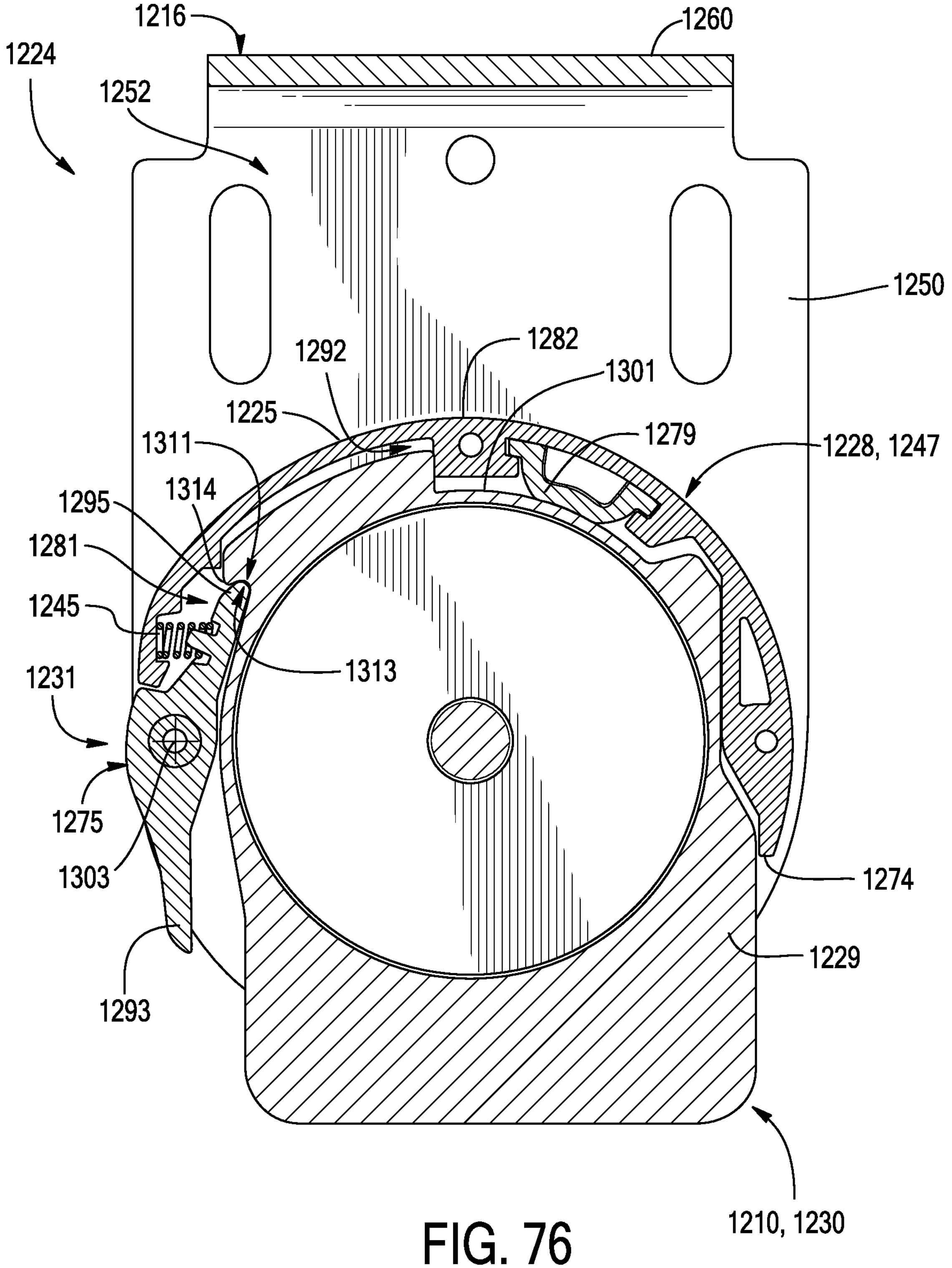
FIG. 76 is a cross-sectional view taken along line 76-76 in FIG. 73 showing the rotating member end mount, mounting bracket, and bracket-adapter coupled together.
Figure 77:
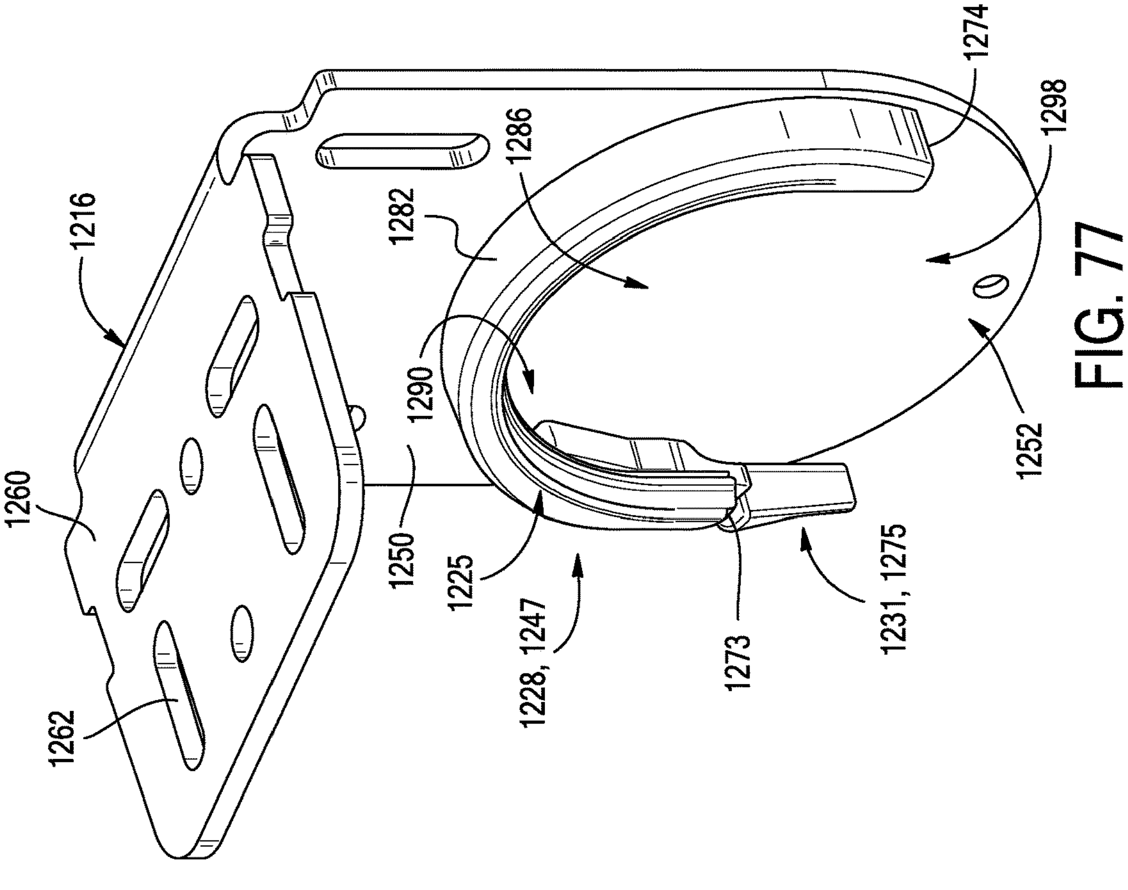
FIG. 77 is an isometric view of a portion of the mounting assembly of FIG. 70.

With reference to FIGS. 74-76, one example of a retention structure 1231 of the mounting assembly is illustrated. In this example, the retention structure 1231 is operably associated, at least in part, with the bracket-adapter 1228. In one example, the retention structure includes a pawl 1275 (also referred to as an arm) provided in operative association with a portion of the bracket-adapter 1228 and an associated catch recess 1277 defined by the end mount 1230, which allows for selective coupling and de-coupling of the end-mount 1230 relative to the engagement structure 1225 of the bracket-adapter 1228. The retention structure 1231 helps mitigate unintended de-coupling of the end-mount 1230 from the bracket-adapter 1228, such as via the engagement of the pawl 1275 with the catch recess 1277. Additionally, the retention structure 1231 may also include a biasing mechanism 1245 that acts to fully seat the end-mount 1230 in the engagement structure 1225 and reduce or eliminate any looseness of the control-end-mount 1230 when seated in the engagement structure 1225. The biasing mechanism 1245 is optional, such as where the looseness of the control-end-mount 1230 within the engagement structure 1225 is not of any concern, or the tolerances are sufficiently high in the coupling structure to not require additional stabilizing forces.

At least a portion of the retention structure 1231, in this case the pawl 1275 and the optional biasing mechanism 1245, may be provided in operative association with the bracket-adapter 1228, as best shown in FIGS. 74 to 76. In the illustrated embodiment, the pawl 1275 and associated catch recess 1277 provide for engagement between the bracket-adapter 1228 and the end-mount 1230. In several embodiments, the pawl 1275 is pivotably coupled to a portion of the adapter member 1247 (e.g., along the left side of the adapter member 1247 as shown in FIGS. 71-76 at a location adjacent to the first end 1273 of the adapter member 1247) and is movable between an extended position (see FIGS. 74 and 76), at which a portion of the pawl 1275 extends outwardly from the adjacent portion of the inner perimeter of the adapter member 1247 and into a portion of the seat 1286 defined by the adapter member 1247, and a retracted position (see FIG. 75), at which the pawl 1275 is at least partially retracted in a direction towards the adjacent portion of the inner perimeter of the adapter member 1247. A biasing or resilient member 1279 (e.g., a torsion spring or a compression spring) is coupled between a portion of the adapter member 1247 and the pawl 1275 to bias the pawl 1275 towards the extended position. As the end-mount 1230 is moved within the interior of the adapter member 1247, such as in FIG. 75 and into the seat 1286, the end-mount 1230 engages or otherwise contacts the pawl 1275 and deflects it into a cavity 1281 defined by the adapter member 1247 into its retracted position. When the end-mount 1230 is slid into the seat 1286 a sufficient amount, such as in FIG. 76, the catch recess 1277 formed in a base plate of the end-mount 1230 is aligned with the pawl 1275, thereby allowing the resilient member 1279 to bias the pawl 1275 outwardly away from the adjacent portion of the adapter member 1247 and into the catch recess 1277. As a result, the pawl 1275 engages the catch recess 1277 and retains the end-mount 1230 in the seat 1286 in a manner that prevents the end mount 1230 from moving in the reverse direction so as to become decoupled from the seat 1286. Thereafter, to allow the end-mount 1230 to be removed from the seat 1286 of the engagement structure 1225, the pawl 1275 may be moved out of engagement with the catch recess 1277, as will be described below.

With reference to FIG. 74, the pawl 1275 in this example may be an elongated member defining an engagement end 1295 and a generally opposing actuation end 1293. Referring to FIGS. 74-76, as indicated above, the pawl 1275 may be pivotably coupled with a portion of the adapter member 1247, such as at a location adjacent to the first end 1273 of the adapter member 1247. In this example, a pivot axis 1303 (see FIGS. 74-76) is formed about a fastener positioned through one of the apertures 1246 securing the adapter member 1247 to the mounting bracket 1216. Alternatively, the pivot axis may be formed at a location independent of a fastener. The side of the pawl 1275 exposed to the seat 1286 is generally long and continuous for sliding engagement with the end-mount 1230 as the end-mount 1230 moves into the seat 1286 (see FIG. 75). The opposite side of the pawl 1275 defines a retention feature 1304 (see FIG. 74) for receiving a portion of the biasing member 1279. Another portion of the biasing member 1279 engages the inner perimeter of the adapter member 1247, and acts to bias the pawl 1275 into the extended position (as shown in FIGS. 74 and 76). In this example, the biasing member 129 is a metal cod spring. However, the biasing member 1279 may also be other structures, such as a generally U-shaped metal leaf spring or a non-metal resilient structure for instance. The actuation end 1293 of the pawl 1275 extends beyond the first end 1273 of the adapter member 1247 and, thus, may be accessed along the exterior of the adapter member 1247. The pawl 1275 is caused to pivot about the pivot axis 1303 when either the actuation end 1293 or the engagement end 1295 is moved. For example, the engagement end 1295 moves towards the seat 1286 (laterally, clockwise between FIGS. 75 and 76) and causes the engagement end 1295 of the pawl 1275 to move out of the cavity 1281 in the adapter member 1247 and into the catch recess 1277 to retain the end-mount 1230 in the seat 1286.

In the illustrated example, when engaged, the engagement end 1295 of the pawl 1275 is laterally captured in the catch recess 1277, which limits the lateral movement of the engagement end 1295 out of the catch recess 1277. Full disengagement of the pawl 1275 from the catch recess 1277, in this example, may require the control-end-mount 1230 to be initially moved further into the seat 1286 to create a slight initial separation between the engagement end 1295 of the pawl 1275 and the walls of the catch recess 1277 before the engagement end 1295 can move laterally toward the adjacent portion of the adapter member 1247 and out of the catch recess 1277. This initial movement helps insure that the engagement end 1295 is moved out of the catch recess 1277 intentionally and not accidentally. In one embodiment, the engagement end 1295 is laterally captured in the catch recess 1277 due to the walls 1308, 1309 of the catch recess 1277 forming an acute angle, with an outer edge 1314 extending below the apex 1311 of the catch recess 1277 (see FIG. 74). In such an embodiment, the tip 1312 of the engagement end 1295 may define an acute angle, with the apex 1313 of the tip 1312 positioned adjacent the recess apex 1311 when engaged (See FIG. 76). In this position, because the outer edge 1314 of the catch recess 1277 is lower than the tip apex 1313, the tip 1312 of the pawl 1275 is laterally constrained. To allow the tip 1312 to move laterally and out of the catch recess 1277, the tip 1312 and the walls 1308, 1309 of the catch recess 1277 must be initially moved relative to one another so that the tip apex 1313 can clear the outer edge 1314 of the catch recess 1277. As indicated above, this may be done by moving the catch recess 1277 away from the tip apex 1313, such as by moving the end-mount 1230 slightly further into the seat 1286 and at least sufficiently further by an amount to allow the tip apex 1313 to pass by the outer edge 1314 of the catch recess 1277 as the pawl 1275 is pivoted into the recess 1281 in the adapter member 1247. With the engagement end 1295 of the pawl 1275 clear of the catch recess 1277 in the lateral direction, the actuation end 1293 of the pawl 1275 may be actuated towards the end-mount 1230 (e.g., via a user accessing the actuation end 1293 via the portion of the pawl 1275 extending beyond the first end 1273 of the adapter member 1247 and pushing the actuation end 1293 towards the end-mount 1230) to cause the pawl 1275 to pivot about its pivot axis 1303 in a direction (e.g., the counter-clockwise direction in the illustrated embodiment) that results in the engagement end 1295 of the pawl 1275 being moved to its retracted position, thereby allowing the end-mount 1230 to be slid out of the seat 1286 defined by the adapter member 1247 of the bracket-adapter 1228. It should be appreciated that the above-described configuration allows for the retention structure 1231 to function a safety feature while still allowing the end mount 1230 to be quickly and easily decoupled from the bracket-adapter 1228 by the user when desired. Specifically, by requiring the control-end-mount 1230 to be initially moved or pushed upwardly further into the seat 1286 to allow the pawl 1275 to be fully disengaged from the catch recess 1277, unintentional or accidental decoupling of the end mount from the bracket-adapter can be prevented.

As indicated above, the optional biasing mechanism 1245 of the illustrated example may provide for improved engagement of the end-mount 1230 in the seat 1286, and is best shown in FIGS. 74, 75, and 76. In several embodiments, the biasing mechanism 1245 may correspond to a resilient bumper (e.g., a rubber bumper or other bumper formed from a resilient material) positioned along the inner perimeter of the adapter member 1247 at a location at or adjacent to its outer edge 1282. In one embodiment, when the control-end-mount 1230 is slid into the seat 1286 a sufficient distance, and in one example just prior to the engagement of the retention structure 1231, an outer surface 1301 of the end-mount 1230 engages the biasing mechanism 1245. As the end-mount 1230 is slid further into the seat 1286, the biasing mechanism 1245 is compressed between the outer surface 1301 of the end-mount 1230 and the inner perimeter of the adapter member 1247, increasing the compression load on the biasing mechanism 1245. When the retention structure 1231, which in this example is the pawl 1275 and catch recess 1277, is engaged, the biasing mechanism 1245 applies a biasing force to the outer surface 1301 of the end-mount 1230 in a direction towards the entry 1298 of the seat 1286. This causes the catch recess 1277 and the tip of the pawl 1275 to engage more tightly to resist the force of the biasing mechanism 1245, as well as to reduce or minimize any tolerances that may cause looseness in the interface between the end-mount 1230 and the engagement structure 1225. As indicated above, the biasing mechanism 1245 in this example corresponds to a resilient bumper. However, in other embodiments, the biasing mechanism 1245 may correspond to a spring (e.g., a metal coil spring or a torsion spring) or any other suitable resilient member.

Various components of the control-end-mount 1230 are shown in FIGS. 71-73. In general, the control-end-mount 1230 includes a portion configured to couple with the engagement structure of the bracket-adapter 1228, and a portion for rotatably coupling with the control-end of the rotating member 1202, and thus facilitates the coupling of the rotating member 1202 to the mounting bracket 1216. As particularly shown in FIG. 71, the end-mount 1230 includes a base plate 1320 having a first face 1322 and a second face 1324 and a hub 1326 extending from the first face 1322 of the base plate 1320. The base plate 1320 is generally configured and sized to be received in the seat 1286 of the bracket-adapter 1228, and includes a first end 1327 and a second end 1328, and opposing flanges 1330 extending along the lateral sides between the first and second ends 1327, 1328. Each flange 1330 may include a portion of its length having a reduced thickness dimension compared to the general thickness dimension of the base plate 1320. This reduced thickness dimension may be sufficient to be received within the channel 1292 formed by the adapter member 1247 of the bracket-adapter 1228 (see FIG. 78). The catch recess 1277 is formed in one of the lateral sides of the base plate 1320, and in this example the left side as shown in FIG. 74-76.

With reference to FIG. 71, the portion of the end-mount 1230 upon which the control-end of the cover assembly rotatably couples is in this example formed by a hub 1326 extending away from the first face 1322 of the base plate 1320. In one embodiment, the hub 1326 has a generally cylindrical outer surface to form a bearing surface upon which the rotating member 1202 may freely rotate. Alternatively, a rotating member size-adapter or coupling (not shown) may be provided between the hub 1326 and the rotating member 1202 to allow the rotating member 1202 to rotate relative to the end-mount 1230.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

In the foregoing Detailed. Description, it will be appreciated that the phrases “at least one”, “one or more”, and “and/or”, as used herein, are open-ended expressions that are both conjunctive and disjunctive in operation. The term “a” or “an” element, as used herein, refers to one or more of that element. As such, the terms “a” (or “an”), “one or more” and “at least one” can be used interchangeably herein. All directional references (e.g., proximal, distal, upper, lower, upward, downward, left, right, lateral, longitudinal, front, rear, top, bottom, above, below, vertical, horizontal, cross-wise, radial, axial, clockwise, counterclockwise, and/or the like) are only used for identification purposes to aid the reader’s understanding of the present subject matter, and/or serve to distinguish regions of the associated elements from one another, and do not limit the associated element, particularly as to the position, orientation, or use of the present subject matter. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term “comprises/comprising” does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms “a”, “an”, “first”, “second”, etc., do not preclude a plurality. Reference signs in the claims are provided merely as a clarifying example and shall not be construed as limiting the scope of the claims in any way.

What is claimed is:

1. A mounting assembly for a cover assembly for an architectural feature, said mounting assembly comprising:

a bracket configured to be mounted relative to an architectural feature;

a bracket-adapter configured to be removably coupled to said bracket, said bracket-adapter defining a seat and including retention structure positioned relative to said seat;

an end mount configured to be removably coupled to an end of the cover assembly, said end mount configured to be received within said seat to allow said end mount to be releasably coupled to said bracket-adapter via said retention structure; and a biasing mechanism configured to apply a biasing force against said end-mount when said end mount is received within said seat;

wherein:

when said end mount is received within said seat of said bracket-adapter, said retention structure is movable relative to said end mount between an extended position, at which a portion of said retention structure extends within said seat to engage said end mount and retain said end mount within said seat, and a retracted position, at which said portion of said retention structure is disengaged from said end mount to allow said end mount to be removed from said seat; and the biasing force applied by said biasing mechanism against said end mount maintains said end-mount engaged with said retention structure when said portion of said retention structure is at said extended position.

2. The mounting assembly of claim 1, wherein said biasing mechanism comprises a shoulder member and a biasing member configured to bias said shoulder member into engagement with a portion of said end mount when said end mount is received within said seat.

3. The mounting assembly of claim 2, wherein said shoulder member is movable relative to said bracket adapter between an extended position and a retracted position.

4. The mounting assembly of claim 3, wherein:

said biasing member is configured to bias said shoulder member towards said extended position; and engagement between said shoulder member and said portion of said end mount as said end mount is being received within said seat results in said shoulder member moving relative to said bracket adapter towards said retracted position against the bias of said biasing member.

5. The mounting assembly of claim 2, wherein the biasing member comprises a spring.

6. The mounting assembly of claim 1, wherein said bracket-adapter includes a first elongated portion extending along a first side of said bracket adapter and a second elongated portion extending along a second side of said bracket adapter, said first and second elongated portions being spaced apart from each other such that said seat is defined between said first and second elongated portions.

7. The mounting assembly of claim 6, wherein said retention structure is provided in operative association with said first elongated portion and said biasing mechanism is provided in operative association with said second elongated portion.

8. The mounting assembly of claim 1, wherein said biasing mechanism is separate and spaced apart from said retention structure.

9. The mounting assembly of claim 1, wherein said biasing mechanism comprises a spring-biased loading mechanism configured to contact a portion of said end-mount when said end-mount is received within said seat.

10. The mounting assembly of claim 1, wherein said biasing mechanism comprises a resilient bumper configured to contact a portion of said end-mount when said end-mount is received within said seat.

11. The mounting assembly of claim 1, wherein said retention structure is pivotally coupled to said bracket-adapter to allow said retention structure to pivot relative to said end mount between said extended and retracted positions.

12. The mounting assembly of claim 1, wherein:

said seat defines an opening through which said end mount is inserted into said seat; and when said retention structure is engaged with said end mount, an engagement configuration of said portion of said retention structure with said end mount requires that said end mount be moved relative to said retention structure in a direction away from said opening of said seat and against the biasing force applied by said biasing mechanism to allow said portion of said retention structure to be moved from said extended position to said retracted position.

13. The mounting assembly of claim 1, wherein:

said retention structure comprises a pawl pivotally coupled to said bracket-adapter;

said portion of said retention structure comprises an engagement end of said pawl;

said engagement end of said pawl is configured to be received within a catch recess defined by a portion of said end mount when said pawl is moved to said extended position; and the biasing force applied by said biasing mechanism is configured to maintain said engagement end of said pawl within said catch recess of said end mount.

14. The mounting assembly of claim 12, wherein:

said pawl includes an actuation end opposite said engagement end of said pawl;

said actuation end being accessible along an exterior of said bracket-adapter to allow said actuation end to be actuated in a manner that causes said engagement end of said pawl to be pivoted from said extended position to said retracted position.

15. A mounting assembly for a cover assembly for an architectural feature, said mounting assembly comprising:

a bracket configured to be mounted relative to an architectural feature;

a bracket-adapter configured to be removably coupled to said bracket, said bracket-adapter defining a seat and including retention structure positioned relative to said seat;

an end mount configured to be removably coupled to an end of the cover assembly, said end mount configured to be received within said seat to allow said end mount to be releasably coupled to said bracket-adapter via said retention structure; and a biasing mechanism configured to apply a biasing force against said end-mount when said end mount is received within said seat;

wherein:

when said end mount is received within said seat of said bracket-adapter, said retention structure is movable relative to said end mount between an extended position, at which a portion of said retention structure extends within said seat to engage said end mount and retain said end mount within said seat, and a retracted position, at which said portion of said retention structure is at least partially retracted away from said end mount to allow said end mount to be removed from said seat;

the biasing force applied by said biasing mechanism against said end mount maintains said end-mount engaged with said retention structure when said portion of said retention structure is at said extended position said seat defines an opening through which said end mount is inserted into said seat; and when said retention structure is engaged with said end mount, an engagement configuration of said portion of said retention structure with said end mount requires that said end mount be moved relative to said retention structure in a direction away from said opening of said seat and against the biasing force applied by said biasing mechanism to allow said portion of said retention structure to be moved from said extended position to said retracted position.

16. The mounting assembly of claim 15, wherein said biasing mechanism comprises a shoulder member and a biasing member configured to bias said shoulder member into engagement with a portion of said end mount when said end mount is received within said seat.

17. The mounting assembly of claim 15, wherein said bracket-adapter includes a first elongated portion extending along a first side of said bracket adapter and a second elongated portion extending along a second side of said bracket adapter, said first and second elongated portions being spaced apart from each other such that said seat is defined between said first and second elongated portions, said retention structure being provided in operative association with said first elongated portion and said biasing mechanism being provided in operative association with said second elongated portion.

18. The mounting assembly of claim 15, wherein said biasing mechanism is separate and spaced apart from said retention structure.

19. The mounting assembly of claim 15, wherein said biasing mechanism comprises a spring-biased loading mechanism configured to contact a portion of said end-mount when said end-mount is received within said seat.

20. The mounting assembly of claim 15, wherein said biasing mechanism comprises a resilient bumper configured to contact a portion of said end-mount when said end-mount is received within said seat.

* * * * *